United States Patent
Lysne et al.

(10) Patent No.: US 9,141,676 B2
(45) Date of Patent: Sep. 22, 2015

(54) SYSTEMS AND METHODS OF MODELING OBJECT NETWORKS

(71) Applicant: Rakuten USA, Inc., New York, NY (US)

(72) Inventors: Stian K. J. Lysne, Arlington, MA (US); Michael Pellegrini, Somerville, MA (US); Bjorn A. Laukli, Yarmouth, ME (US)

(73) Assignee: Rakuten USA, Inc., New York, NY (US)

( * ) Notice: Subject to any disclaimer, the term of this patent is extended or adjusted under 35 U.S.C. 154(b) by 0 days.

(21) Appl. No.: 14/557,248

(22) Filed: Dec. 1, 2014

(65) Prior Publication Data

US 2015/0154192 A1    Jun. 4, 2015

Related U.S. Application Data

(60) Provisional application No. 61/910,799, filed on Dec. 2, 2013.

(51) Int. Cl.
| | | |
|---|---|---|
| G06F 17/00 | (2006.01) | |
| G06N 5/00 | (2006.01) | |
| G06F 15/18 | (2006.01) | |
| G06F 17/30 | (2006.01) | |

(52) U.S. Cl.
CPC ...... *G06F 17/3053* (2013.01); *G06F 17/30386* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 8,635,211 B2* | 1/2014 | Jiang et al. | 707/723 |
| 2004/0093331 A1 | 5/2004 | Garner | |
| 2006/0074859 A1 | 4/2006 | Gange | |
| 2007/0071330 A1* | 3/2007 | Oostveen et al. | 382/228 |
| 2008/0270373 A1* | 10/2008 | Oostveen et al. | 707/5 |
| 2011/0022633 A1* | 1/2011 | Bernosky et al. | 707/770 |
| 2011/0035382 A1* | 2/2011 | Bauer et al. | 707/741 |
| 2012/0054194 A1* | 3/2012 | Gao et al. | 707/741 |
| 2012/0054206 A1 | 3/2012 | Franks et al. | |

* cited by examiner

*Primary Examiner* — Kakali Chaki
*Assistant Examiner* — Daniel Pellett
(74) *Attorney, Agent, or Firm* — Troutman Sanders LLP; James M. Bollinger; Scott D. Barnett

(57) ABSTRACT

According to one embodiment, a system is provided. The system includes a memory, at least one processor coupled to the memory and an object network modeler component executable by the at least one processor. The memory stores an object network including a plurality of objects, the plurality of objects including a first object, a second object, a third object, and a fourth object. The object network modeler component is configured to implicitly associate, within the object network, the first object with the second object and explicitly associate, within the object network, the third object with the fourth object.

21 Claims, 35 Drawing Sheets

FIG. 31

SYSTEMS AND METHODS OF MODELING OBJECT NETWORKS

CROSS REFERENCE TO RELATED APPLICATIONS AND PRIORITY CLAIM

This application claims priority to U.S. Provisional Patent Application Ser. No. 61/910,799, filed Dec. 2, 2013, sharing the same title, the entire contents of which are incorporated by reference herein.

FIELD

The technical field relates generally to association based information retrieval and, more particularly, to systems and methods for modeling associations between objects within an object network.

BACKGROUND

Information systems that discover and explore associations between entities described by underlying data abound into today's information based economies. Examples of these information systems include data warehouses, business intelligence systems, search engines, and the like. Many of these systems utilize commercial data base management systems, such as ORACLE 12c available from Oracle Corporation of Redwood City, Calif. Other systems, such as the GOOGLE search engine available from Google Inc. of Mountain View, Calif. utilize proprietary data base systems, such as BigTable and Spanner.

However, conventional information systems, including conventional database systems, have fallen behind today's enhanced hardware and software capabilities. Stated differently, conventional information systems are not designed to leverage the enhanced processing power and expanded addressable memory space presently available or, further still, the enhanced processing power and expanded addressable memory space on the horizon.

For example, various CPUs now exist that are capable of implementing the 64-bit version of the x86 instruction set (also known as x64). As will be appreciated by those having ordinary skill in the art, these x64 computing systems include vastly larger sets of addressable memory as compared to conventional computing systems. Moreover, it is anticipated that 512-bit extensions to the 256-bit Advanced Vector Extensions SIMD (Single Instruction Multiple Data) instructions for x86 instruction set architecture will be available in the coming year(s). One example of such 512-bit extensions that is eagerly anticipated is the AVX-512 extensions proposed by Intel in July 2013. However, conventional information systems are ill equipped to leverage the parallel processing capabilities that will be available with, for example, the AVX-512 extensions and processors configured to execute the same. In addition, it is anticipated that GPGPUs (General Purpose Graphics Processing Units) will represent attractive hardware options for performing highly efficient processing moving forward because of their architecture, which lends itself to massive parallel processing. Yet, conventional information systems are not designed in a way to leverage the computing power that is currently available, or will be available shortly.

Accordingly, what are needed are computing systems and methods of modeling object networks that account for the dramatic improvements in computer hardware and software presently available and on the near horizon.

SUMMARY

According to various aspects and embodiments, a system is configured to implement and query one or more object networks. These object networks associate a plurality of objects using, for example, explicit and implicit associations. Explicit associations may be based on stored information expressly describing relationships between the objects (e.g., hyperlinks on web pages). Implicit associations may be discovered by some embodiments disclosed herein using a variety of data manipulation techniques, such as vector summarization and comparison. Some embodiments enable objects to be added to existing object networks in real-time. In addition, in some embodiments, the object networks may be efficiently searched to identify objects within the object network that are similar to objects of interest to an external entity, such as a user or higher level application.

For example, in some embodiments a system is configured to receive a probe object and to identify one or more objects within the object network that share one or more characteristics with probe object. These embodiments manifest an appreciation that similarity matching is inherently fuzzy and inexact by implementing tradeoffs in recall and precision to achieve high performance and capacity. As described further below, some embodiments are based around separate stages of query processing with distinct characteristics for recall, precision, and performance. Using these approaches described herein, embodiments exhibit decreased query latency and increased query volume (throughput) relative to conventional technology.

According to various aspects and embodiments a system is provided. The system includes a memory storing an object network including a plurality of objects, the plurality of objects including a first object, a second object, a third object, and a fourth object, at least one processor coupled to the memory, and an object network modeler component executable by the at least one processor and configured to implicitly associate, within the object network, the first to object with the second object, and explicitly associate, within the object network, the third object with the fourth object.

In one embodiment, each of the plurality of objects represents at least one document. In another embodiment, the plurality of objects includes at least one centroid associated with a fifth object of the plurality of objects. In addition, the object network modeler component may be configured to associate a sixth object of the plurality of objects with the at least one centroid at least in part by identifying the sixth object as being similar to the fifth object, traversing one or more links between the fifth object and the at least one centroid, and storing an identifier of the at least one centroid within the sixth object. In this embodiment, the object network modeler component may be configured to modify a vector of the centroid based on a vector of the sixth object. In addition, the plurality of objects may include one or more additional centroids associated with a seventh object.

In one embodiment, the object network modeler component may be configured to associate the at least one centroid with the one or more centroids at least in part by identifying a threshold level of similarity between the seventh object and the fifth and sixth objects, traversing one or more links between the fifth object and the at least one centroid, traversing one or more links between the sixth object and the at least one centroid, traversing one or more links between the seventh object and the one or more centroids, and storing an identifier of the at least one centroid within the one or more centroids.

According to one embodiment, a method is implemented using a computer system. The computer system includes memory and at least one processor coupled to the memory. The method includes acts of storing, within the memory, an object network including a plurality of objects, the plurality of objects including a first object, a second object, a third object, and a fourth object, implicitly associating, within the object network, the first object with the second object, and explicitly associating, within the object network, the third object with the fourth object.

In the method, storing the object network may include storing a plurality of objects that each represent at least one document. In some embodiments, storing the object network may include storing at least one centroid associated with a fifth object of the plurality of objects.

The method may further include associating a sixth object of the plurality of objects with the at least one centroid at least in part by identifying that the sixth object is similar to the fifth object, traversing one or more links between the fifth object and the at least one centroid, and storing an identifier of the at least one centroid within the sixth object. In one embodiment, the method may include modifying a vector of the centroid based on a vector of the sixth object. Further, storing the object network may include storing one or more additional centroids associated with a seventh object.

In another embodiment, the method includes associating the at least one centroid with the one or more centroids at least in part by identifying a threshold level of similarity between the seventh object and the fifth and sixth objects, traversing one or more links between the fifth object and the at least one centroid, traversing one or more links between the sixth object and the at least one centroid, traversing one or more links between the seventh object and the one or more centroids, and storing an identifier of the at least one centroid within the one or more centroids.

According to another embodiment, a non-transitory computer readable medium storing sequences of computer executable instructions configured to implement an object network model is provided. The sequences of instruction including instructions configured to instruct at least one processor to store an object network including a plurality of objects, the plurality of objects including a first object, a second object, a third object, and a fourth object, implicitly associate, within the object network, the first object with the second object, and explicitly associate, within the object network, the third object with the fourth object.

In one embodiment, the instructions may be further configured to instruct the at least one processor to store the object network by at least in part storing a plurality of objects that each represent at least one document. In addition, the instructions may be further configured to instruct the at least one processor to store the object network by at least in part storing at least one centroid associated with a fifth object of the plurality of objects.

In one embodiment, the instructions may be further configured to instruct the at least one processor to associate a sixth object of the plurality of objects with the at least one centroid at least in part by identifying that the sixth object is similar to the fifth object, traversing one or more links between the fifth object and the at least one centroid, and storing an identifier of the at least one centroid within the sixth object. In addition, the instructions may be further configured to instruct the at least one processor to modify a vector of the centroid based on a vector of the sixth object.

In another embodiment, the instructions may be further configured to instruct the at least one processor to store the object network at least in part by storing one or more additional centroids associated with a seventh object.

In yet another embodiment, the instructions may be further configured to instruct the at least one processor to associate the at least one centroid with the one or more centroids at least in part by identifying a threshold level of similarity between the seventh object and the fifth and sixth objects, traversing one or more links between the fifth object and the at least one centroid, traversing one or more links between the sixth object and the at least one centroid, traversing one or more links between the seventh object and the one or more centroids, and storing an identifier of the at least one centroid within the one or more centroids.

According to another embodiment, a system is provided. The system includes a memory storing an external vector including information descriptive of at least one feature, at least one processor coupled to the memory, and an object network modeler component executable by the at least one processor. The object network modeler component is configured to generate at least one internal representation of the at least one feature, and store the at least one internal representation in an internal vector. In addition, the external vector may represent at least one document.

In one embodiment, the object network modeler component may be configured to generate the at least one internal representation at least in part by calculating at least one hash value of at least a portion of the information that identifies the at least one feature. In another embodiment, the object network modeler component may be configured to generate the at least one internal representation at least in part by calculating at least one normalized value of at least a portion of the information that specifies a weight of the at least one feature.

In yet another embodiment, the object network modeler component may be further configured to receive the external vector, determine a number of features described by the external vector, and allocate the internal vector based on the number of features. In addition, the object network modeler may be configured to allocate the internal vector using a vector allocator configured to allocate a vector sized to store, at least, a number of dimensions equal to the number of features.

In one embodiment, the object network modeler maybe further configured to quantize the internal vector to conform to a predetermined size. Further, the object network modeler component may be configured to generate a summary of the internal vector.

According to another embodiment, a method implemented using a computer system including memory and at least one processor coupled to the memory is provided. The method includes acts of storing an external vector including information descriptive of at least one feature, generating at least one internal representation of the at least one feature, and storing the at least one internal representation in an internal vector.

In the method, storing the external vector may include storing an external vector representing at least one document. In addition, generating the at least one internal representation may include calculating at least one hash value of at least a portion of the information that identifies the at least one feature. Moreover, generating the at least one internal representation may include calculating at least one normalized value of at least a portion of the information that specifies a weight of the at least one feature.

The method may further include acts of receiving the external vector, determining a number of features described by the external vector, and allocating the internal vector based on the number of features. In the method, allocating the internal vector may include allocating an internal vector using a vector allocator configured to allocate a vector sized to store, at least, a number of dimensions equal to the number of features. In addition, the method may include the act of quantizing the internal vector to conform to a predetermined size. The method may also include the act of generating a summary of the internal vector.

According to another embodiment, a non-transitory computer readable medium storing sequences of computer executable instructions configured to implement an object network model is provided. The sequences of instruction including instructions configured to instruct at least one processor to store an external vector including information descriptive of at least one feature, generate at least one internal representation of the at least one feature, and store the at least one internal representation in an internal vector.

In one embodiment, the instructions may be further configured to instruct the at least one processor to store the external vector at least in part by storing an external vector representing at least one document. In addition, the instructions may be further configured to instruct the at least one processor to generate the at least one internal representation at least in part by calculating at least one hash value of at least a portion of the information that identifies the at least one feature.

In one embodiment, the instructions may be further configured to instruct the at least one processor to generate the at least one internal representation at least in part by calculating at least one normalized value of at least a portion of the information that specifies a weight of the at least one feature. In another embodiment, the instructions may be further configured to instruct the at least one processor to receive the external vector, determine a number of features described by the external vector, and allocate the internal vector based on the number of features.

In one embodiment, the instructions may be further configured to instruct the at least one processor to allocate the internal vector at least in part by allocating an internal vector using a vector allocator configured to allocate a vector sized to store, at least, a number of dimensions equal to the number of features. In another embodiment, the instructions may be further configured to instruct the at least one processor to quantize the internal vector to conform to a predetermined size. In still another embodiment, the instructions may be further configured to instruct the at least one processor to generate a summary of the internal vector.

According to another aspect, a system is provided. The system includes a memory, at least one processor coupled to the memory, and an object network modeler component executable by the at least one processor. The object network modeler component is configured to generate a first vector within a first object, the first vector being descriptive of a first entity, and generate a second vector within a second object, the second vector being descriptive of the first entity.

In one embodiment, the first entity may include at least one document. In another embodiment, the at least one document may include a plurality of portions and the first vector describes a first portion of the plurality of portions and the second vector describes a second portion of the plurality of portions. In addition, each portion of the plurality of portions, may include a linear segment of the at least one document. In one embodiment, each portion of the plurality of portions may include a word class. In addition, each portion of the plurality of portions may include a word bucket.

In one embodiment, the first portion may include text from the at least one document and the second portion includes images from the at least one document. In another embodiment, the object network modeler component may be configured to associate the first object and the second object with a centroid that represents the first entity.

According to another embodiment, a method implemented using a computer system is provided. The computer system includes memory and at least one processor coupled to the memory. The method includes acts of generating a first vector within a first object, the first vector being descriptive of a first entity, and generating a second vector within a second object, the second vector being descriptive of the first entity.

In one embodiment, the act of generating the first vector may include generating a first vector descriptive of at least one document. In addition, the at least one document may include a plurality of portions and the act of generating the first vector may include generating a first vector descriptive of a first portion of the plurality of portions and the act of generating the second vector may include generating a second vector descriptive of a second portion of the plurality of portions.

In another embodiment, each portion of the plurality of portions may include a linear segment of the at least one document and the act of generating the first vector includes generating a first vector descriptive of a linear segment. In still another embodiment, each portion of the plurality of portions may include a word class and the act of generating the first vector includes generating a first vector descriptive of a word class. In yet another embodiment, each portion of the plurality of portions may include a word bucket and the act of generating the first vector includes generating a first vector descriptive of a word bucket.

In another embodiment, the first portion may include text from the at least one document and the second portion includes images from the at least one document and the act of generating the first vector may include generating a first vector descriptive of the text and the act of generating the second vector includes generating a second vector descriptive of the images. In addition, the method may include the act of associating the first object and the second object with a centroid that represents the first entity.

According to another embodiment, a non-transitory computer readable medium storing sequences of computer executable instructions configured to implement an object network model is provided. The sequences of computer executable instructions are configured to instruct at least one processor to generate a first vector within a first object, the first vector being descriptive of a first entity, and generate a second vector within a second object, the second vector being descriptive of the first entity.

In one embodiment, the instructions may be further configured to instruct the at least one processor to generate the first vector at least in part by generating a first vector descriptive of at least one document. In addition, the at least one document may include a plurality of portions and the instructions may be further configured to instruct the at least one processor to generate the first vector at least in part by generating a first vector descriptive of a first portion of the plurality of portions, and generate the second vector at least in part by generating a second vector descriptive of a second portion of the plurality of portions.

In one embodiment, each portion of the plurality of portions may include a linear segment of the at least one document, and the instructions may be further configured to instruct the at least one processor to generate the first vector at least in part by generating a first vector descriptive of a linear segment. In addition, each portion of the plurality of portions may include a word class and the instructions may be further configured to instruct the at least one processor to generate the first vector at least in part by generating a first vector descriptive of a word class.

In one embodiment, each portion of the plurality of portions may include a word bucket and the instructions may be further configured to instruct the at least one processor to generate the first vector at least in part by generating a first vector descriptive of a word bucket. In another embodiment, the first portion may include text from the at least one document and the second portion may include images from the at least one document and the instructions may be further configured to instruct the at least one processor to generate a first vector at least in part by generating a first vector descriptive of the text, and generate the second vector at least in part by generating a second vector descriptive of the images. In still another embodiment, the instructions may be further configured to instruct the at least one processor to associate the first object and the second object with a centroid that represents the first entity.

According to another embodiment, a system is provided. The system a memory storing an internal vector including information descriptive of a plurality of dimensions, at least one processor coupled to the memory, and an object network modeler component executable by the at least one processor. The object network modeler component is configured to group the information descriptive of the plurality of dimensions into a plurality of fragments, generate a plurality of summaries based on the information descriptive of the plurality of dimensions, each summary of the plurality of summaries corresponding to a respective fragment of the plurality of fragments, and aggregate the plurality of summaries into a fingerprint.

In one embodiment, the internal vector may represent at least one document. In another embodiment, the object network modeler component may be configured to aggregate the plurality of summaries into the fingerprint at least in part by weighting the information descriptive of the plurality of dimensions according to a plurality of magnitudes, each magnitude of the plurality of magnitudes corresponding to a respective dimension described in the information descriptive of the plurality of dimensions.

In another embodiment, the object network modeler component may be configured to group the information descriptive of the plurality of dimensions into a plurality of fragments having a predefined number. In still another embodiment, the object network modeler component may be further configured to store one or more permutations of summaries of the plurality of summaries within an index. In addition, the object network modeler component may be further configured to execute a query at least in part by comparing a portion of a fingerprint of a probe object with the index. In still another embodiment, the object network modeler component may be further configured to execute the query at least in part by calculating a similarity between a vector generated from a vector in the probe object and a vector of an object referenced in the index.

According to another embodiment, a method implemented using a computer system is provided. The computer system includes a memory and at least one processor coupled to the memory. The method includes acts of storing an internal vector including information descriptive of a plurality of dimensions, grouping the information descriptive of the plurality of dimensions into a plurality of fragments, generating a plurality of summaries based on the information descriptive of the plurality of dimensions, each summary of the plurality of summaries corresponding to a respective fragment of the plurality of fragments, and aggregating the plurality of summaries into a fingerprint.

In the method, storing the internal vector may include storing an internal vector representative of at least one document. In addition, aggregating the plurality of summaries into the fingerprint may include weighting the information descriptive of the plurality of dimensions according to a plurality of magnitudes, each magnitude of the plurality of magnitudes corresponding to a respective dimension described in the information descriptive of the plurality of dimensions.

In the method, grouping the information may include grouping the information descriptive of the plurality of dimensions into a plurality of fragments having a predefined number. Further, the method may include storing one or more permutations of summaries of the plurality of summaries within an index.

The method may further include the act of executing a query at least in part by comparing a portion of a fingerprint of a probe object with the index. In addition, the method may include the act of executing the query at least in part by calculating a similarity between a vector generated from a vector in the probe object and a vector of an object referenced in the index.

According to another embodiment, a non-transitory computer readable medium storing sequences of computer executable instructions configured to implement an object network model is provided. The sequences of computer executable instructions include instructions configured to instruct at least one processor to store an internal vector including information descriptive of a plurality of dimensions, group the information descriptive of the plurality of dimensions into a plurality of fragments, generate a plurality of summaries based on the information descriptive of the plurality of dimensions, each summary of the plurality of summaries corresponding to a respective fragment of the plurality of fragments, and aggregate the plurality of summaries into a fingerprint.

In one embodiment, the instructions may be further configured to instruct the at least one processor to store the internal vector by at least in part storing an internal vector representative of at least one document. In addition, the instructions may be further configured to instruct the at least one processor to aggregate the plurality of summaries into the fingerprint at least in part by weighting the information descriptive of the plurality of dimensions according to a plurality of magnitudes, each magnitude of the plurality of magnitudes corresponding to a respective dimension described in the information descriptive of the plurality of dimensions.

In another embodiment, the instructions may be further configured to instruct the at least one processor to group the information at least in part by grouping the information descriptive of the plurality of dimensions into a plurality of fragments having a predefined number. In still another embodiment, the instructions may be further configured to instruct the at least one processor to store one or more permutations of summaries of the plurality of summaries within an index.

In one embodiment, the instructions may be further configured to instruct the at least one processor to execute a query at least in part by comparing a portion of a fingerprint of a probe object with the index. In addition, the instructions may be further configured to instruct the at least one processor to execute the query at least in part by calculating a similarity between a vector generated from a vector in the probe object and a vector of an object referenced in the index.

According to another embodiment, a graphic processing unit (GPU) is provided. The GPU includes a memory storing an object network including a plurality of objects, the plurality of objects including a first object, a second object, a third object, and a fourth object, a plurality of arithmetic logic units (ALUs) coupled to the memory, at least one processor coupled to the memory, and an object network modeler component executable by the at least one processor. The object network modeler component is configured to implicitly associate, within the object network, the first object with the second object, and explicitly associate, within the object network, the third object with the fourth object.

In one embodiment, each of the plurality of objects may represent at least one document. In another embodiment, the object network modeler component may be further configured to generate a plurality of internal representations of external features in a single batch using the plurality of ALUs. In addition, the object network modeler component may be further configured to normalize a plurality of external feature weights in a single batch using the plurality of ALUs.

In one embodiment, the object network modeler component may be further configured to summarize a plurality of dimension and magnitude pairs in a single batch using the plurality of ALUs. In another embodiment, the object network modeler component may be further configured to compute a plurality of Cosine similarity values and/or a plurality of Jaccard index values in a single batch using the plurality of ALUs. In another embodiment, the object network modeler component may be further configured to compute a plurality of hamming distance values in a single batch using the plurality of ALUs. In still another embodiment, the object network modeler component may be further configured to process a plurality of fingerprint fragments in a single batch using the plurality of ALUs.

According to another embodiment, a method implemented using a graphics processing unit (GPU) is provided. The GPU includes a memory, a plurality of arithmetic logic units (ALUs) coupled to the memory, and at least one processor coupled to the memory. The method includes acts of storing an object network including a plurality of objects, the plurality of objects including a first object, a second object, a third object, and a fourth object, implicitly associating, within the object network, the first object with the second object, and explicitly associating, within the object network, the third object with the fourth object.

In the method, the act of storing the object network including the plurality of objects may include storing a plurality of objects that each represent at least one document. In addition, the method may include the act of comprising generating a plurality of internal representations of external features in a single batch using the plurality of ALUs. Further, the method may include the act of normalizing a plurality of external feature weights in a single batch using the plurality of ALUs.

In one embodiment, the method may further include the act of summarizing a plurality of dimension and magnitude pairs in a single batch using the plurality of ALUs. In another embodiment, the method may further include the act of computing a plurality of Cosine similarity values in a single batch using the plurality of ALUs. In yet another embodiment, the method may further include the act of computing a plurality of hamming distance values in a single batch using the plurality of ALUs. In still yet another embodiment, the method may further include the act of processing a plurality of fingerprint fragments in a single batch using the plurality of ALUs.

According to another embodiment, a non-transitory computer readable medium storing sequences of computer executable instructions configured to implement an object network model is provided. The sequences of computer executable instructions include instructions configured to instruct at least one processor and a plurality of arithmetic logic units (ALUs) to store an object network including a plurality of objects, the plurality of objects including a first object, a second object, a third object, and a fourth object, implicitly associate, within the object network, the first object with the second object, and explicitly associate, within the object network, the third object with the fourth object.

In one embodiment, the instructions may be further configured to instruct the at least one processor and the plurality of ALUs to store the object network including the plurality of objects at least in part by storing a plurality of objects that each represent at least one document. In another embodiment, the instructions may be further configured to instruct the at least one processor and the plurality of ALUs to generate a plurality of internal representations of external features in a single batch using the plurality of ALUs.

In yet another embodiment, the instructions may be further configured to instruct the at least one processor and the plurality of ALUs to normalize a plurality of external feature weights in a single batch using the plurality of ALUs. In addition, the instructions may be further configured to instruct the at least one processor and the plurality of ALUs to summarize a plurality of dimension and magnitude pairs in a single batch using the plurality of ALUs.

In still yet another embodiment, the instructions may be further configured to instruct the at least one processor and the plurality of ALUs to compute a plurality of Cosine similarity values in a single batch using the plurality of ALUs. In addition, the instructions may be further configured to instruct the at least one processor and the plurality of ALUs to compute a plurality of hamming distance values in a single batch using the plurality of ALUs. Still further, the instructions may be further configured to instruct the at least one processor and the plurality of ALUs to process a plurality of fingerprint fragments in a single batch using the plurality of ALUs.

According to another embodiment, a system is provided. The system includes a memory, at least one processor coupled to the memory, and an object network modeler component executable by the at least one processor. The object network modeler component is configured to generate an object store including a plurality of objects, generate at least one object index including pointers to objects of the plurality of objects, and generate at least one reverse index including pointers to objects of the plurality of objects.

In one embodiment, each object of the plurality of objects may represent at least one document. In another embodiment, the object network modeler component may be further configured to generate at least one permutation index including pointers to objects of the plurality of objects. In another embodiment, the object network modeler component may be further configured to generate at least one dimension index including pointers to objects of the plurality of objects. In still another embodiment, the at least one object index, the at least one reverse index, the at least one permutation index, and the at least one dimension index may be generated from a common data structure. In addition, each of the at least one object index, the at least one reverse index, the at least one permutation index, and the at least one dimension index may include at least one indexslot array allocated using an index allocator.

In one embodiment, the object network modeler component may be further configured to execute changes to the at least one object index, the at least one reverse index, the at least one permutation index, and the at least one dimension index in real-time. In another embodiment, the at least one object of the plurality of objects may include a vector allocated using a vector allocator.

According to another embodiment, a method implemented using a computer system is provided. The computer system includes a memory and at least one processor coupled to the memory. The method includes acts of generating an object store including a plurality of objects, generating at least one object index including pointers to objects of the plurality of objects, and generating at least one reverse index including pointers to objects of the plurality of objects.

In one embodiment, generating the object store includes generating a plurality of objects that each represent at least one document. In another embodiment, the method may further include the act of generating at least one permutation index including pointers to objects of the plurality of objects. In still another embodiment, the method may further include the act of generating at least one dimension index including pointers to objects of the plurality of objects.

In the method, the act of generating the at least one object index, the at least one reverse index, the at least one permutation index, and the at least one dimension index may include generating at least one object index, at least one reverse index, at least one permutation index, and at least one dimension index from a common data structure. In addition, the act of generating each of the at least one object index, the at least one reverse index, the at least one permutation index, and the at least one dimension index may include allocating at least one indexslot array allocated using an index allocator.

The method may further include the act of executing changes to the at least one object index, the at least one reverse index, the at least one permutation index, and the at least one dimension index in real-time. In one embodiment, the act of generating the object store may include allocating a vector using a vector allocator.

In another embodiment, a non-transitory computer readable medium storing sequences of computer executable instructions configured to implement an object network model is provided. The computer executable instructions of instruction include instructions configured to instruct at least one processor to generate an object store including a plurality of objects, generate at least one object index including pointers to objects of the plurality of objects, and generate at least one reverse index including pointers to objects of the plurality of objects.

In one embodiment, the instructions may be further configured to instruct the at least one processor to generate the object store at least in part by generating a plurality of objects that each represent at least one document. In another embodiment, the instructions may be further configured to instruct the at least one processor to generate at least one permutation index including pointers to objects of the plurality of objects. In still another embodiment, the instructions may be further configured to instruct the at least one processor to generate at least one dimension index including pointers to objects of the plurality of objects. In addition, the instructions may be further configured to instruct the at least one processor to generate the at least one object index, the at least one reverse index, the at least one permutation index, and the at least one dimension index at least in part by generating at least one object index, at least one reverse index, at least one permutation index, and at least one dimension index from a common data structure.

In one embodiment, the instructions may be further configured to instruct the at least one processor to generate each of the at least one object index, the at least one reverse index, the at least one permutation index, and the at least one dimension index at least in part by allocating at least one indexslot array allocated using an index allocator. In another embodiment, the instructions may be further configured to instruct the at least one processor to execute changes to the at least one object index, the at least one reverse index, the at least one permutation index, and the at least one dimension index in real-time. In still another embodiment, the instructions may be further configured to instruct the at least one processor to generate the object store at least in part by allocating a vector using a vector allocator.

According to another embodiment, a system is provided. The system includes a memory, at least one processor coupled to the memory, and an object network modeler component executable by the at least one processor. The object network modeler is configured to receive a query message including a probe object, the probe object including a probe vector, execute an encoding phase using the probe vector, execute a recall phase to identify at least one candidate object using at least one of a permutation index and a dimension index, and execute a precision phase using a predefined similarity threshold.

In one embodiment, the object network modeler component may be configured to execute the encoding phase at least in part by generating an internal vector corresponding to the probe vector, and generating a fingerprint corresponding to the probe vector. In another embodiment, the object network modeler component may be configured to execute the recall phase at least in part by matching the fingerprint corresponding to the probe vector with one or more fingerprints stored in the permutation index.

In one embodiment, the object network modeler component may be further configured execute the recall phase at least in part by matching the internal vector corresponding to the probe vector with one or more internal vectors stored in the dimension index. In another embodiment, the object network modeler component may be further configured to execute the recall phase at least in part by removing duplicate objects corresponding to the one or more fingerprints and the one or more internal vectors. In still another embodiment, the object network modeler component may be configured to execute the precision phase at least in part by calculating a similarity metric using a similarity function that references the probe vector and a vector corresponding to the at least one candidate object, and determining whether the similarity metric transgresses the predefined similarity threshold. Moreover, the similarity function may combine Cosine similarity and a Jaccard index. Further, the object network modeler component may be further configured to execute an anti-aliasing phase using a meta-store.

According to another embodiment, a method implemented using a computer system is provided. The computer system includes a memory and at least one processor coupled to the memory. The method includes acts of receiving a query message including a probe object, the probe object including a probe vector, executing an encoding phase using the probe vector, executing a recall phase to identify at least one candidate object using at least one of a permutation index and a dimension index, and executing a precision phase using a predefined similarity threshold.

In the method, the act of executing the encoding phase may include generating an internal vector corresponding to the probe vector, and generating a fingerprint corresponding to the probe vector. In addition, the act of executing the recall phase may include matching the fingerprint corresponding to the probe vector with one or more fingerprints stored in the permutation index.

In the method, the act of executing the recall phase may further include matching the internal vector corresponding to the probe vector with one or more internal vectors stored in the dimension index. In addition, the act of executing the recall phase may further include removing duplicate objects corresponding to the one or more fingerprints and the one or more internal vectors.

In the method, the act of executing the precision phase may include calculating a similarity metric using a similarity function that references the probe vector and a vector corresponding to the at least one candidate object, and determining whether the similarity metric transgresses the predefined similarity threshold. In one embodiment, the act of calculating the similarity metric may include combining Cosine similarity and a Jaccard index. In another embodiment, the method may include the act of executing an anti-aliasing phase using a meta-store.

According to another embodiment, a non-transitory computer readable medium storing sequences of computer executable instructions configured to implement an object network model is provided. The sequences of computer executable instructions include instructions configured to instruct at least one processor to receive a query message including a probe object, the probe object including a probe vector, execute an encoding phase using the probe vector, execute a recall phase to identify at least one candidate object using at least one of a permutation index and a dimension index, and execute a precision phase using a predefined similarity threshold.

In one embodiment, the instructions may be further configured to instruct the at least one processor to execute the encoding phase at least in part by generating an internal vector corresponding to the probe vector, and generating a fingerprint corresponding to the probe vector. In another embodiment, the instructions may be further configured to instruct the at least one processor to execute the recall phase at least in part by matching the fingerprint corresponding to the probe vector with one or more fingerprints stored in the permutation index.

In one embodiment, the instructions may be further configured to instruct the at least one processor to execute the recall phase at least in part by matching the internal vector corresponding to the probe vector with one or more internal vectors stored in the dimension index. In another embodiment, the instructions may be further configured to instruct the at least one processor to execute the recall phase further at least in part by removing duplicate objects corresponding to the one or more fingerprints and the one or more internal vectors. In still another embodiment, the instructions may be further configured to instruct the at least one processor to execute the precision phase at least in part by calculating a similarity metric using a similarity function that references the probe vector and a vector corresponding to the at least one candidate object, and determining whether the similarity metric transgresses the predefined similarity threshold.

In one embodiment, the instructions may be further configured to instruct the at least one processor to calculate the similarity metric at least in part by combining Cosine similarity and a Jaccard index. In another embodiment, the instructions may be further configured to instruct the at least one processor to execute an anti-aliasing phase using a meta-store.

In another embodiment, a computing system for identifying objects within an object network that are sufficiently similar to a query is provided. In this embodiment, the system may include memory comprising executable instructions and a processor operatively connected to the memory. The processor may be configured to execute the executable instructions in order to effectuate a method. The method may include obtaining a probe object representative of the query. One or more external vectors representative of the probe object may be generated. One or more internal vectors representative of the probe object may be generated based on the one or more external vectors representative of the probe object. A fingerprint representative of the probe object may be generated based on the one or more internal vectors representative of the probe object. Continuing, the method effectuated by the processor may include performing at least one of the following comparisons to identify a first set of candidate objects: (i) comparing the fingerprint representative of the probe object with a plurality of fingerprints representative of a plurality of objects within the object network and/or (ii) comparing the one or more internal vectors representative of the probe object with a plurality of internal vectors representative of the plurality of objects within the object network. The method may further include calculating first respective similarity metrics between the probe object and each of the objects in the first set of candidate objects. The first respective similarity metrics may be calculated by comparing the one or more internal vectors representative of the probe object with corresponding internal vectors representative of each object in the first set of candidate objects. Finally, in this example, the method may include generating a second set of candidate objects based on the first set of candidate objects. The second set of candidate objects may include those objects whose first similarity metrics exceed a first predefined threshold.

In another embodiment, a computer-implemented method is provided. In this embodiment, the method may include obtaining a first external object. One or more external vectors representative of the first external object may be generated. One or more internal vectors representative of the first external object may be generated based on the one or more external vectors representative of the first external object. The method may further include obtaining a second external object. One or more external vectors representative of the second external object may be generated. One or more internal vectors representative of the second external object may be generated based on the one or more external vectors representative of the second external object. The method may further include determining whether the first external object and the second external object are explicitly associated with one another. In response to determining that the first and second external objects are explicitly associated, an explicit association may be generated between the first and second external objects. Further still, a determination may be made as to whether the first and second external objects are implicitly associated. This determination may be made by comparing the one or more internal vectors representative of the first external object with the one or more internal vectors representative of the second external object. In response to determining that the first and second external objects are implicitly associated, an implicit association may be generated between the first and second external objects.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "another embodiment," "other embodiments," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 31 is a data structure diagram illustrating index components in the system;

DETAILED DESCRIPTION

Figure 1:
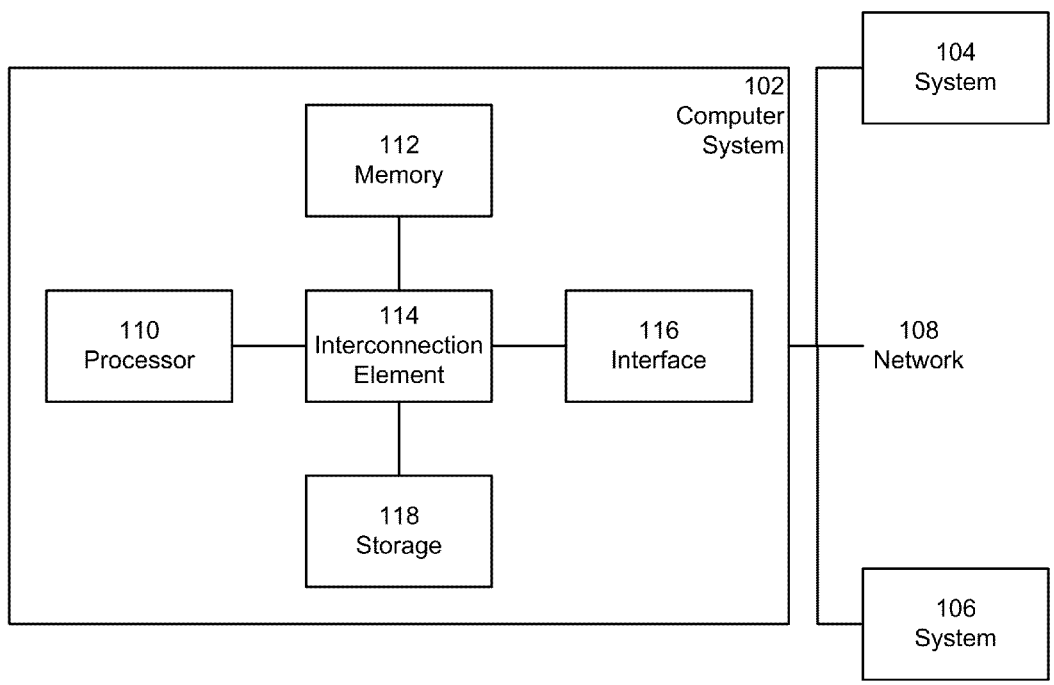
FIG. 1 is a block diagram of a distributed computer system.

Some embodiments implement a Simarray Vector Intelligence Network that includes a data-to-data associative object clustering network with approximate match capabilities. In these embodiments, insertion and removal of Simarray objects (referred to herein as "objects"), as well as formation and destruction of object links, occur in real-time without the need for offline indexing. Some embodiments are memory-based for high performance operation. Object durability is facilitated via disk write-through of all data-modifying operations. Similarity matching is accomplished through a combination of vector fingerprinting, dimension indexing, and vector space model filtration functions. Object networks are formed explicitly by applying pre-existing, external connectivity information, and implicitly through similarity analysis of objects or clusters of objects.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Computer System

As discussed below with regard to FIGS. 1 and 29, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring now to FIG. 1, a block diagram of a distributed computer system is illustrated, in which various aspects and functions are practiced. As shown, the distributed computer system includes one or more computer systems that exchange information. More specifically, the distributed computer system includes computer systems 102, 104, and 106. As shown, the computer systems 102, 104, and 106 are interconnected by, and may exchange data through, a communication network 108. The network 108 may include any communication network through which computer systems may exchange data. To exchange data using the network 108, the computer systems 102, 104, and 106 and the network 108 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 102, 104, and 106 may transmit data via the network 108 using a variety of security measures including, for example, SSL or VPN technologies. While the distributed computer system illustrates three networked computer systems, the distributed computer system is not so limited and may include any number of computer systems and computing devices, networked using any medium and communication protocol.

As illustrated in FIG. 1, the computer system 102 includes a processor 110, a memory 112, an interconnection element 114, an interface 116 and data storage element 118. To implement at least some of the aspects, functions, and processes disclosed herein, the processor 110 performs a series of instructions that result in manipulated data. The processor 110 may be any type of processor, multiprocessor or controller. In addition, although only a single processor is shown, those having ordinary skill in the art will appreciate that in some embodiments, the techniques and systems disclosed herein may involve the use of multiple processors, wherein each processor may have one or more cores. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. In addition, in some embodiments, the processor may be GPGPU. In still another embodiment, the processor may be a processor configured to execute the AVX-512 extensions discussed above. The processor 110 is connected to other system components, including one or more memory devices 112, by the interconnection element 114.

The memory 112 stores programs (e.g., sequences of instructions coded to be executable by the processor 110) and data during operation of the computer system 102. Thus, the memory 112 may be a relatively high performance, volatile, random access memory such as a dynamic random access memory ("DRAM") or static memory ("SRAM"). However, the memory 112 may include any device for storing data, such as a disk drive or other nonvolatile storage device. Various examples may organize the memory 112 into particularized and, in some cases, unique structures to perform the functions disclosed herein. These data structures may be sized and organized to store values for particular data and types of data.

Components of the computer system 102 are coupled by an interconnection element such as the interconnection element 114. The interconnection element 114 may include any communication coupling between system components such as one or more physical busses in conformance with specialized or standard computing bus technologies such as IDE, SCSI, PCI and InfiniBand. The interconnection element 114 enables communications, including instructions and data, to be exchanged between system components of the computer system 102.

The computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 102 to exchange information and to communicate with external entities, such as users and other systems.

The data storage element 118 includes a computer readable and writeable nonvolatile, or non-transitory, data storage medium in which instructions are stored that define a program or other object that is executed by the processor 110. The data storage element 118 also may include information that is recorded, on or in, the medium, and that is processed by the processor 110 during execution of the program. More specifically, the information may be stored in one or more data structures specifically configured to conserve storage space or increase data exchange performance. The instructions may be persistently stored as encoded signals, and the instructions may cause the processor 110 to perform any of the functions described herein. The medium may, for example, be optical disk, magnetic disk or flash memory, among others. In operation, the processor 110 or some other controller causes data to be read from the nonvolatile recording medium into another memory, such as the memory 112, that allows for faster access to the information by the processor 110 than does the storage medium included in the data storage element 118. The memory may be located in the data storage element 118 or in the memory 112, however, the processor 110 manipulates the data within the memory, and then copies the data to the storage medium associated with the data storage element 118 after processing is completed. A variety of components may manage data movement between the storage medium and other memory elements and examples are not limited to particular data management components. Further, examples are not limited to a particular memory system or data storage system.

Although the computer system 102 is shown by way of example as one type of computer system upon which various aspects and functions may be practiced, aspects and functions are not limited to being implemented on the computer system 102 as shown in FIG. 1. Various aspects and functions may be practiced on one or more computers having a different architectures or components than that shown in FIG. 1. For instance, the computer system 102 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 102 may be a computer system including an operating system that manages at least a portion of the hardware elements included in the computer system 102. In some examples, a processor or controller, such as the processor 110, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 110 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Object Modeling System

Figure 2:
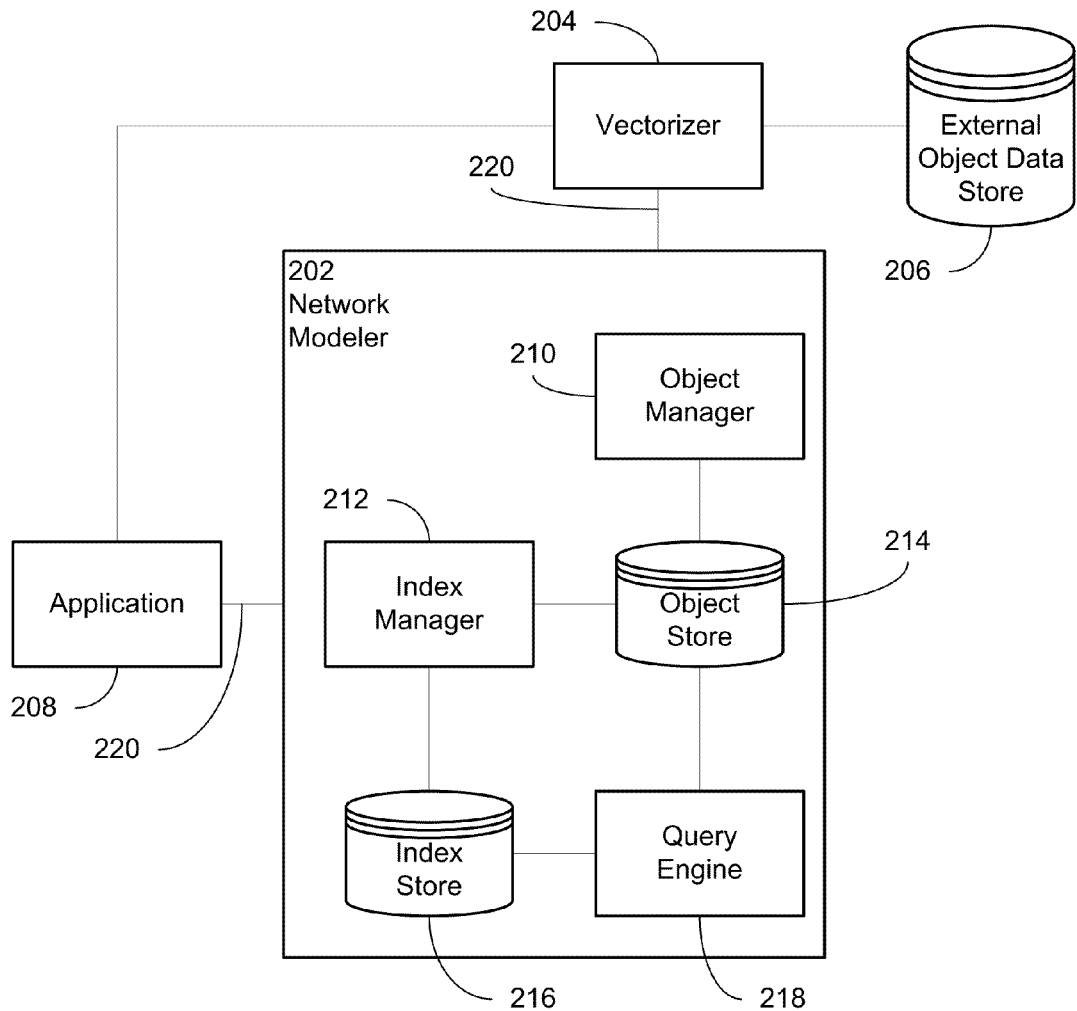
FIG. 2 is a block diagram showing a system for modeling object networks.

Various embodiments utilize one or more computer systems specially configured to model objects and associations between objects. FIG. 2 illustrates one of these embodiments, an object modeling system. As shown, FIG. 2 includes an object network modeler 202, a vectorizer 204, external object data store 206, and an application 208. The object network modeler 202 includes an object manager 210, an index manager 212, an object store 214, an index store 216, and a query engine 218. The object network modeler 202, vectorizer 204, external object data store 206, and the application 208 may be implemented using one or more computer systems, such as the computer system described above with reference to FIG. 1. As illustrated in FIG. 2, the object network modeler 202, the vectorizer 204, the external object data store 206, and the application 208 exchange (e.g., send or receive) information via one or more connections 220. The connections 220 may include any communication device through which computer components may exchange information. For example, the connections 220 may include local bus connections, LAN connections, application program interfaces, sockets, and other data communication devices that facilitate information flow between computer components.

In some embodiments, the application 208 is configured to interface with the object network modeler 202 to explore relationships between objects described by the external object data store 206. Examples of the application 208 include applications that derive value from identifying and exploring associations between objects, such as thesauri, dictionaries, encyclopedias, data mining systems, business intelligence systems, and internet search engines, among other systems. In these embodiments, the application 208 interfaces with the object network modeler 202 via an interface exposed by the object network modeler 202, such as an application program interface (API). Via the API, the application 208 transmits various messages to the object network modeler 202. These messages may include requests for the object network modeler 202 to populate a set of data structures, such as the data structures described further below with reference to FIG. 29. The messages may also include requests for the object network modeler 202 to execute queries against these data structures. In some embodiments, the object network modeler 202 is configured to process these API messages in response to receiving them. In this way, the object network modeler 202 supports the operation of the application 208 by creating, maintaining, and querying object networks as described further below.

In one embodiment illustrated by FIG. 2, the external object data store 206 includes information descriptive of external objects targeted for analysis by the application 208. Examples of these external objects include words, concepts, persons, products, and documents, among other objects. The external object data store 206 may be implemented in the form of any logical construction capable of storing information on a computer readable medium including flat files, indexed files, hierarchical databases, relational databases or object oriented databases.

In other embodiments, the vectorizer 204 generates vectors from the raw data stored in the external object data store, which is a process known in the art as vectorization. The vectors generated by the vectorizer 204 include information descriptive of the external objects. A good vectorizer is able to extract key features from the raw data, thereby creating a sparse vector in high dimensional space. A common type of vectorizer is one that extracts keywords and important phrases (ngrams) from a piece of free text. Other vectorizers can generate vectors that represent images, media, or any other form of information as a set of features.

According to some embodiments, the object manager 210 is configured to create, update, and delete objects processed by the object network modeler 202. In these embodiments, the object manager 210 receives external vectors from the vectorizer 204, encodes the external vectors as internal vectors, summarizes the internal vectors into fingerprints and uses this information to maintain the object store 214. In some embodiments, the object manager 210 executes these actions in response to receiving a message requesting the actions. The object manager may receive such a message from the application 208, the vectorizer 204, a configuration file, or from some other source. Examples of the processes that the object manager 210 is configured to perform are described further.

In some embodiments, the index manager 212 is configured to create, update, and delete indices stored in the index store 216. In these embodiments, the index manager 212 builds and updates indices in real-time as objects are stored or modified in the object store 214. Examples of the processes performed and the data manipulated by the index manager 212 are described further below.

In some embodiments, the object store 214 is configured to store objects created and manipulated by the object manager 210. In these embodiments, the object store 214 includes data structures specially tailored to minimize memory fragmentation and maximize performance. Examples of the structures and data included in the object store 214 are described further below.

In some embodiments, the index store 216 is configured to store indices created and manipulated by the index manager 212. In these embodiments, the index store 216 includes data structures specially tailored to minimize memory fragmentation and maximize performance. Examples of the structures and data included in the index store 216 are described further below.

In some embodiments, the query engine 218 is configured to process query process messages that include query requests. These query messages may include information descriptive of one or more probe objects for which associated objects are sought. In response to receiving a query message, the query engine 218 processes the query message. Examples of the processes and data manipulated by the query engine 218 are described further below.

Simarray Objects and Object Networks

In various embodiments, the object manager is configured to implement an object network. This object network may include one or more objects that represent real-world entities such as a documents, persons, products, web-pages, etc. Each of the objects within the object network may include a set of attributes that describe a real-world entity represented by the object. Table 1 lists several examples of these attributes:

TABLE 1

| Attribute | Description | Comment |
| --- | --- | --- |
| OBID | Unique identifier allowing direct retrieval of object via the object index. | Multiple manifestations of the same object share the same OBID but have different SUBIDs. |
| SUBID | Outbound reference to another object allowing retrieval of referenced to object via the object index and retrieval of inbound referrers via the reverse index. | May be NULL. An object with no outbound reference (SUBID = NULL) may be referred to herein as TERMINAL. An object with one or more outbound references is a DIRECTED object. |
| VECTOR | Set of descriptive, weighted features of an object locating the object in high-dimensional space. Forms the foundation for fuzzy matching between objects in the network or probe objects. Allows for maximum-recall similarity search via the direct dimension indices. | Sparse vector in high-dimensional space. |
| FINGERPRINT (FP) | A locality sensitive hash of VECTOR. This is a dimensionality reduced bitvector derived from the object's feature set (VECTOR.) Allows for high | Dense vector in 64-dimensional, binary space. |

TABLE 1-continued

| Attribute | Description | Comment |
|---|---|---|
| | performance similarity search via the permutation indices. | |
| CARDINALITY | A counter reflecting the number of inbound references to an object from other objects. | |
| BLOB | Any additional metadata to associate with object in the form of arbitrary binary information of any size up to 2 GB per object. | May be NULL. BLOB semantics apply to higher level application layers only. |

In some embodiments, the object manager associates objects with one another within an object network via, for example, SUBID references. In these embodiments, the object manager traverses objects within the object network via, for example, an object index and a reverse index. The object manager may associate objects in at least two distinct ways: (i) explicitly from links derived from real-world, (e.g., by leveraging previously established relationships) and (ii) implicitly from "nature of object" via similarity analysis.

For example, the object manager may create an object network associating object A (A) with object B (B) by instantiating two objects with the following attributes:

| Object A | | Object B | |
|---|---|---|---|
| OBID | A | OBID | B |
| SUBID | B | SUBID | NULL |

The object manager need not record a reason why A is associated with B for the object network to exist, but the object manager may record the reason internally as a LNK attribute having a value of:
LNK=IMPLICIT A→B due to "nature of object", i.e. A and B are similar
LNK=EXPLICIT A→B due to external, prior knowledge of object relationships
LNK=DUAL A→B due to external relationship as well as similarity Thus, in one example, the object manager creates a minimal representation for A being explicitly associated with B due to external, prior knowledge as:

| Object A | | Object B | |
|---|---|---|---|
| OBID | A | OBID | B |
| SUBID | B | SUBID | NULL |
| LNK | EXPL | LNK | NULL |

In some embodiments the object manager records implicit or dual associations in a similar manner (e.g., using a LNK attribute). However, discovery of implicit or dual associations requires similarity analysis using vectors and fingerprints, as described above. The object manager may create a minimal representation of A being implicitly associated with B due to approximate matching of object features as:

| Object A | | Object B | |
|---|---|---|---|
| OBID | A | OBID | B |
| SUBID | B | SUBID | NULL |
| LNK | EXPL | LNK | NULL |

-continued

| Object A | | Object B | |
|---|---|---|---|
| VECTOR | [x,y,z, . . . ] | VECTOR | [x,y, . . . ] |
| FP | 11001010 . . . | FP | 11011010 . . . |

Alternatively, the object manager may create a minimal representation of A being implicitly and explicitly associated with B as:

| Object A | | Object B | |
|---|---|---|---|
| OBID | A | OBID | B |
| SUBID | B | SUBID | NULL |
| LNK | BOTH | LNK | NULL |
| VECTOR | [x,y,z, . . . ] | VECTOR | [x,y, . . . ] |
| FP | 11001010 . . . | FP | 11011010 . . . |

Figure 3:
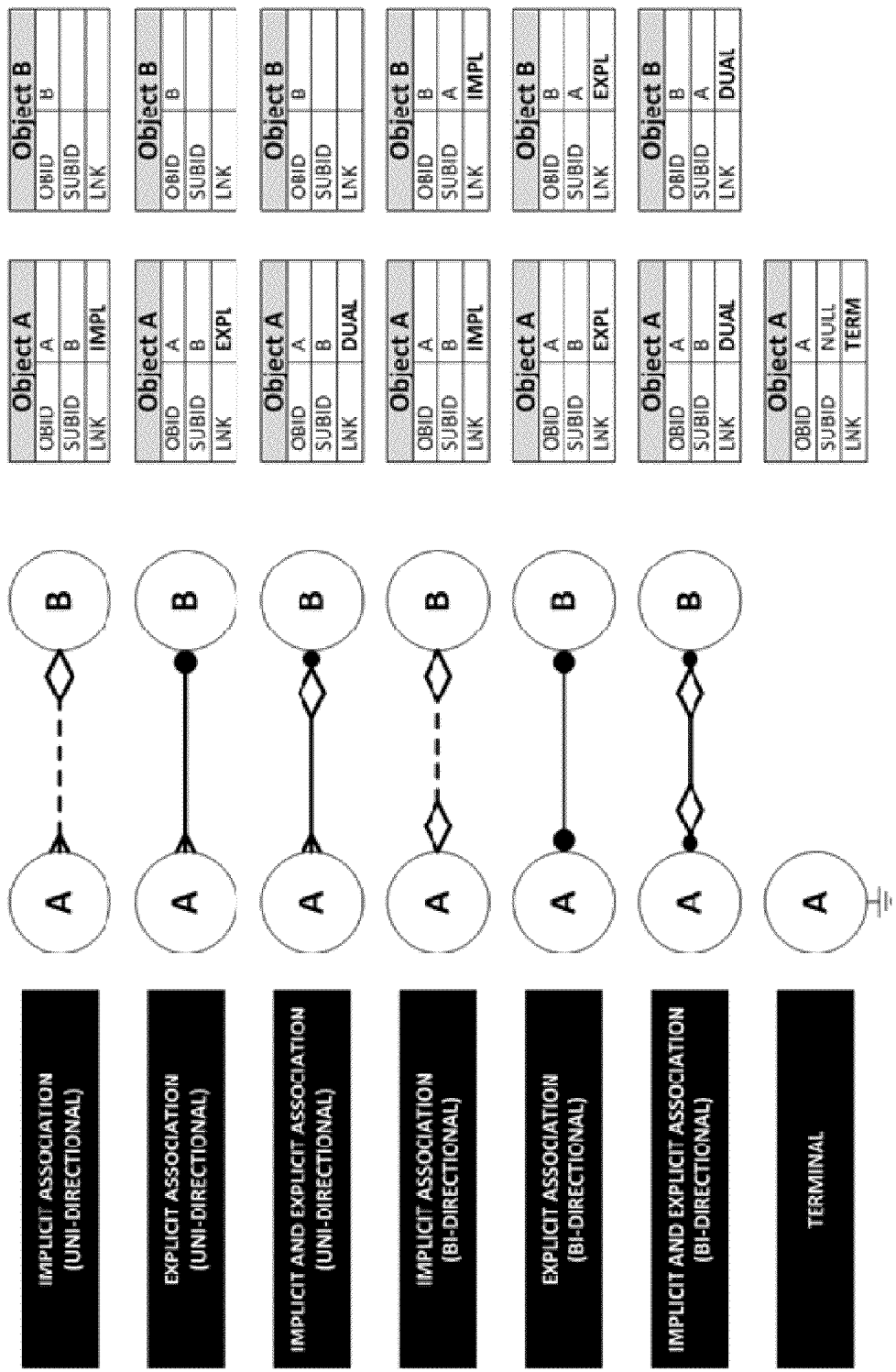
FIG. 3 is an entity relationship diagram defining various relationships between objects in an object network.

FIG. 3 further illustrates examples of object associations that the object manager is configured to create based on relationships between the objects. As illustrated in FIG. 3, these associations include a uni-directional implicit association, a uni-directional explicit association, a uni-directional explicit and implicit association, a bi-directional implicit association, a bi-directional explicit association, a bi-directional explicit and implicit association, and a NULL association. FIG. 3 illustrates each of these associations using both a graphical representations and object tables, as shown.

Figure 4:
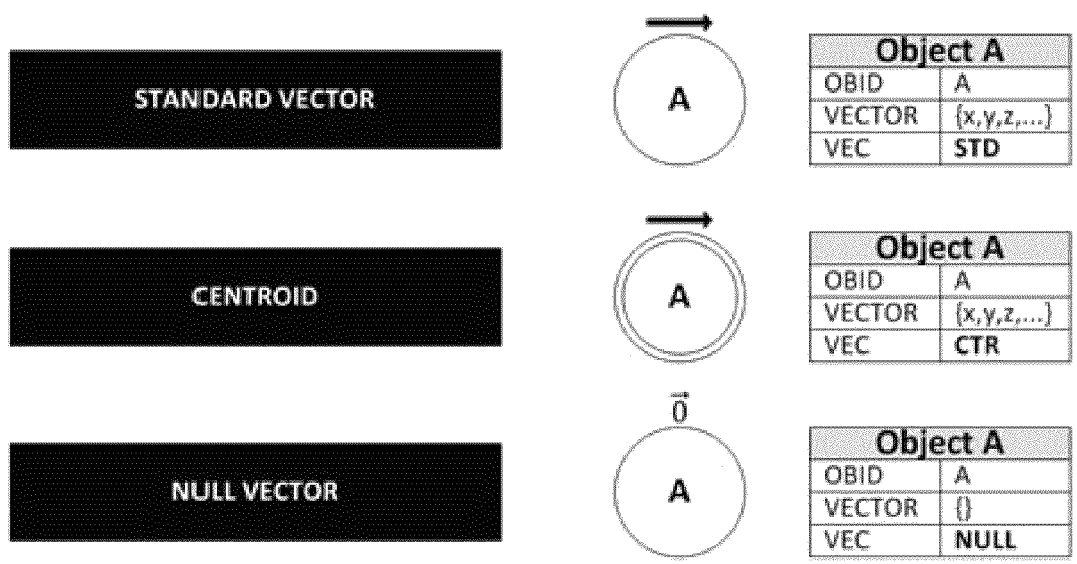
FIG. 4 is an entity relationship diagram defining various relationships between objects in an object network.

In other embodiments, the object manager is configured to instantiate objects having vector types (VECs). FIG. 4 illustrates examples of these vector types. As illustrated in FIG. 4, vector types include a standard vector type, a centroid vector type, and a NULL vector type. FIG. 4 illustrates each of these vector types using both a graphical representations and object tables, as shown.

Figure 5:
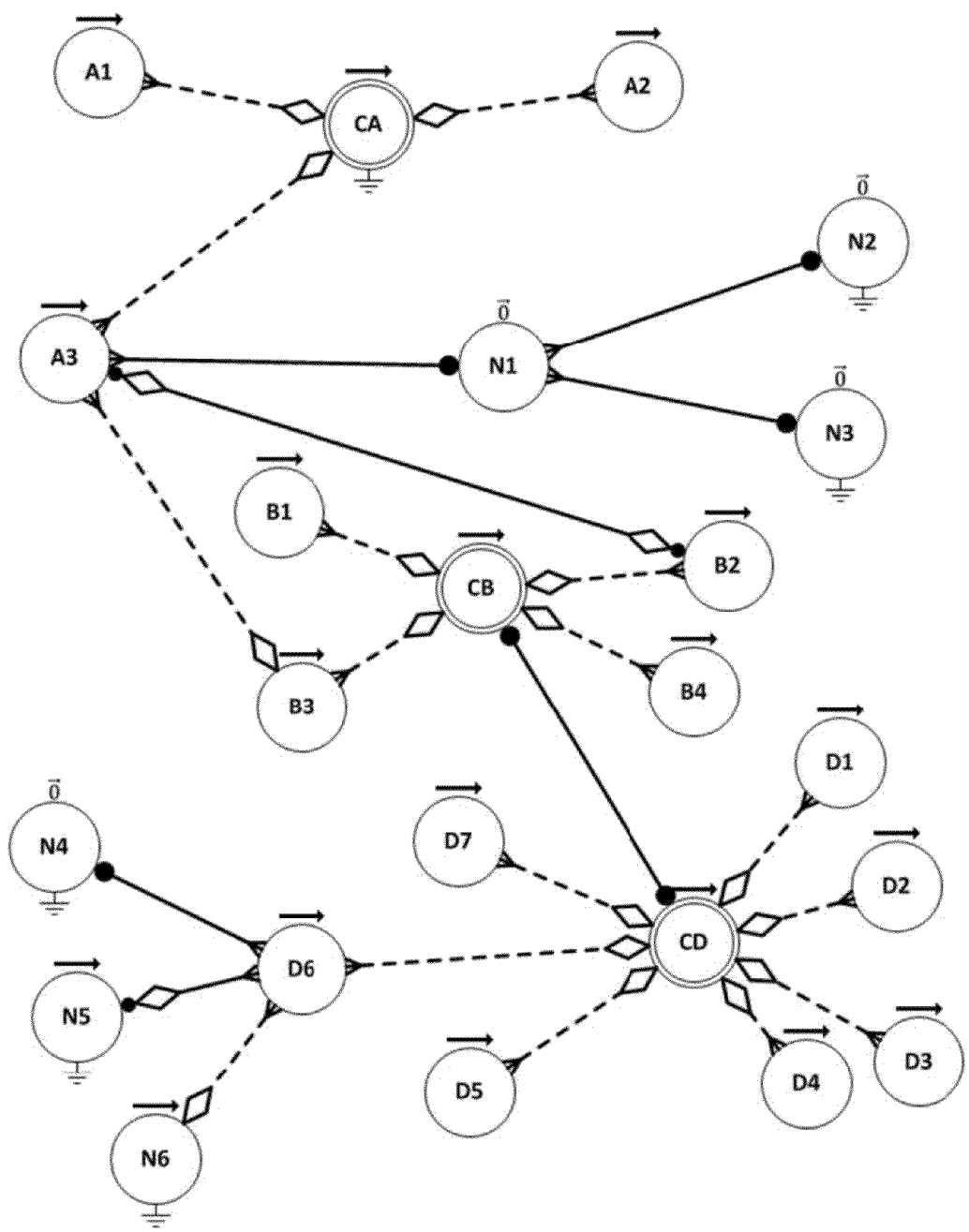
FIG. 5 is an entity relationship diagram of an example object network.

As described above, vectors and vector types are utilized by the object network modeler components to discover implicit object associations. It is appreciated that explicit association does not require that an object have a vector value or a vector type value and, therefore, an object may have a vector with no elements and a vector type value of NULL. FIG. 5 illustrates one example of an object network that may be created and managed by the object manager. As shown in FIG. 5, the object network includes centroid objects CA, CB, and CD. CA is also a TERMINAL object and includes no associations with other objects. CB includes an explicit, bi-directional association with CD and CD includes an explicit, bi-directional association with CB.

In the example of FIG. 5, each of the objects A1, A2, and A3 is a standard vector object including an implicit, uni-directional association with CA. A3 further includes an implicit, uni-directional association with B3, a dual, bi-directional association with B2, and an explicit, uni-directional association with N1. N1 is a NULL vector object that includes explicit, uni-directional associations with N2 and N3. Both N2 and N3 are NULL vector, TERMINAL objects. Each of the objects B1, B2, B3, and B4 is a standard vector object that includes an implicit, uni-directional association with CB.

As shown in FIG. 5, each of the objects D1, D2, D3, D4, D5, and D6 is a standard vector object that includes an implicit, uni-directional association with CB. D6 also includes an explicit, uni-directional association with N4, a dual, uni-directional association with N5, and an implicit, uni-directional association with N6. N4 is a NULL vector, TERMINAL object. Both of N5 and N6 are standard vector, TERMINAL objects.

In some embodiments, the object manager is configured to maintain centroid objects that represent a group or cluster of other objects. In these embodiments, a vector of a centroid object is a function of the vectors of the objects linked to the centroid object via uni-directional or bi-directional associations. For example, the vector of a centroid may include the dimensions of the objects linked to the centroid (up to the truncation limit) sorted by average magnitude. To facilitate maintenance of centroid objects by other components (e.g., application layer components), the object manager may expose a cluster interface through which the object manager receives clustering messages from the other components. These clustering messages may include instructions to create a centroid, attach an object to a centroid, or detach an object from a centroid, among other clustering instructions.

In some embodiments, the object manager is configured to execute clustering instructions included within clustering messages received via the cluster interface. For example, in at least one embodiment, the object manager is configured to respond to a clustering message requesting creation of a centroid. This type of clustering message may include metadata descriptive of the centroid (e.g., group ID, name, etc.). In response to receiving this type of clustering message, the object manager instantiates a NULL vector centroid object to which objects may be attached. In addition, in these embodiments, the object manager is configured to automatically maintain the vector and cardinality counts of the centroid (inbound references to the centroid) as objects are attached or detached in real time in response to clustering messages.

Figure 6:
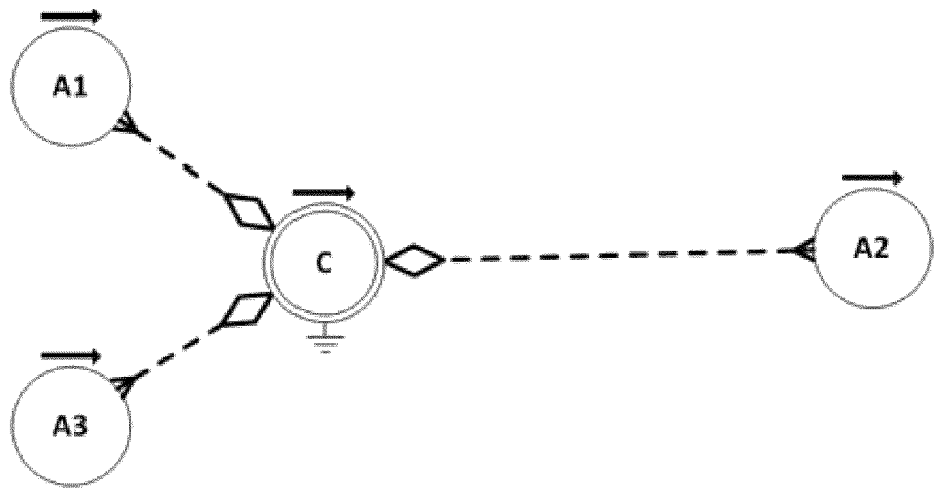
FIGS. 6-8 are a sequence of entity relationship diagrams illustrating a process for attaching an object to a centroid.
Figure 7:
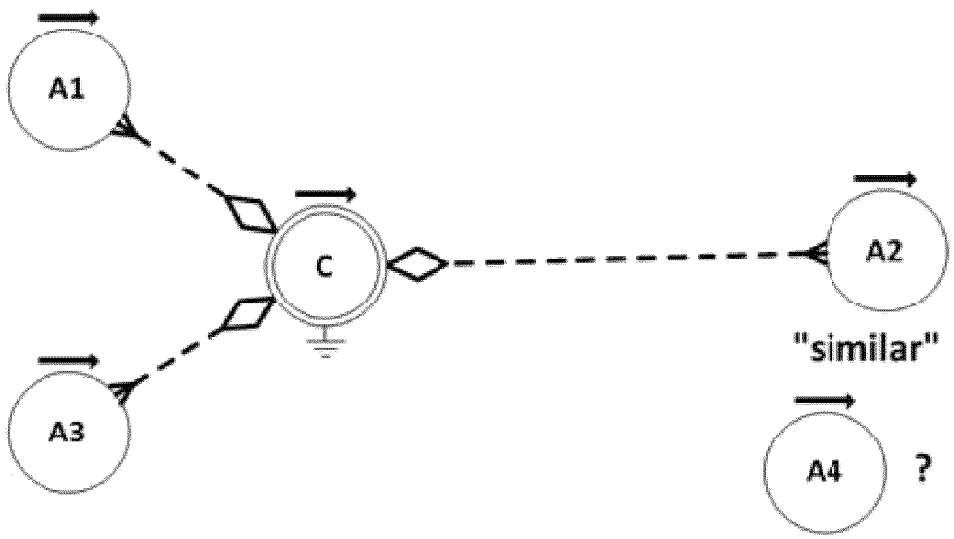
Figure 8:
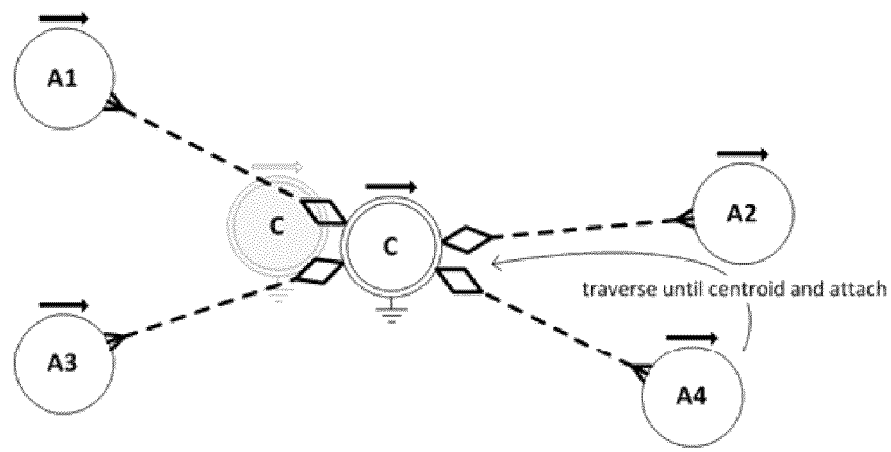

FIGS. 6-8 illustrate a clustering process that the object manager is configured to execute in some embodiments. The clustering process attaches a new object with no links to a centroid within an existing object network, such as the object network illustrated in FIG. 6, where associations are implicitly defined based on object contents (e.g., document text). As shown in FIG. 6, the clustering process includes acts of submitting a query based on the new object, receiving results for the query, identifying the centroid, and attaching the new object to the centroid. As shown in FIG. 6, the existing object network includes centroid C and objects A1, A2, and A3.

Figure 42:
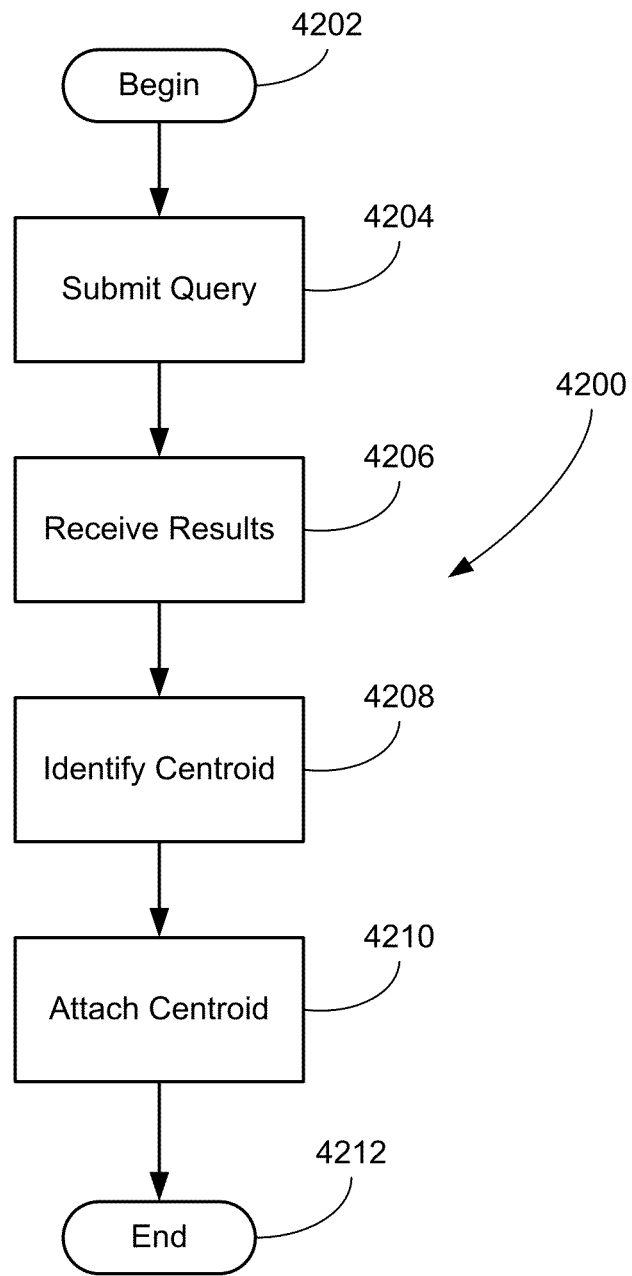
FIG. 42 is a flow diagram of a process for attaching an object to a centroid.

Referring briefly to FIG. 42, FIG. 42 illustrates a flow diagram of a process for attaching an object to a centroid in line with the process shown in FIGS. 6-8. The object manager begins the clustering process 4200 at 4202. In act 4204, the object manager submits a query message to the query engine. The query message may include a threshold similarity metric and the vector of the new object (e.g., the object A4 illustrated in FIG. 7), or a portion thereof. In response to receiving the query message, the query engine executes a vector query based on the query message and returns a results message including query results that identify one or more objects (e.g., the object A2 illustrate in FIG. 8) that meet the threshold similarity metric. In act 4206, the object manager receives the results message. In act 4208, the object manager identifies a centroid (e.g., the object C illustrated in FIG. 8) linked directly or indirectly to an object identified in the query results as being similar (e.g. the most similar) to the new object. In some embodiments and as illustrated in FIG. 8, the object manager identifies the centroid by traversing the object network from the object identified as being similar (e.g., the object A2) until the centroid is reached. In act 4210, the object manager attaches new object to the identified centroid by updating the attributes of the new object and the information included in the various indexes. Within the act 4210, the object manager also updates the cardinality and vector of the centroid based on the existence and vector of the new object. The object manager ends the clustering process 4200 at 4212.

It is appreciated that that executing a clustering process in accord with the clustering process 4200 may create large clusters with elements that have little content in common and where, consequently, the centroid is relatively distant from linked objects. To address this issue components that interact with the object manager may be configured to monitor the allowed spread within a cluster (e.g., by tracking one or more spread metrics that indicate the amount of spread), and re-cluster a cluster into smaller clusters to limit the amount of spread where the spread metrics transgress (e.g., exceed) a spread threshold.

In some embodiments, the object manager is configured to process clustering messages that request explicit associations between objects. This type of clustering message may include information identifying the objects to be explicitly linked and the type of association to be established (e.g., a uni-directional association or a bi-directional association). In response to receiving a clustering message requesting an explicit association, the object manager adjusts the attributes of the identified objects and the indexes to implement the requested association.

In some embodiments, sets of clusters are created by associating centroids with other centroids. For example, a cluster of web pages may be associated with another cluster of web pages thereby creating a super-cluster where sub-clusters are implicitly linked internally and explicitly linked to other sub-clusters. According to various embodiments, the object manager is configured to explicitly or implicitly associate a centroid in response to detect one or more conditions. For example, in one embodiment, the object manager is configured to associate a first centroid with a second centroid in response to detecting that more than a threshold number of objects linked to the first centroid have explicit associations with objects linked to the second centroid. It is appreciated that, in some embodiments, the object manager is configured to represent weaker relationships by simply associating individual objects linked to centroids, rather than associating the centroids themselves.

Figure 9:
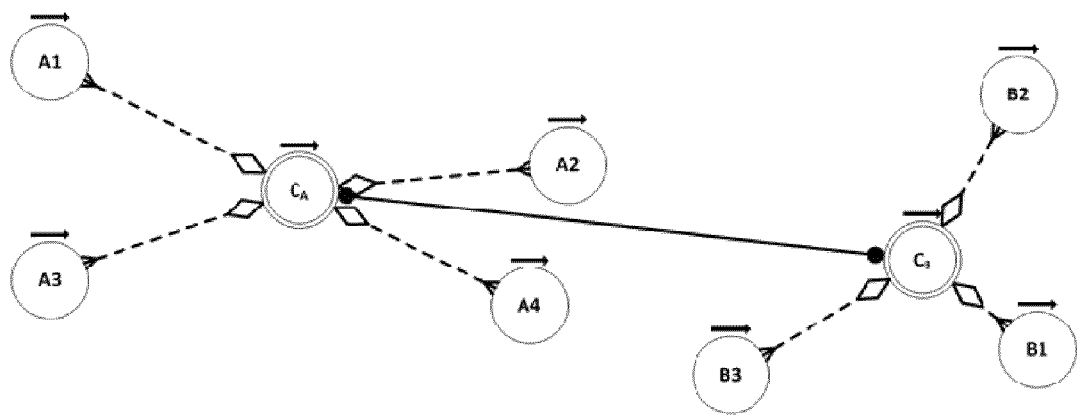
FIG. 9 is an entity relationship diagram of an example object network.

FIG. 9 illustrates one example of a super-cluster in which centroid $C_A$ includes an explicit, bi-directional association with centroid $C_B$ and centroid $C_B$ includes an explicit, bi-directional association with $C_A$. When executing vector queries for a probe object against the object network illustrated in FIG. 9, if the query engine determines that the probe object is similar to any of the objects A1, A2, A3, or A4, the query engine will also test for similarity between the probe object and each of objects B1, B2, and B3 because of the explicit bi-directional link between $C_A$ and $C_B$.

Figure 10:
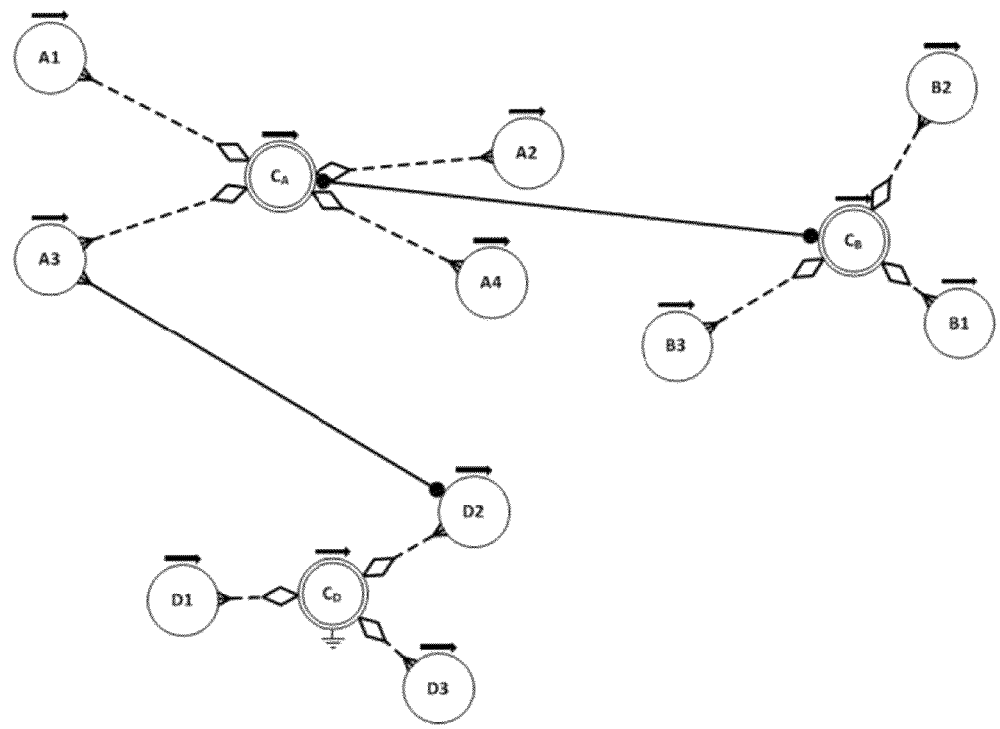
FIG. 10 is an entity relationship diagram of an example object network.

FIG. 10 illustrates another example of a super-cluster in which the sub-cluster with the centroid $C_A$ is loosely linked with the sub-cluster with the centroid $C_D$ via an explicit, uni-directional association to D2 included in A3. When executing vector queries for a probe object against the object network illustrated in FIG. 10, if the query engine determines that the probe object is similar to any of the objects A1, A2, A3, or A4, the query engine will also test for similarity between the probe object and each of objects B1, B2, and B3 because of the explicit bi-directional link between $C_A$ and $C_B$. In addition, if the query engine determines that the probe object is similar to A3, the query engine will also test for similarity between the probe object and D1, D2, and D3.

Figure 11:
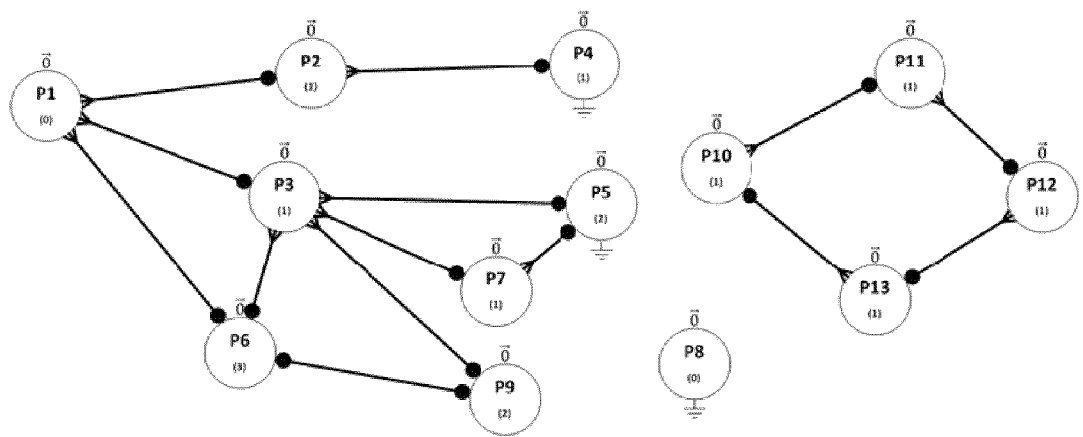
FIG. 11 is an entity relationship diagram of an example object network.

FIG. 11 illustrates another example of an object network produced by the object manager. As shown in FIG. 11, each object within the object network is a NULL vector object that lists its cardinality within parenthesis. For instance, P1 has a cardinality of 0, while P12 has a cardinality of 1. In some embodiments, the object manager internally maintains a manifestation for each outbound association of an object. For example, object P3 has four internal manifestations (P31, P32, P33, and P34) each with optional meta-data serving as "anchor-text" for the outbound association, optional association strength based on a range of factors, and optional overall rank relative to other objects. In some embodiments, components interacting with the object manager execute multi-hop association analysis by analyzing a target object's inbound associations, the objects linked to the target object via the inbound associations, the inbound associations of those objects, etc., with arbitrary depth determined by the component interacting with the object manager.

In some embodiments, the object manager is configured to traverse the object network both forwards and backwards using the object and reverse indices. For example, a goal of an application may be to enhance relevancy ranking in a search engine. Modeling the link graph of indexed pages up-front in the object network modeler enables the application to enhance the search engine with link information. Before injecting a page into the search engine, the application may consult the pre-loaded object network modeler in real-time to extract information about the page's position and importance in the network using arbitrarily complex forwards/backwards analysis, as well as any static page rank or anchor-text from inbound referrers to index alongside with the page's original text.

Going beyond the standard link-graph by including implicit associations between pages expands the application's capabilities greatly. Fuzzy relationships will emerge allowing for concept linking, de-duplication, related content, etc.

Vector Encoding

In some embodiments, the query engine is configured to execute fuzzy matching based on a vector space model. In these embodiments, the object manager is configured to receive external vectors from the vectorizer and generate internal vectors based on these received external vectors. By generating internal vectors, the object manager realizes the several benefits including data processing efficiency, storage efficiency, and uniformity. For example, where the vectorizer is applied to free text it will output external vectors with dimensions (features) that are strings of arbitrary length. To achieve uniformity and efficiency the object manager encodes the vector as described further below.

In some embodiments, an external vector $V_{ext}$ has a general form that may be expressed as Equation 1:

$$V_{ext} = \{(feature_1, weight_1), (feature_2, weight_2), \ldots\} \quad (1)$$

where ($feature_n$, $weight_n$), is the $n^{th}$ vector element, sorted by weight in descending order. An external vector may contain any number of elements. Each $element_n$ may include a $feature_n$, which is data describing the object from which it was derived and may be of any size, and $weight_n$, which is any real, positive number denoting the importance of $feature_n$ relative to other features.

Figure 12:
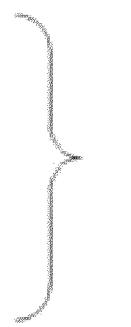
FIG. 12 is a data structure diagram illustrating an internal vector.

In some embodiments, the object manager converts $V_{ext}$ to an internal form $V_{int}$ through feature hashing, weight normalization and length quantization. In these embodiments, the object manager is configured to generate an internal vector, $V_{int}$ with a general form that may be expressed as Equation 2:

$$V_{int} = \{(dim_1, mag_1), (dim_2, mag_2), \ldots\} \quad (2)$$

where element ($dim_n$, $mag_n$) is derived from ($feature_n$, $weight_n$). The object manager may store any number of elements in an internal vector, up to an implementation-specific truncation limit m. Thus, in some embodiments, the object manager is configured to truncate, discard and does not include within $V_{int}$ any ($feature_n$, $weight_n$) where n>m. According to various embodiments, the object manager stores $V_{int}$ internally as an array of 32-bit integers, each representing one element using 26 bits for $dim_n$ and 6 bits for $mag_n$, as illustrated in FIG. 12.

In some embodiments, the object manager is configured to quantize the internal array size $Q_k$ as a function of the number of (nonzero) elements in $V_{int}$. In these embodiments, the object manager is configured to allocate the array holding $V_{int}$ from the k-th vector allocator and sets trailing elements (i.e., elements with no corresponding feature in the external vector) set to zero. Using n(X) to denote the number of elements in X, the relationship between truncation limit, the internal array size, and $V_{int}$ may be expressed as Inequality 3:

$$m \geq Q_k \geq n(V_{int}) \quad (3)$$

For storage efficiency purposes the object manager is configured to set of custom memory allocators for the vector arrays, each yielding an int32 array of size $Q_k$ that is large enough to store $V_{int}$. Unless $n(V_{int}) = Q_k$, the object manager sets trailing elements of the vector array to zero.

In some embodiments, the set of vector allocators A is quantized to avoid the overhead of having a separate allocator for every possible vector size $n(V_{int}) \leq m$, balanced with the need to minimize the number of wasted trailing zero-elements when $n(V_{int}) < Q_k$. In these embodiments, the object manager selects the smallest allocator $A_k$ to generate an array with sufficient capacity to store an internal vector.

In some embodiments, the set of allocator sizes Q is a configurable parameter that is tunable at compile-time or run-time to accommodate one or more applications, such as the application 208 described above with reference to FIG. 2. The set of allocator sizes Q may be expressed as Equation 4:

$$Q = \{Q_1, Q_2, \ldots, Q_k \ldots Q_{max}\}, Q_{max} = m \quad (4)$$

Figure 13:
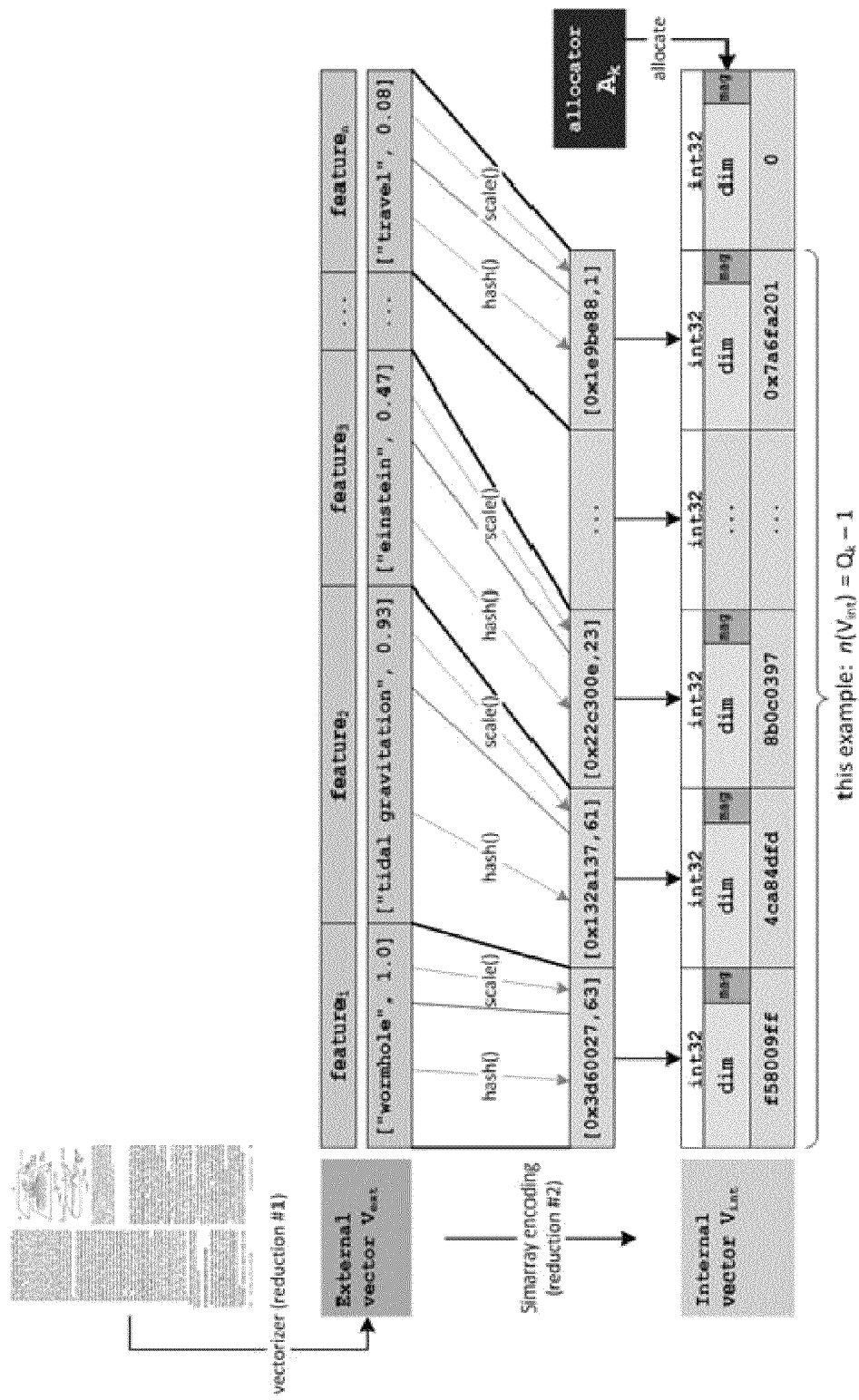
FIG. 13 is a sequence diagram illustrating a vector encoding process.
Figure 39:
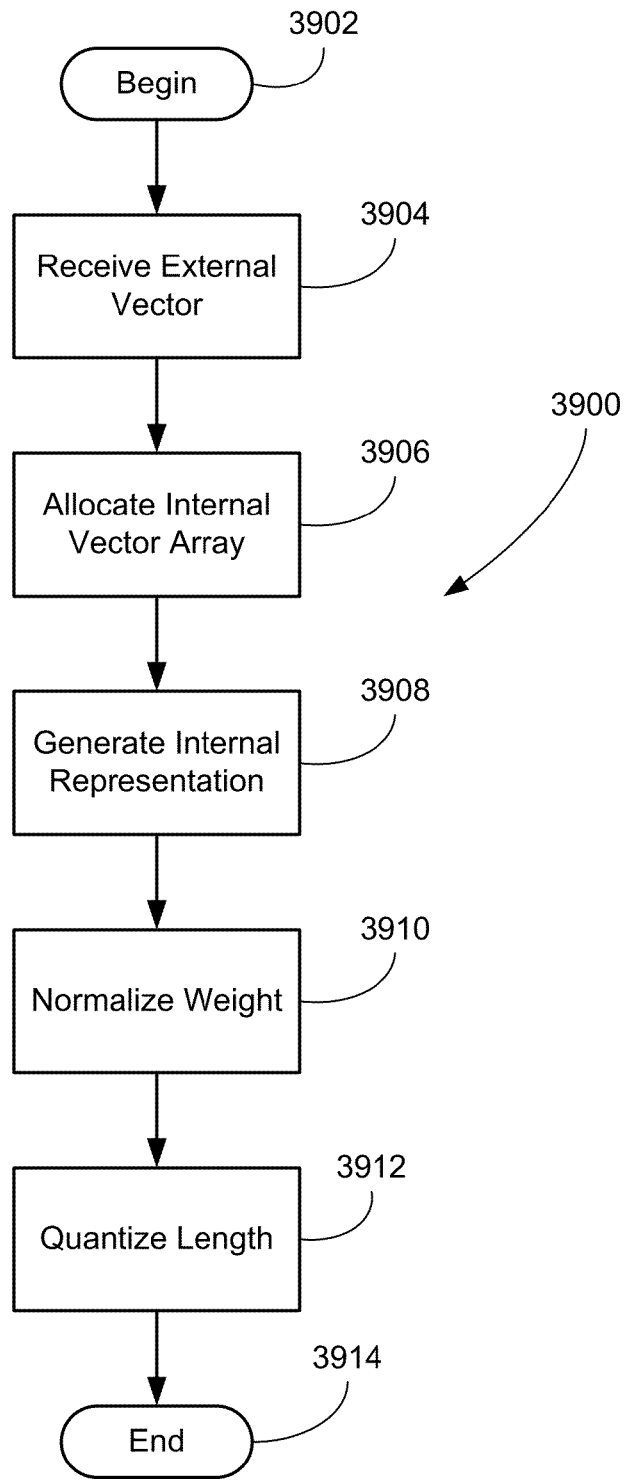
FIG. 39 is a flow diagram illustrating a vector encoding process.

FIGS. 13 and 39 illustrate, in concert, a conversion process for creating $V_{int}$ from $V_{ext}$, executed by the object manager according to some embodiments. With regard to FIG. 39, FIG. 39 is a flow diagram illustrating a vector encoding process 3900 that includes acts of receiving an external vector, selecting a vector allocator, generating internal representations, normalizing weights, and quantizing lengths. The conversion process 3900 begins at 3902.

In act 3904, the object manager receives an external vector for processing. The external vector may be transmitted from the vectorizer. As shown in FIG. 13, the external vector may include a set of elements {$feature_1$, ... $feature_n$} where each element includes a feature and a weight.

In act 3906, the object manager allocates an internal vector array to store $V_{int}$. In one embodiment, the object manager analyzes the external vector to determine its size and selects a vector allocator (illustrated as $A_k$ of FIG. 13) such that $Q_k \geq n$ ($V_{ext}$), $Q_k \le m$. Next, the object manger allocates a new internal vector array using $A_k$ (see "Internal vector $V_{int}$" in FIG. 13).

In act 3908, the object manager creates an internal representation of each feature included in the external vector. In one embodiment, the object manager creates internal representations by encoding feature$_n$ as integer dim$_n$ using a hashing function: dim$_n$=hash(feature$_n$) for all n>$Q_k$. In some embodiments, hash( ) is fast and produces uniformly distributed integers of a predetermined size (e.g., 26 bits). In act 3910, the object manager normalizes the weights of the internal representations created in act 3908. In one embodiment, the object manager encodes each weight$_n$ as mag$_n$ using a scaling and normalization function such that the maximum weight maps to a predefined maximum (e.g., $2^6-1=63$) and the minimum weight maps to a predefined minimum (e.g., 1): mag$_n$=scale (weight$_n$) for all n>$Q_k$. This act may be facilitated by $V_{ext}$ being pre-normalized to represent the maximum possible feature weight as a known quantity, such as 1.0.

In act 3912, the object manager quantizes the length of $V_{int}$. In one embodiment, the object manager sets dim$_n$=0, mag$_n$=0 for all n>$Q_k$, as illustrated in the final element of the internal vector array in FIG. 13.

In some embodiments, the feature vector $V_{ext}$ is not required to be stored within the object network modeler 202, but may be included as part of object meta-data. In these embodiments, the internal vector $V_{int}$ is stored in the object that the vector describes as a pointer to the int32 array returned by allocator $A_k$. Multiple manifestations $O_1$, $O_2$, $O_3$, . . . of the same object O (same OBID, different SUBID) may share the same vector instance by referencing the same array in memory. In these embodiments, the object manager is configured to, upon a deletion of a manifestation, determine whether additional manifestations reference the array and, if not, de-allocate the array. For example, in embodiments where a reference count is used to track the number of manifestations that reference the array, the object manager may decrement the reference count during deletion of an object manifestation. Further, where the reference count equals zero, the object manager may de-allocate the array.

While the feature space of $V_{ext}$ is practically infinite, the dimension space of $V_{ext}$ is further restricted as part of the encoding. In some embodiments, due to the use of 26 bits for internal vector dimensions, the object network modeler operates in a $2^{26}-1=67{,}103{,}863$ dimensional, finite vector space. (dim=0 is reserved for zero-padding vector arrays where n($V_{int}$)<$Q_k$.)

It is appreciated that, even though 67 million degrees of freedom may initially seem abundant, aliasing (collisions) may occur even within a limited feature vocabulary that is orders of magnitude less diverse than the vector space of the object model, due to a phenomenon commonly known as the birthday problem. In some embodiments, dimension aliasing may lead to occasional false positives when comparing vectors, impacting overall precision. However, in these embodiments, the performance advantages of compact internal vectors outweigh the disadvantages of sporadic false positives. In addition, for an application requiring absolute precision, some embodiments include an object manager configure to store $V_{ext}$ along the object as meta-data for filtering (anti-aliasing) as described further below.

Vector Similarity Measure

In some embodiments, the query engine is configured to determine implicit associations (fuzzy matching) using vector similarity computation. To illustrate this configuration within the context of two dimensions, the query engine may compute similarity for two vectors A and B as expressed in Equation 5:

$$\mathrm{Cosine}(A, B) = \theta = \frac{A \cdot B}{|A||B|} = \frac{\sum_{i=1}^{n} A_i B_i}{\sqrt{\sum_{i=1}^{n} A_i^2} \sqrt{\sum_{i=1}^{n} B_i^2}} \quad (5)$$

Figure 14:
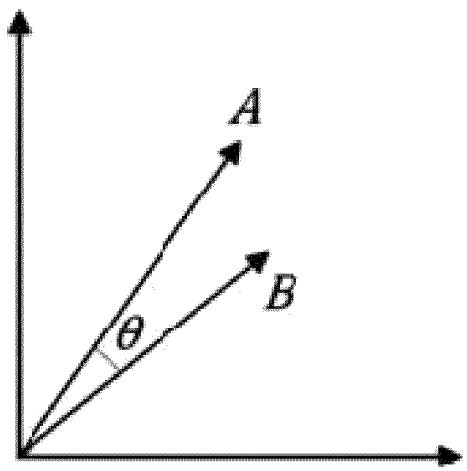
FIG. 14 is a graph illustrating cosine similarity computation.

The angle θ represents spatial alignment, as illustrate in FIG. 14, and does not account for differences in length between A and B. This approach is referred to as Cosine similarity and may be applied to any number of dimensions.

In other embodiments, the query engine is configured to measure similarity using the computation expressed in Equation 6:

$$\mathrm{Jaccard}(A, B) = \frac{A \cap B}{A \cup B} = \frac{\sum_{s_j \in A \cap B} \min(frq_A(s_j), frq_B(s_j))}{\sum_{s_j \in A \cup B} \max(frq_A(s_j), frq_B(s_j))} \quad (6)$$

This approach is referred to as the Jaccard index. The Jaccard index for two sets A and B is defined as the intersection/union ratio and measures the overlap between vector dimensions; the more overlap the higher the similarity.

Some embodiments disclosed herein manifest an appreciation that neither Cosine similarity nor the Jaccard index is ideal for every circumstance. In these embodiments, the query engine is configured to combine the two into a composite measure helps counteract undesirable idiosyncratic behavior in one or the other. This combined approach may be expressed as Equation 7:

$$\mathrm{Sim}(A,B) = \mathrm{Cosine}(A,B)^{\alpha} \cdot \mathrm{Jaccard}(A,B)^{\beta} \quad (7)$$

Exponents α and β are variable configurable parameters from 0.0 to 1.0 (such that α+β=1.0) to accommodate applications where one similarity measure is more appropriate than the other.

It is appreciated that the curse of dimensionality puts a limit on computational efficiency, even when using compact internal vectors. For this reason some embodiments of the object network modeler do not rely solely upon brute force vector comparison for fuzzy matching, although the object network modeler can be configured this way for certain an application that requires it. Some embodiments utilize direct dimension indices on the internal vector for the first M elements. In these embodiments, the query engine guarantees recall for vectors sharing at least one dimension among the top M elements. However, it is appreciated that configuring direct dimension indexing for all elements has a performance impact due to the $O(n^2)$ nature of this approach. Some embodiments address this issue using fingerprinting, which is described further below.

Fingerprinting

In some embodiments, the object network modeler is configured to address the curse of dimensionality for vector comparison using a dimensionality reduction technique referred to as fingerprinting based on locality sensitive hashing (LSH). In these embodiments, the object network modeler uses an approach where several independent LSH fragments are joined together to form a single fingerprint, referred to herein as "F-LSH." More specifically, in these embodiments, the object network modeler components, such as the object manager and the query engine, are configured to execute matching processes using various combinations of the F-LSH fragments. As such, in these embodiments, each fingerprint as a whole is an efficient "storage unit"—or bit vector $V_{fp}$ W bits wide. In these embodiments, the object manager generates fingerprints that fit into an even multiple of words on the target machine architecture and are therefore both compact and fast to manipulate with a minimal number of machine instructions. In one embodiment, the object network modeler uses a single 64-bit word for $V_{fp}$ on the x64 platform, i.e. W=64. Other embodiments may use other word sizes.

While the internal vector $V_{int}$ is a sparse vector in high-dimensional space, $V_{fp}$ is a dense vector in W dimensions with sub-regions (fragments) that are combined by object network modeler components to form indexing keys. Equations 8 and 9 express respective sizes of $V_{int}$ and $V_{fp}$.

Internal feature vector $V_{int}$:

$$n(V_{int}) \in [1, \infty), \text{space} = R^{2^{26}-1} \quad (8)$$

Fingerprint $V_{fp}$:

$$n(V_{fp}) = W, \text{space} = \{0,1\}^W, W \in \{64, 128, 256, 512, \ldots\} \quad (9)$$

In some embodiments, object network modeler components are configured to compare fingerprints to determine differences between internal vectors represented by the fingerprints. Notably, while these embodiments may use hamming distance between fingerprints for performance optimization, these embodiments do not use hamming distance directly as a similarity measure. The hamming distance of two binary numbers is the number of bit positions with opposite values.

In some embodiments, object network modeler components manifest an appreciation that at least one property of F-LSH fingerprints (as implemented by the object network modeler) that makes the fingerprints suitable for vector indexing is that moderate difference between internal vectors result in localized (clustered) modification of bits in their corresponding fingerprints. Small changes in vector $V_{int}$ result in small and localized changes in fingerprint $V_{fp}$. Stated another way, if the difference between $V_{int}$ and $V'_{int}$ is small (a few dimensions) then the difference between $V_{fp}$ and $V'_{fp}$ will be a few bits of opposite value occurring within one or more (but not all) fingerprint fragments.

In some embodiments, the index manager uses this property to create a set of permutation indices on $V_{fp}$ by shuffling and re-combining individual fragments of $V_{fp}$ into smaller sub-sets, referred to herein as significant regions, for use as direct lookup keys into a set of tables. As referred to herein, $P_j$ denotes a fragment, $R_i$ denotes a significant region, and $T_i$ denotes the permutation index (lookup table) using $R_i$ as key.

Figure 15:
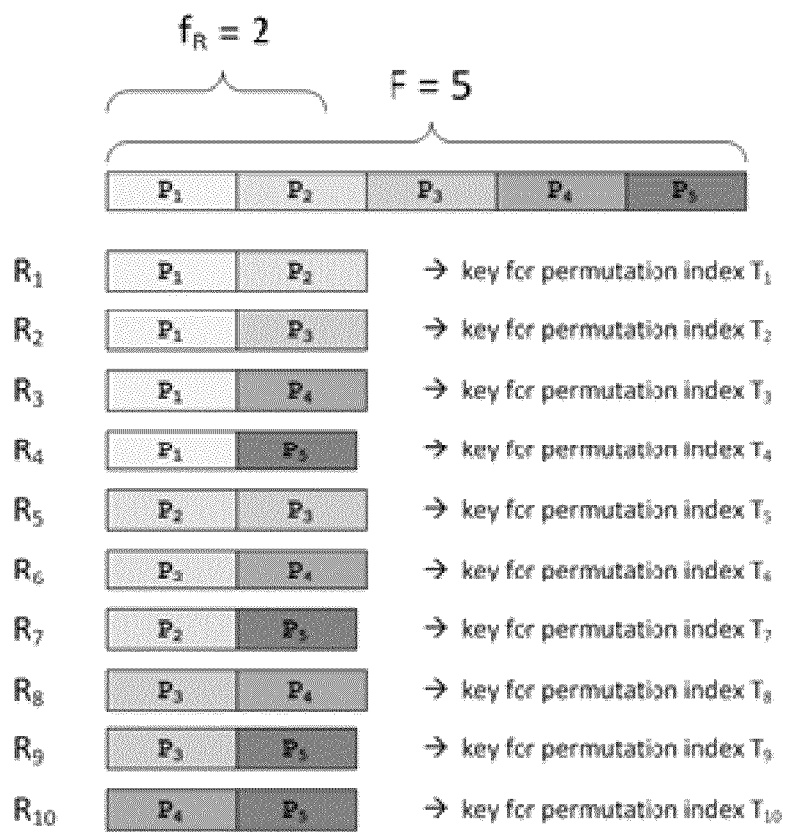
FIG. 15 is a data structure diagram illustrating a set of permutation indices.

In some embodiments, the number F of fragments $V_{fp}$ in is a configurable parameter, as is the number $f_R$ of fragments per significant region $R_i$. All $R_i$ may contain the same number of fragments, and the number of bits in $R_i$ may vary slightly since not all $P_j$ are necessarily the same width. This is illustrated below in FIG. 15 for F=5, $f_R$=2. In these embodiments, the number of lookup tables (N) required for full index coverage varies with F and $f_R$ according to Equation 10:

$$N = Comb(F, f_R) = \binom{F}{f_R} = \frac{F!}{f_R!(F-f_R)!} \quad (10)$$

For example, a configuration dividing $V_{fp}$ into F=4 fragments and using $f_R$=1 fragment per significant region requires N=Comb(4,1)=4 lookup tables. A larger configuration dividing $V_{fp}$ into F=5 fragments and using $f_R$=2 fragments per significant region, as seen above, requires N=Comb(5,2)=10 lookup tables. As referred to herein, (F, $f_R$) denotes a particular configuration of fragments and regions per fragment.

It is appreciated that one of the benefits of larger sets of tables are increased robustness towards changes in input vector $V_{int}$ and increased lookup performance per table. Downsides may include larger memory footprint and higher CPU demands to perform simultaneous lookup across all tables. It is also appreciated that as long as bit-variations between two fingerprints are isolated to no more than F-$f_R$ fragments at least one identical significant region exists for the two fingerprints, resulting in a match in at least one of the tables.

Generating Fingerprints

Figure 16:
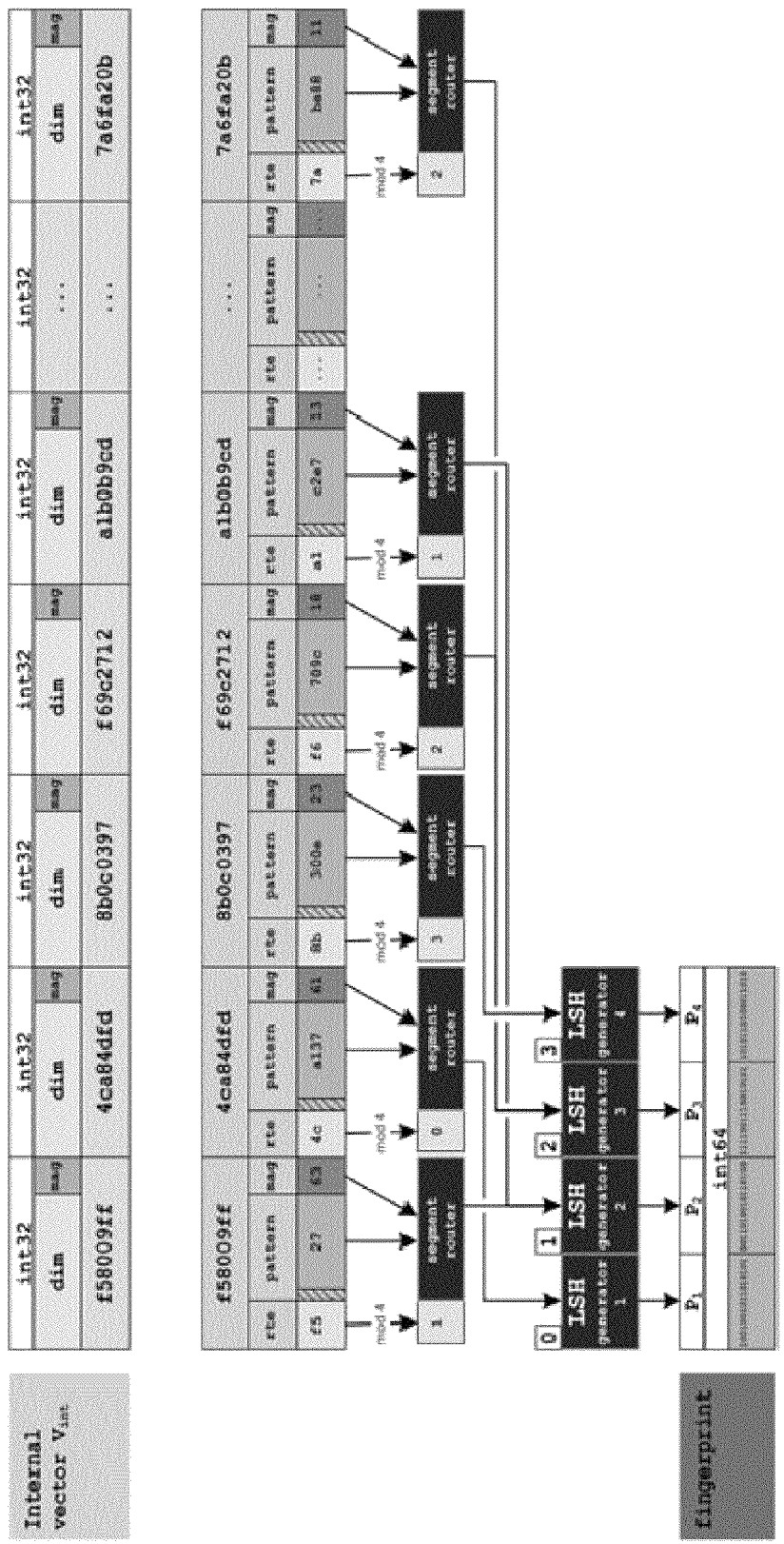
FIG. 16 is a sequence diagram illustrating a fingerprint generation process.
Figure 17:
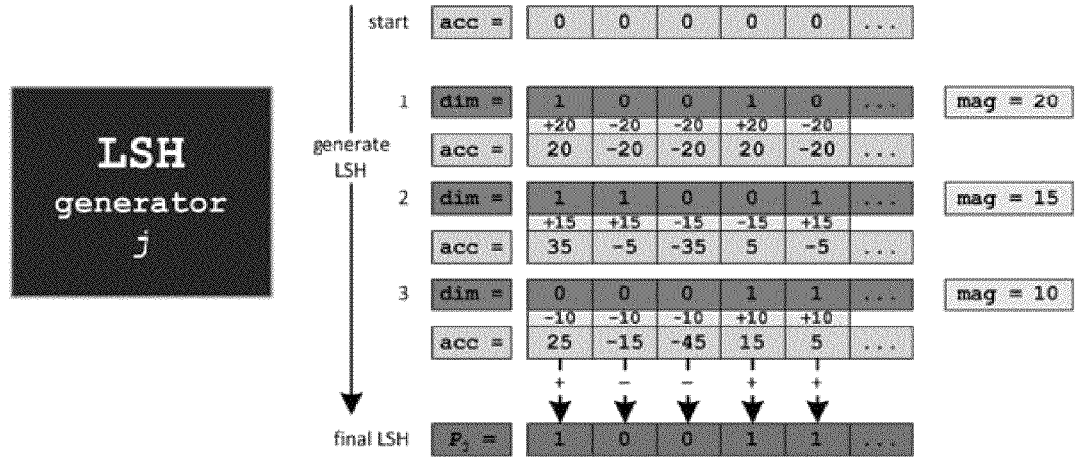
FIG. 17 is a sequence diagram illustrating a LSH generation process.
Figure 40:
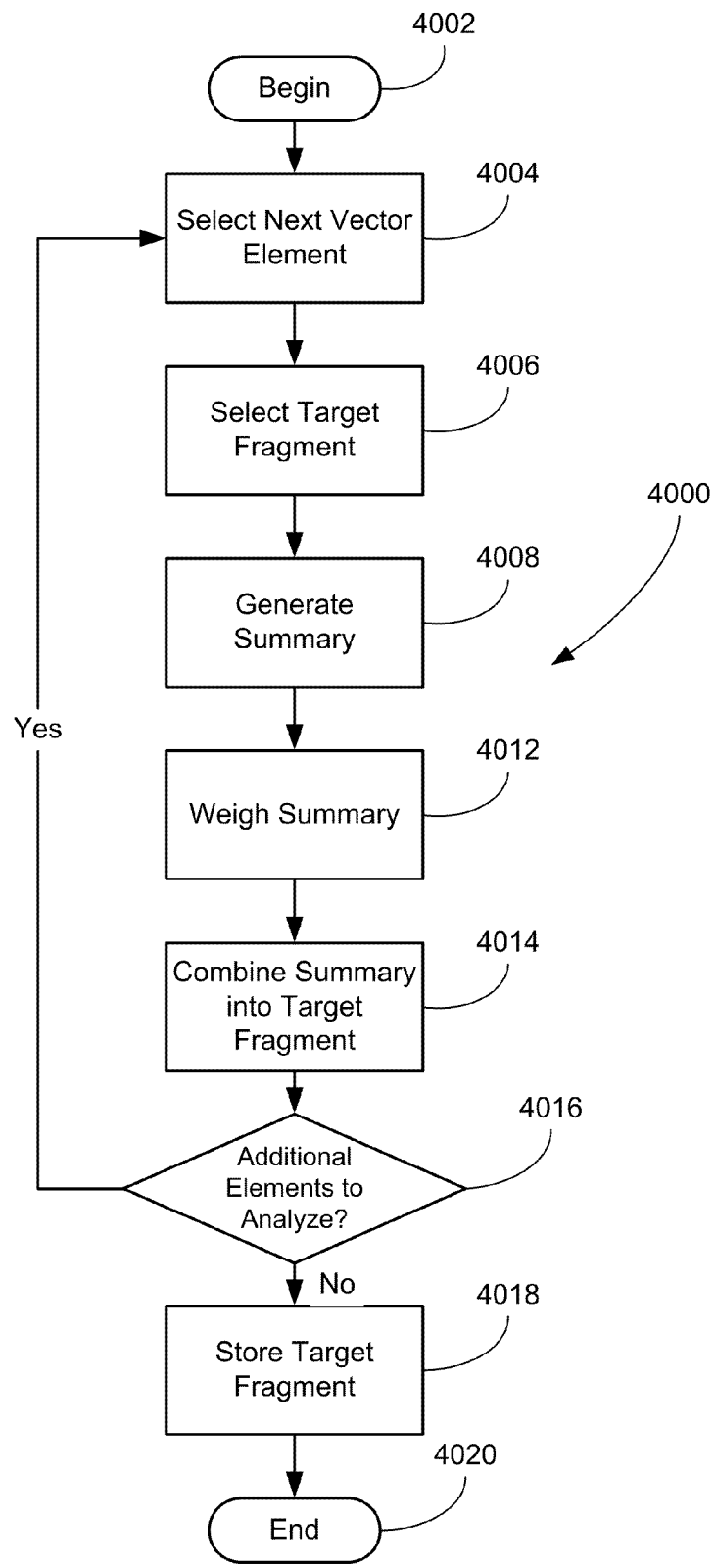
FIG. 40 is a flow diagram illustrating a fingerprint generation process.
Figure 41:
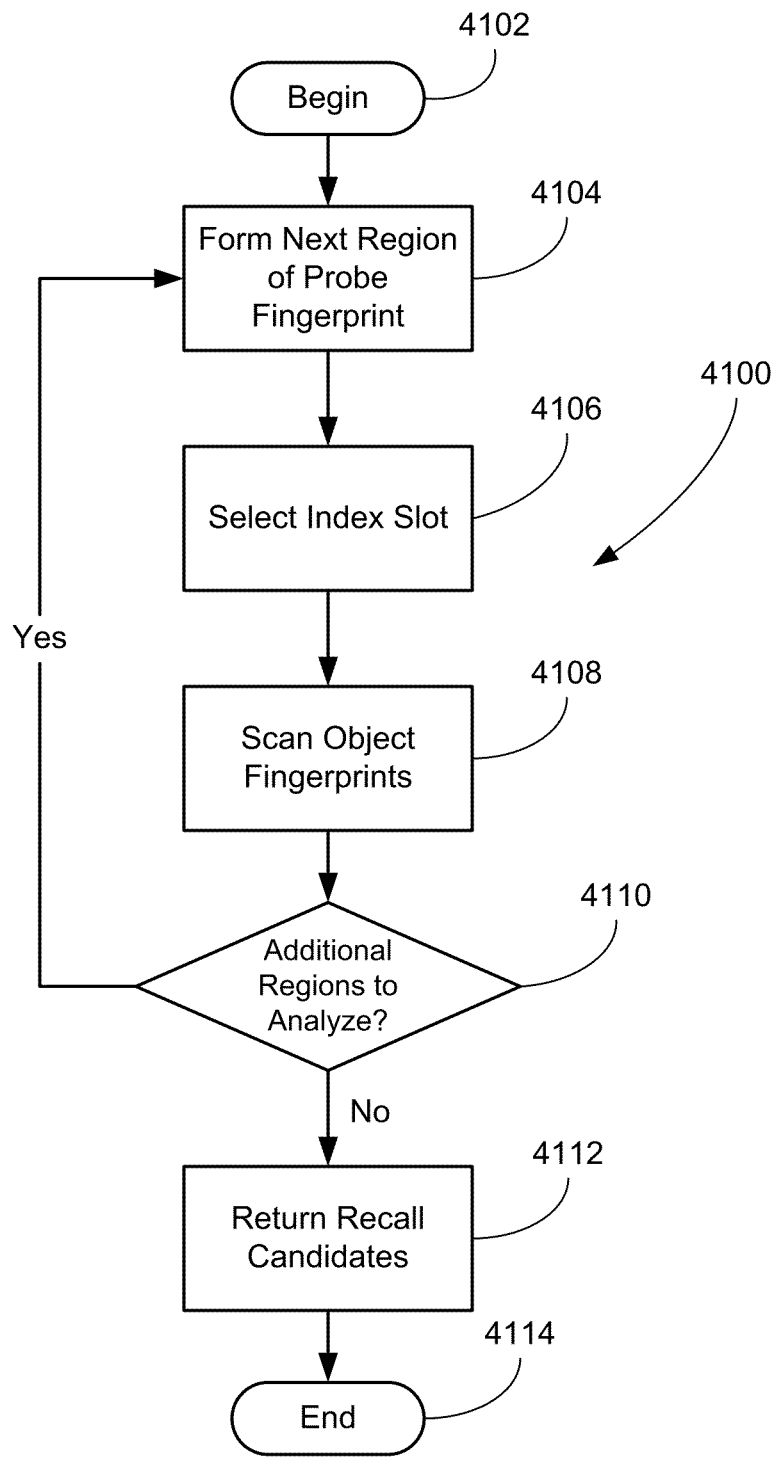
FIG. 41 a flow diagram illustrating a similarity recall process.

In some embodiments, the object manager is configured to generate one or more fragments of a fingerprint $V_{fp}$ of an internal vector $V_{int}$ by executing a fingerprint generation process 4000 illustrated by FIGS. 16-17 and 40. The internal vector $V_{int}$ is shown at the top of FIG. 16.

With brief regard to FIG. 40, a flow diagram illustrating a fingerprint generation process is shown. The fingerprint generation process 4000 is configured to generate fingerprints having 4 fragments, although embodiments disclosed herein are not limited to a particular number of fragments. An example fingerprint is shown generally at the bottom of FIG. 16. As shown in FIG. 40, the fingerprint generation process 4000 includes acts of selecting a next, unprocessed element of the internal vector, selecting a target fragment of the fingerprint being generated, generating a summary of dimension information within the selected element, weighting the summary, combining the summary with previous summaries, determining whether additional, unprocessed elements of the internal vector exist, and storing the combined summary as the target fragment. The fingerprint generation process 4000 begins in 4002.

In act 4004, a next, unprocessed element of the internal vector is selected. In act 4006, a target fragment of the fingerprint being generated is selected. In one embodiment, the object manager selects the target fragment by analyzing dimension information stored in the selected element. FIG. 16 illustrates the process for transforming $V_{int}$ to $V_{fp}$ using different parts of $dim_n$ as 1) a bit pattern for LSH generation and 2) fragment routing. For example, the object manager may use the upper 8 bits of the dimension $dim_n$ to select a fragment $P_j$ of $V_{fp}$ to be affected by the lower bits b of $dim_n$. In this example, fragment selection is computed as j=1+$Upper_8$ ($dim_n$) mod F. The resulting bit pattern $P_j$ may be computed, in one example, using a cumulative hashing function that combines the individual bit patterns, weighted by $mag_n$, from all $Lower_b(dim_n)$.

In act 4008, a summary of the selected element is generated. In one embodiment, the object manager generates the summary by calculating a hash value of dimension information stored in the selected element. For example, the object manager may calculate a hash value for the lower b bits of $dim_n$, where b equals the number of bits in the target fragment.

In act 4012, the summary is weighted. In one embodiment, the object manager weights the summary according to the magnitude stored in the selected element. For example, the object manager may calculate a weighting factor as a percentage of a maximum magnitude represent by the stored magnitude of the selected element. In act 4014, the weighted summary is combined with previous weighted summaries. The acts 4012 and 4014 are illustrated within FIG. 16. In act 4016, it is determined whether additional, unprocessed elements of the internal vector exist. If so, the fingerprint generation process returns to the act 4004. Otherwise, the fingerprint generation stores the combined weighted summaries as the target fragment (any of $P_1$-$P_4$ in FIG. 16) in act 4018. The fingerprint generation process 4000 ends at 4020.

FIG. 17 illustrates an example of acts 4004 through 4016. According to FIG. 17, an LSH generator executed by the object manager determines a final bit pattern by bit-wise "voting" of the individual bit patterns from all contributing vector dimensions, where the weight of each individual "vote" is equal to the vector element's magnitude. In the example illustrated in FIG. 17 example, three vector elements {(10010,20), (11001,15), (00011,10)} are combined to form the final pattern 10011. Also note, if the third vector element were 11111 instead of 00011 the final pattern would be 11011 instead of 10011 (i.e., a single bit difference in LSH value as a result of a different vector element).

Figure 18:
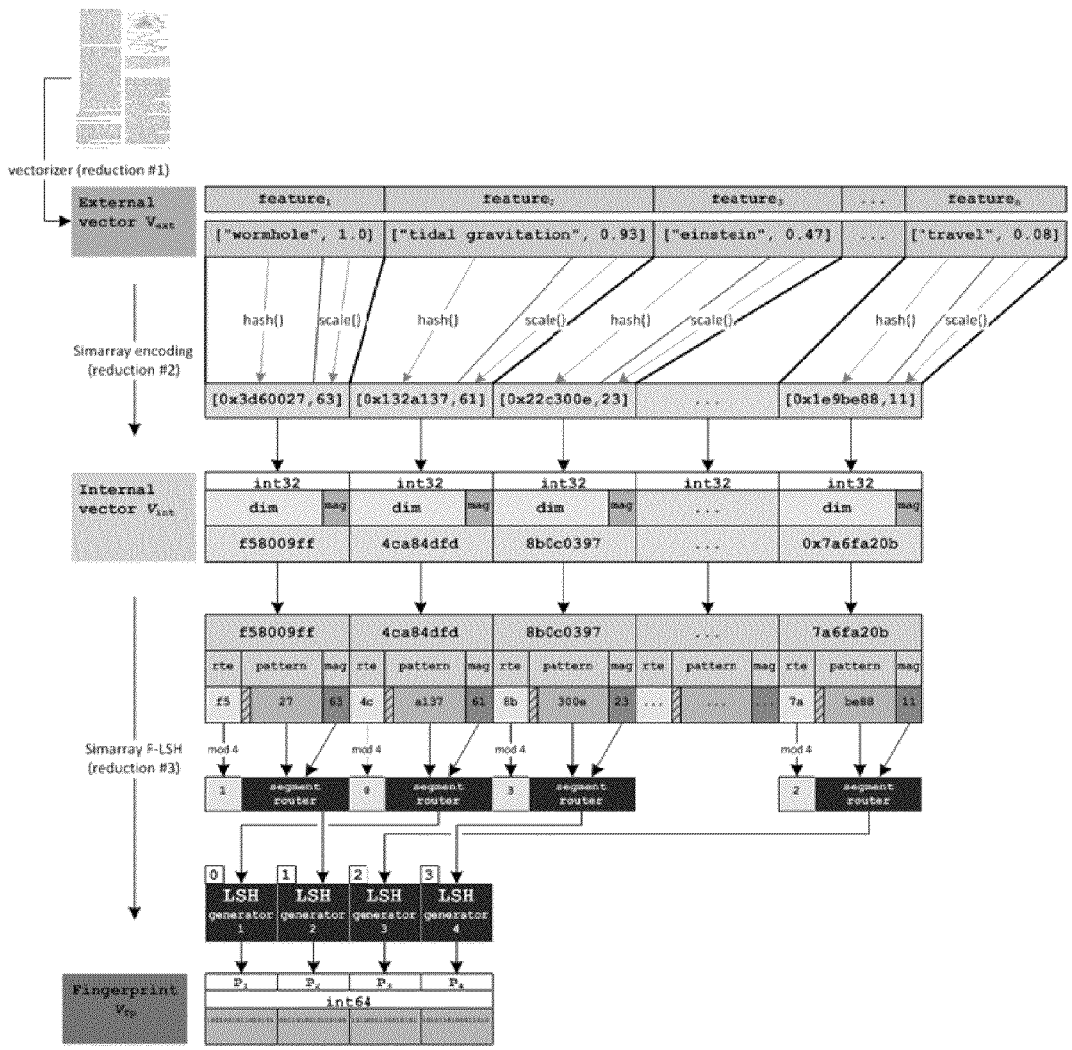
FIG. 18 is a sequence diagram illustrating a data reduction process.

FIG. 18 summarizes the transformation from original object through the three phases of dimensionality reduction implemented within the object network modeler 202.

Similarity Matching

In some embodiments, the object manager implicitly associates objects as a function of the similarity of vectors associated with the objects. According to various embodiments, the decision to link two objects based on similarity can configured using a variety of configurable parameters including dynamic thresholds and a mix of rules. The rules may analyze characteristics of the potentially matching objects such as their attributes, their rank, cardinality, cluster size, cluster spread, using dynamic thresholds, etc. In one embodiment, the object manager is configured to link objects where Inequality 11 is satisfied:

"vectors $A$ and $B$ are similar if $Sim(A,B) \geq threshold$" (11)

As will be appreciated by those having ordinary skill in the art, the techniques and systems described herein also allow for more complex decision schemes, taking into account other attributes of the matching objects, their rank, cardinality, cluster size, cluster spread, using dynamic thresholds, etc.

FIG. 18 is a sequence diagram illustrating a data reduction process in line with the foregoing teachings. More specifically, FIG. 18 illustrates one exemplary method for transforming an object to various representations (e.g., one or more external vectors, one or more internal vectors, and a fingerprint comprising one or more fragments).

As motivation for the following discussion, a naïve approach using a standard SQL database for vector storage and lookup is considered. In this approach, objects may be represented as rows in a DB table and have a column for the original feature vector $V_{ext}$ introduced earlier. If it is desired to retrieve all rows in the DB whose vectors are similar to probe vector $Q_{ext}$, the first challenge is the SQL language itself, which does not support this sort of query directly. Accordingly, one solution could include writing a stored procedure with the necessary math, but this would necessitate doing linear table scans for every query, which is inefficient. Further, it could be possible to store the vector dimensions in separate columns or tables, add indexes, use elaborate join schemes, etc., but, ultimately, conventional, existing database technology is not optimized to perform well for this type of application on a large scale.

Accordingly, the database system and techniques described herein are designed, in part, to optimize the foregoing type of query, thus overcoming many of the above-noted constraints associated with conventional database systems. Specifically, the database system and techniques described herein are designed to achieve (1) maximum recall; (2) maximum precision; (3) minimum query latency; and (4) maximum query volume (throughput).

As referred to herein, recall (R) and precision (P) are defined through the notion of true positives (tp), false positives (fp) and false negatives (fn). Recall and precision may be respectively expressed as Equations 12 and 13:

$$\text{Precision} = P = \frac{tp}{tp + fp} \quad (12)$$

$$\text{Recall} = R = \frac{tp}{tp + fn} \quad (13)$$

As used herein, true positives (tp) are expected results to a query that are included within the result of the query. False positives (fp) are query results that are not expected results. False negatives (fn) are incorrect omissions in the query results, i.e., results that were expected, but were not returned. From the above definitions, two pathological cases are noted: 1) a query always returning everything yields 100% recall since no omissions make fn=0, and 2) a query always returning nothing yields 100% precision since zero results make fp=0 (and we consider 0/0→1.). In one example, the systems and techniques described herein are designed such that a query returns something while keeping both recall and precision as high as possible. Thus, in one example of similarity matching, "expected" may be designed as follows: If $Sim(Q, V) \geq \tau$ then we expect V to be returned from a query for Q, otherwise not.

In some embodiments, the query engine is configured to execute a query process that is divided into three (optionally four) stages. These stages include an encoding phase, a recall phase, a precision phase, and (optionally) an anti-aliasing phase. The encoding phase first converts a probe object (Q) to a feature vector $Q_{ext}$, an internal vector $Q_{int}$, and a fingerprint $Q_{fp}$. The query engine's execution of the recall phase is designed to gather as many true positive candidates as possible, as quickly as possible, while minimizing false negatives and limiting false positives. The query engine's execution of the precision phase is designed to eliminate most false positives produced during the recall phase. The query engine's execution of the anti-aliasing phase is designed to eliminate any remaining false positives produced during the precision phase.

It is appreciated that 100% recall and 100% precision may be achieved by returning all vectors in the recall phase, skipping the precision phase, and rely on the anti-aliasing phase to filter out all false positives. However, this approach fails to provide adequate performance for object networks of substantial size. Thus, in some embodiments, the query engine is configured to maximize recall and precision by utilizing the vector encoding and fingerprinting processes described above with reference to FIGS. 12, 13, 16, and 17, applied as illustrated in FIG. 18.

Figure 19:
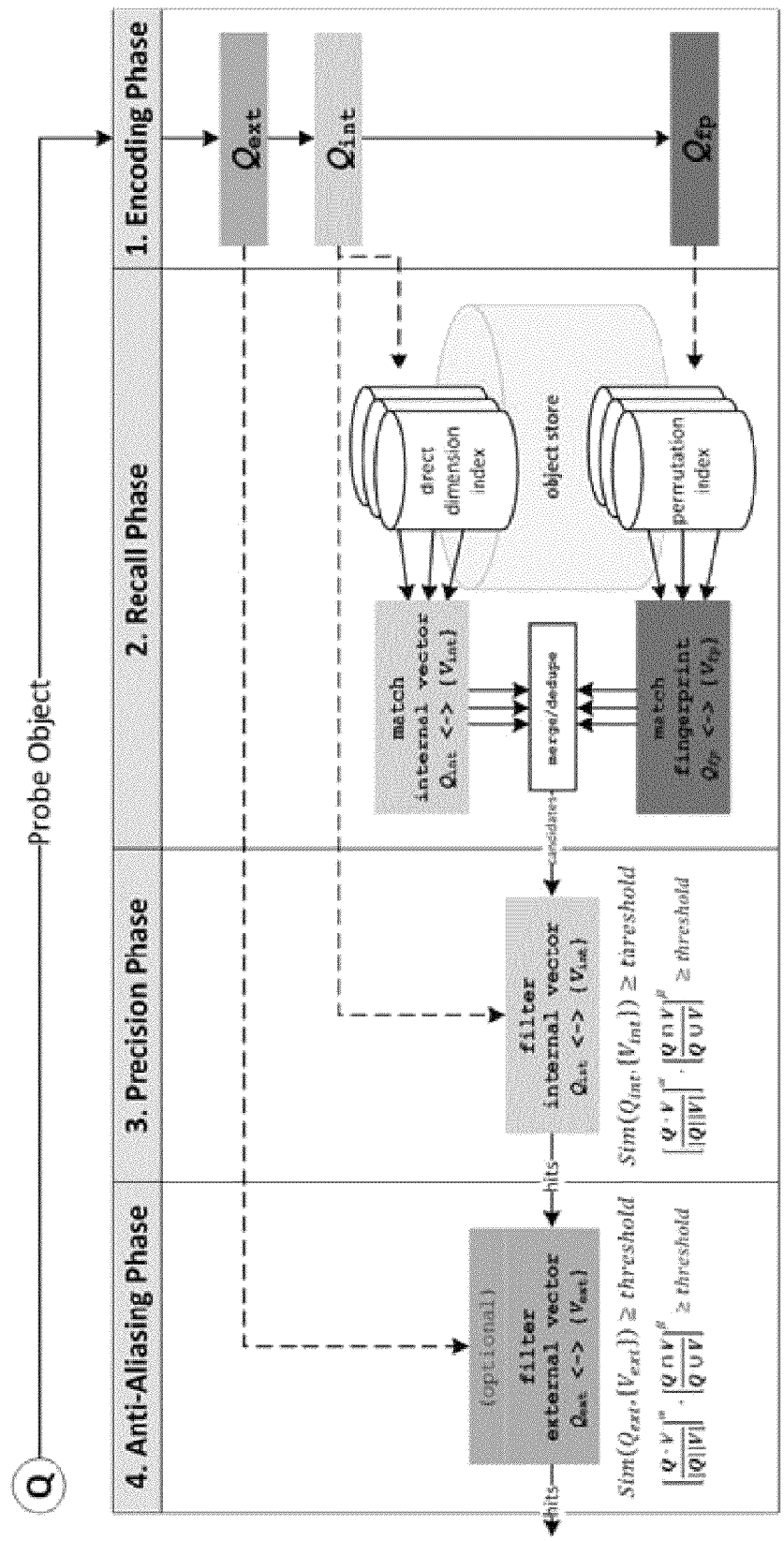
FIG. 19 is a sequence diagram illustrating a querying process.

FIG. 19 illustrates a query process that includes acts of an encoding phase 1, a recall phase 2, a precision phase 3, and an anti-aliasing phase 4. Each of these phases is described further below.

According to one embodiment, in the encoding phase 1, the query engine prepares, from Probe object (refer to as "Q" in FIG. 19), a feature vector $Q_{ext}$, an internal vector $Q_{int}$ and a fingerprint $Q_{fp}$ for use during matching and filtering. Techniques for generating external vectors, internal vectors, and fingerprints are set forth above and, thus, are not outlined in detail in this section.

Further, according to this embodiment, in the recall phase 2, the query engine matches fingerprint $Q_{fp}$ against all stored $\{V_{fp}\}$ using permutation indices for high performance and reasonably good prevention of false negatives. The query engine may also apply a hamming distance threshold for higher performance and (likely) reduction of false positives. The query engine may also match internal vector $Q_{int}$ against all stored $\{V_{int}\}$ using as many direct dimension indices as can be tolerated (i.e., using the direct dimension indices created by the index manager) while still meeting performance requirements to minimize the number of false negatives. At the end of this phase, the query engine returns a merged and de-duplicated set of candidates from all indices.

Continuing this embodiment, within the precision phase 3, the query engine applies, for all candidates $\{V_{int}\}$ returned from recall phase, vector similarity criterion $Sim(Q_{int},\{V_{int}\}) \geq \tau$ to filter out most false positives. False positives may still slip through due to dimension aliasing caused by, for example, the 26-bit hashing function and "birthday problem" discussed earlier.

Also, in this embodiment, within the optional anti-aliasing phase 4, the query engine, for all results returned from precision phase, retrieves object meta-data $\{V_{ext}\}$ and applies vector similarity criterion $Sim(Q_{ext},\{V_{ext}\}) \geq \tau$ to filter out all false positive results returned from the precision phase. This phase is not necessary unless 100% precision must be guaranteed. This phase may require $V_{ext}$ to be included as "blob" meta-data with all stored objects and may require higher storage demands, higher disk I/O, and higher query latency.

FIG. 19 illustrates operation of a query engine at a high level. The object network modeler supports query engine multi-threading, allowing several queries to be processed in parallel using many CPU (or GPU) cores simultaneously. Some components support unlimited parallel execution (no shared resources), while others that require resource locking work on sub-parts of the query "conveyor belt"-style (pipelined approach.) In some embodiments, the latter applies to the permutation and dimension indices.

Configurations with a higher number of indices benefit directly from multi-core machine architectures with high CPU count. Execution can also be scaled to multiple machines, each hosting a subset of the total set of permutation and dimension indices. A multi-machine setup benefits from allowing true simultaneous index lookup across many (or all) configured indices for the same query, at the expense of requiring an additional merge/dedupe step for candidates using a dispatcher component (not shown.)

As described above with reference to FIG. 19, embodiments disclosed herein are configured to execute a recall phase during query execution. One purpose of a recall phase is to return a set $C=\{V\}$ of candidate matches for a query Q, partially meeting the criteria $Sim(Q, V) \geq \tau$ such that false negatives are minimized and false positives are limited. The query engine references a combination of permutation indices and dimension indices to achieve this purpose. A positive match condition is defined in terms of similarity threshold such that: positive class=$Sim(Q, V) \geq \tau$ and negative class=$Sim(Q, V) < \tau$.

Figure 20:
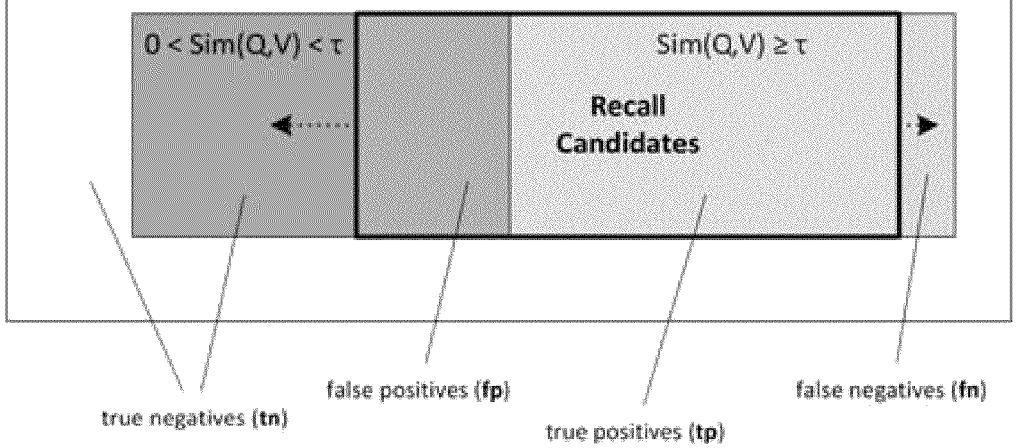
FIG. 20 is a modified Venn diagram illustrating a recall process.

FIG. 20 graphically illustrates the candidates produced in the recall phase. The nature of the query engine's recall mechanism is one of "casting a net," which means the recall candidate box in the figure is extended both to the right and left in an effort to minimize false negatives. However, the left extension into false positive territory is always much smaller than the set of true negatives, ensuring a manageable set of result candidates for the subsequent precision phase.

Figure 21:
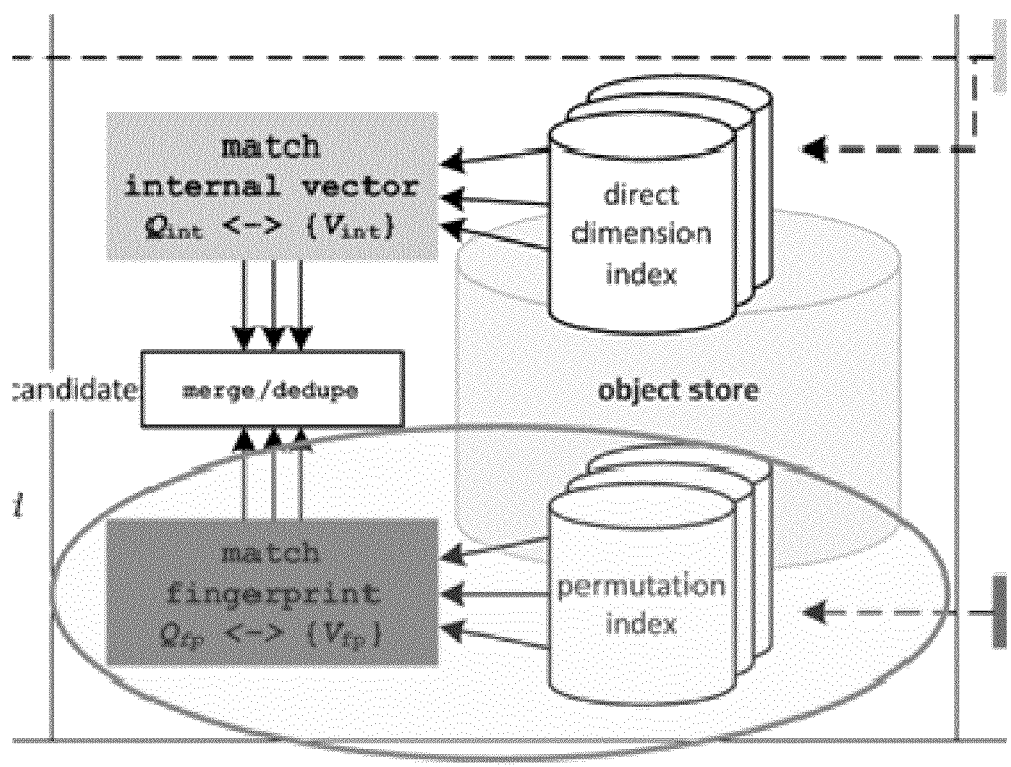
FIG. 21 is a block diagram highlighting components involved in a similarity recall process.

In some embodiments, the query engine is configured to implement quick and highly scalable object lookup by fingerprint during the query recall phase through the permutation indices, as illustrated in FIG. 21. As described above within the Fingerprinting section, for a given configuration $(F, f_R)$, the object manager generates a fingerprint divided into F fragments that are shuffled and re-combined to build indexing keys of $f_R$ fragments each. There are N different ways of combining F fragments into sets of $f_R$ fragments each, as expressed by $N=Comb(F, f_R)$. For the i-th combination, the key made up of selected subset of fragments is referred to herein as significant region $R_i$ where $i \in \{1, 2, 3, \ldots, N\}$. In some embodiments, $R_i$ is the key for permutation index $T_i$ where the full set of permutation indices is denoted as $T=\{T_1, T_2, \ldots, T_N\}$.

Figure 22:
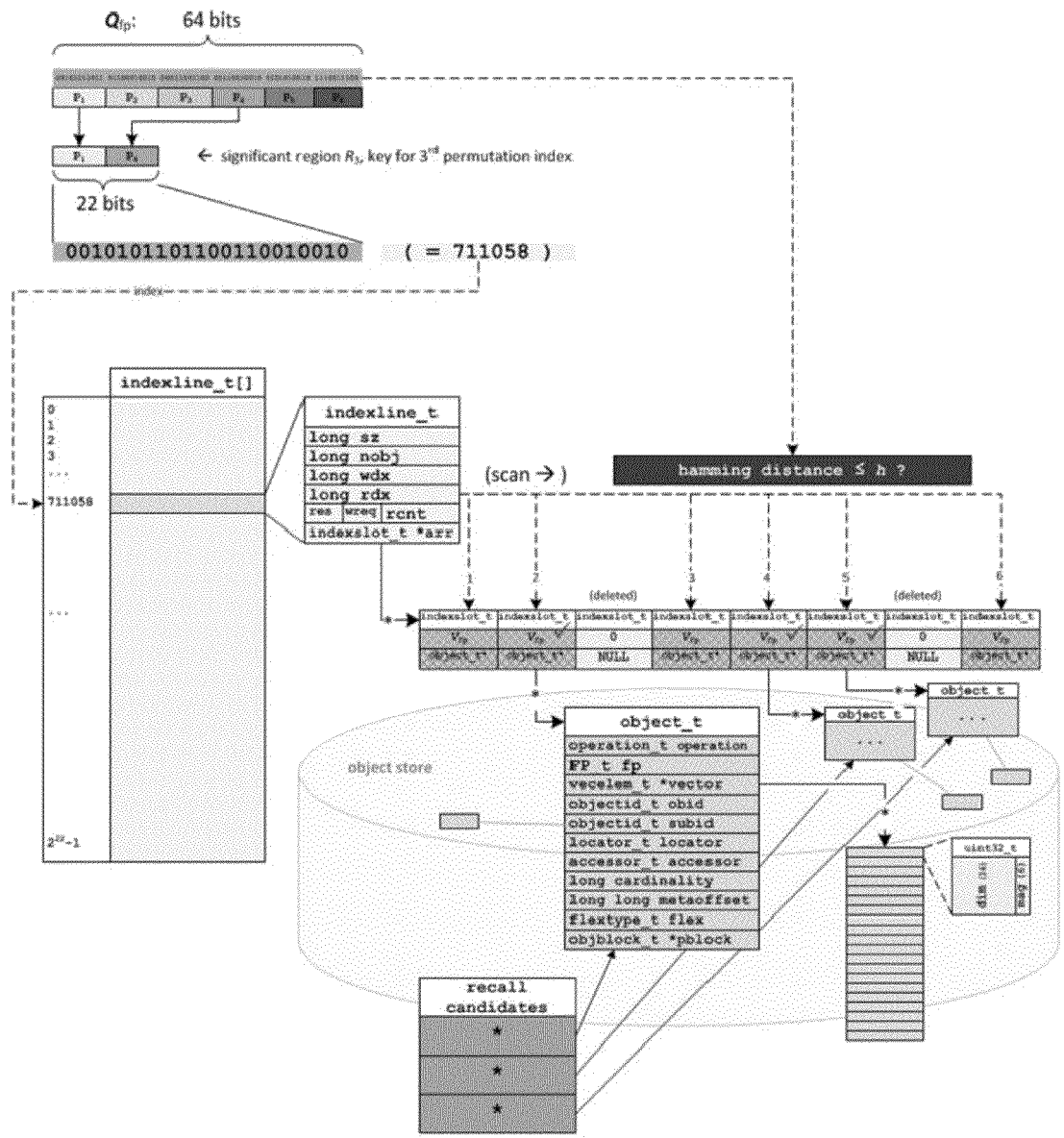
FIG. 22 is a sequence diagram illustrating a similarity recall process.
Figure 23:
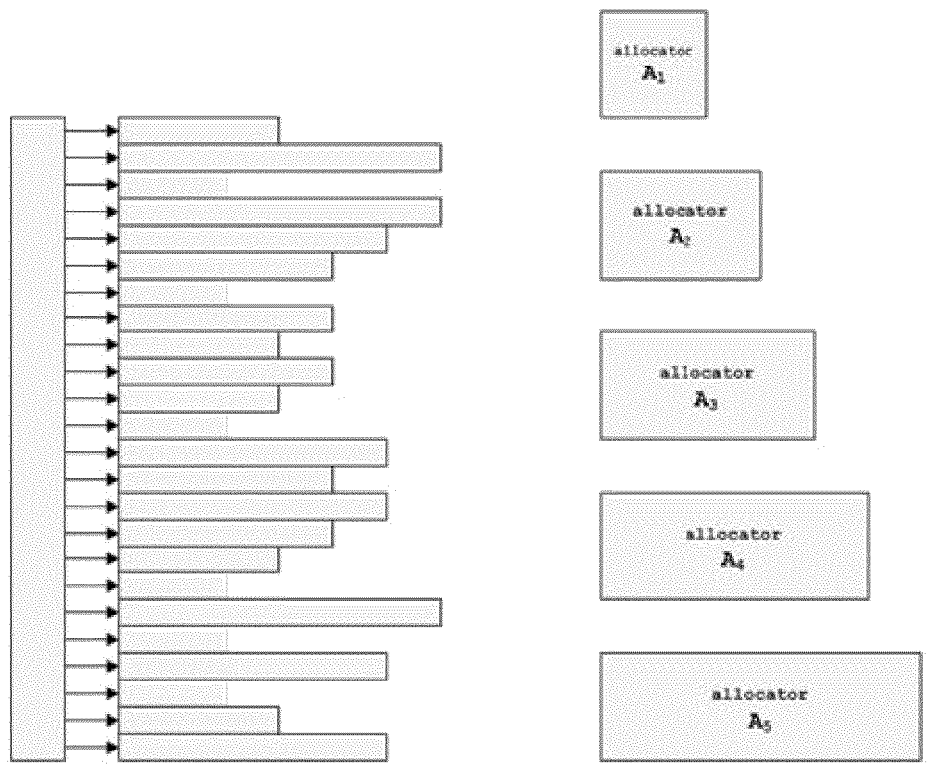
FIG. 23 is a data entity diagram illustrating vector allocators.

In some embodiments, for a similarity query, the query engine is configured to gather candidate objects during the recall phase for permutation index $T_i$ as illustrated in FIGS. 22 and 23. In these embodiments, permutation index $T_i$ is a large, but a simple hash-like structure with row-level locking, enabling simultaneous reads and writes with minimal chance of contention. All permutation indices exist in memory (RAM) at run-time.

As illustrated in FIG. 42, a recall process 4200 includes acts of forming a next region of a probe fingerprint, selecting an index slot array corresponding to the formed region, scanning object fingerprints included in the index slot array, determining whether additional, unprocessed regions of the probe fingerprint exist, and returning recall candidates. The recall process 4200 begins at 4202.

In act 4204, a next region of a probe fingerprint is formed. FIG. 22 refers to the probe fingerprint $Q_{fp}$ as and refers to the formed region as the combination of $P_1$ and $P_4$. In some embodiments, the query engine forms a significant region $R_i$ from a subset of bits of the probe object's fingerprint $Q_{fp}$. The number of bits d in $R_i$ dictates the required length $2^d$ of permutation index $T_i$. Each index line in $T_i$ is a structure containing a pointer to a variable-length index slot array, plus various book-keeping data and locks. Indexing key $R_i$ directly identifies an index line in $T_i$. Each slot in the index slot array holds a pointer to an object and that object's fingerprint $V_{fp}$ All objects in the index slot array have fingerprints $V_{fp}$ with identical significant region $R_i$.

In act 4206, an index line is selected based on the index line identified by the region formed in act 4204. This act is illustrated in FIG. 22. In one embodiment, the query engine selects the identified index line.

In act 4208, an index slot array identified by a pointer in the selected index line is scanned. This act is also illustrated in FIG. 22. In one embodiment, the query engine scans the index slot array identified by the pointer in the selected index line. The index slot array may be scanned slot by slot from beginning to end picking out slots whose fingerprint differs in at most h bit positions, i.e. hamming_distance $(Q_{fp},V_{fp}) \leq h$. The query engine adds each object with fingerprint $V_{fp}$ that is within the configured hamming distance h of $Q_{fp}$ to an array of recall candidates, thus forming the query result from the permutation index recall phase. In at least one embodiment, the objects are added as pointers within the array of recall candidates. This act is also illustrated in FIG. 22.

In act 4210, it is determined whether additional, unprocessed regions of the probe fingerprint remain. If so, the recall process 4200 returns to the act 4204. Otherwise, the recall process 4200 returns the array of recall candidate in act 4212. The recall process ends at 4214.

As shown in FIG. 22, in some embodiments, objects themselves reside in the object store. In at least one embodiment, there is only one object store per object network modeler instance (machine.) According to this embodiment, when the object network modeler is deployed across multiple machines there is one object store per machine. All indices $T' \subseteq T$ per machine share the same object store by referencing objects through pointers.

In some embodiments, the index manager maintains a copy of fingerprint $V_{fp}$ in each index slot ($V_{fp}$ also exists in the object) for computational efficiency. In these embodiments, an index slot array is a contiguous piece of memory that may be fetched from main memory only once and may fit in L1 cache for the duration of the linear scan, thereby avoiding dereferencing every object pointer to access the object's fingerprint.

In some embodiments, scanning down an index slot array is very efficient, requiring just a few instructions in a tight loop accessing fast L1 memory and registers only. In these embodiments, the query engine executes computation of hamming distance in two instructions only: bitwise XOR followed by intrinsic POPCNT, which is part of the x86 micro-architecture. Any time the query engine finds an index slot to have $V_{fp}$ within hamming distance h of $Q_{fp}$ the slot's object pointer is appended to the recall phase query result.

In some embodiments, the index engine is configured to insert a new object into permutation index $T_i$ by scanning down the index slot array until an empty slot is found ($V_{fp}=0$), or the end of the array is reached at which point the index slot array is expanded. In these embodiments, the index engine is configured to remove an object from permutation index $T_i$ by setting the object pointer to NULL and setting $V_{fp}=0$. Further, in these embodiments, the index engine is configured to shrink and defragment an index slot array when utilization falls below a certain threshold.

In some embodiments, the index manager executes specialized allocators that have been implemented to support constant, dynamic expansion and reduction of index slot arrays with maximum efficiency and minimum amount of memory fragmentation. In these embodiments, permutation index $T_i$ is structured in accord with the simplified illustration in FIG. 23, with index slot arrays of varying size residing off of the main table. The index manager exchanges an existing index slot array for a larger or smaller array by checking out a new array from the larger or smaller allocator, copying fingerprints and object pointers from the existing array to the new one, defragmenting as necessary, and then providing the old array back to its allocator for recycling.

Figure 24:
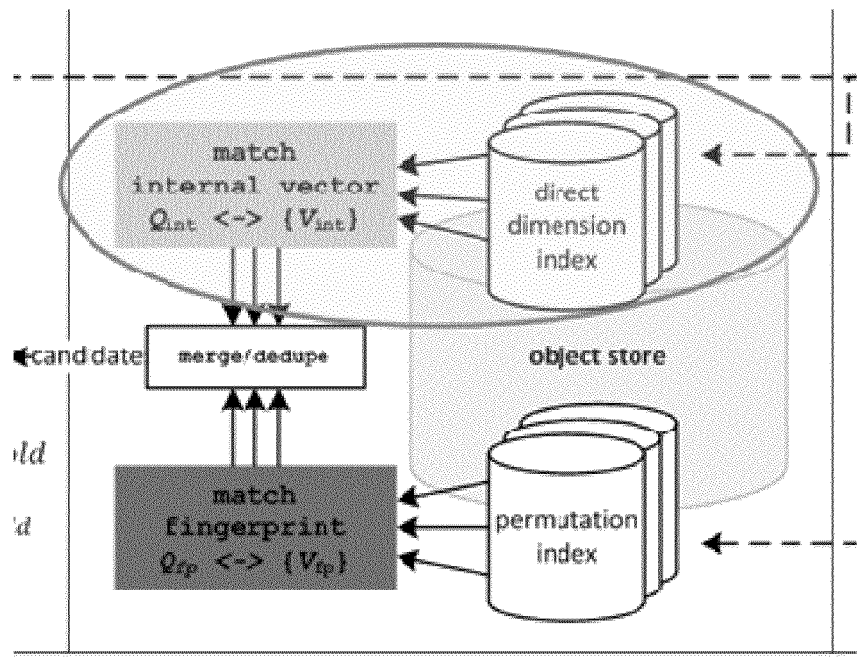
FIG. 24 is a block diagram highlighting components involved in a dimensional recall process.

In some embodiments, the query engine is configured to implement quick and highly scalable object lookup by direct dimension index during the query recall phase through the dimension indices, as illustrated in FIG. 24. In some embodiments, the direct dimension index is implemented using the same index structure as the permutation index. However, rather than processing several vector dimensions and rolling them into a fingerprint fragment as done for the permutation index, the dimension index uses individual vector dimension $dim_n$ as an indexing and lookup key.

As referred to herein, the total set of dimension indices may be expressed as $D=\{D_1, D_2, \ldots, D_N\}$. In some embodiments, the query engine identifies $V_{int}$ using dimension $dim_n$. A given object network modeler configuration may include zero or more dimension indices depending on performance needs and level of guaranteed recall required.

In general, when the index manager uses M direct dimension indices, the index manager indexes $dim_n$, $n \in \{1 \ldots M\}$ into $D_{i=n}$ $n \in \{1 \ldots M\}$. During the recall phase of a query, when the query engine matches $Q_{int}$ against $V_{int}$, the query engine compares the M first dimensions of $Q_{int}$ against the M first dimensions of $V_{int}$ meaning all, $dim_n$, $\in Q_{int}$, $n \in \{1 \ldots M\}$ are matched against $dim_n$, $\in V_{int}$, $n \in \{1 \ldots M\}$ requiring $M^2$ lookup operations. Because query execution time for direct dimension indices grows quadratically with M it is beneficial to keep M as low as possible.

For an application that requires high recall, the index manager may set M as high as needed, up to the maximum number of vector dimensions in use for $V_{int}$ for 100% recall. In some embodiments, it is therefore possible to extend the recall candidate box illustrated in FIG. 20 all the way to the right, eliminating all false negatives, albeit at a performance cost.

It is appreciated that, for a given application a, there exists a threshold $\rho_a$, such that $M > \rho_a$ yields sufficient recall. At the same time there exists a threshold $\tau_a$, such that $M < \tau_a$, yields sufficient performance. The object network modeler solves the curse of dimensionality for application a when $\rho_a < M < \tau_a$. In order to satisfy $\rho_a < M < \tau_a$ it may be necessary to deploy the object network modeler across multiple machines where each machine serves a subset $D' \subseteq D$.

Figure 25:
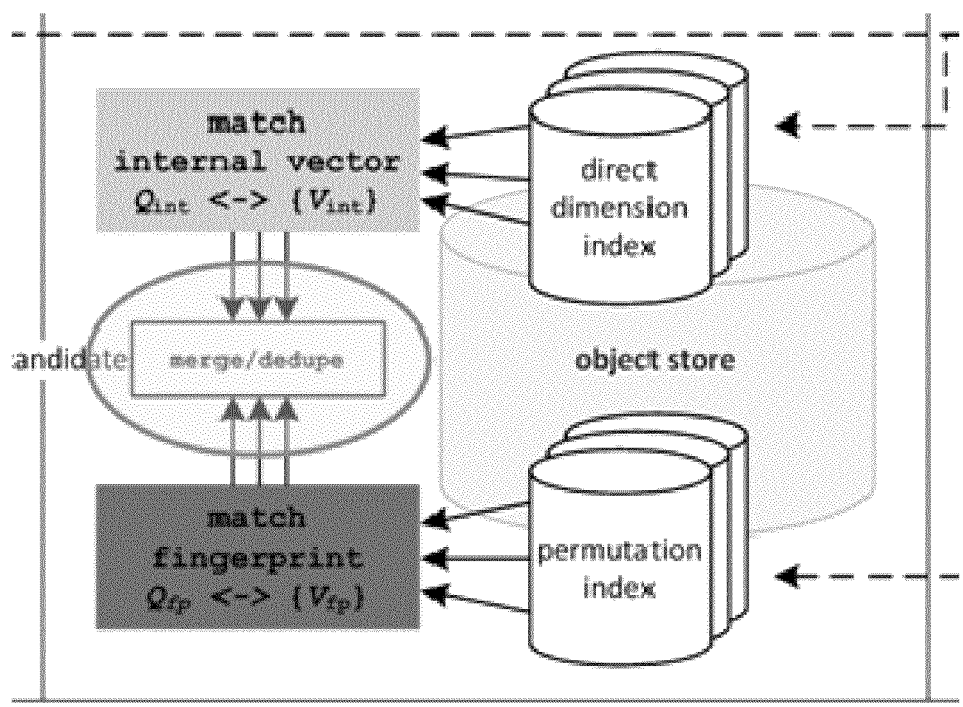
FIG. 25 is a block diagram highlighting components involved in a merge recall process.

In some embodiments, the query engine is configured to merge recall candidates indentified via the permutation and direct dimension indices, as illustrated in FIG. 25. All permutation indices $T_i \in T$ and dimension indices $D_i \in D$ provide independent indexing and lookup of all objects in the object store. As such, an object A will be indexed by different "views" (significant regions) of $V_{fp}$ into T and by different dimensions of $V_{int}$ into D. Since the query engine repeats a query Q for all T and D it is entirely possible for object A to be found in several (or all) indices. Therefore, the recall phase is not complete until the query engine merges and de-duplicates the individual sets of candidates from all indices, such that any candidate object occurs exactly once in the final set of candidates.

In some embodiments, to execute this process, the query engine is configured to traverse and place all result candidates from all indices into a de-duplication hash. Several statically allocated de-duplication hashes are available to allow multithreaded execution, and hashes exist in different sizes to accommodate any result set in the most computationally efficient manner. These embodiments keep most activity in the innermost CPU caches for the current thread while minimizing cache-invalidation for other threads. Further, in these embodiments, the query engine returns a merged and de-duplicated set of candidates as the final result of the query recall phase.

Figure 26:
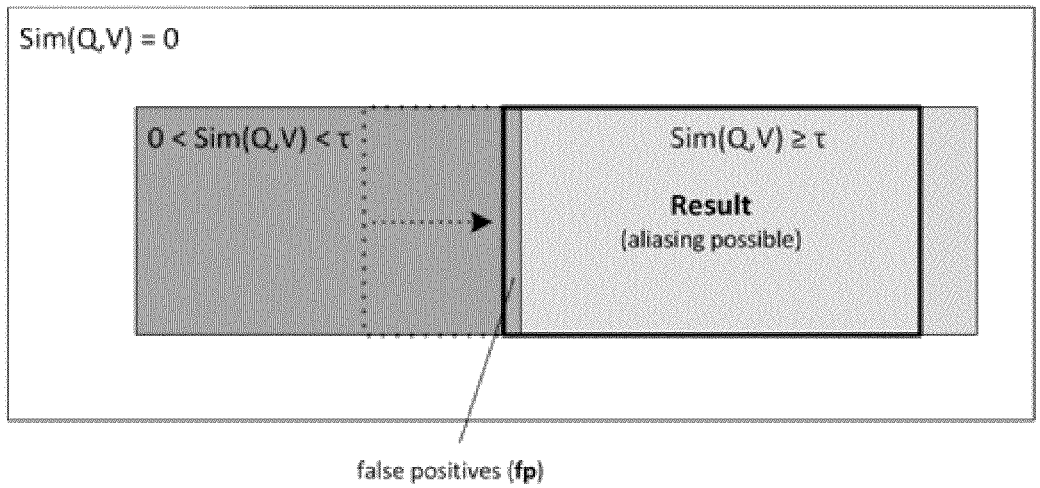
FIG. 26 is a modified Venn diagram illustrating a precision process.

As described above with reference to FIG. 19, embodiments disclosed herein are configured to execute a precision phase during query execution. In one embodiment, the query engine executes the precision phase. In this embodiment, after the recall phase has gathered as many likely similarity matches as possible, the precision phase filters out all false positives, except those masked by dimension aliasing in $V_{int}$. In some embodiments, although the query engine identifies and removes false positives by calculating Equation 11 for the probe object and each object that remains in the set of recall candidates. The precision phase, according to one embodiment, is illustrated in FIG. 26.

As described above with reference to FIG. 19, embodiments disclosed herein are configured to execute an anti-aliasing phase during query execution. In one embodiment, the query engine executes the anti-aliasing phase. It is appreciated that, due to vector dimension aliasing in $V_{int}$ as a result of 26-bit feature encoding, it is possible for false positives to be masked during the precision phase. That is to say, Sim $(Q_{int}, V_{int}) \geq \tau$ does not imply $\text{Sim}(Q_{ext}, V_{ext}) \geq \tau$. In general, dimension aliasing may be expressed as Equation 14:

$$\delta = \text{Sim}(Q_{int}, V_{int}) - \text{Sim}(Q_{ext}, V_{ext}), \tau \gg \delta > 0 \quad (14)$$

Figure 27:
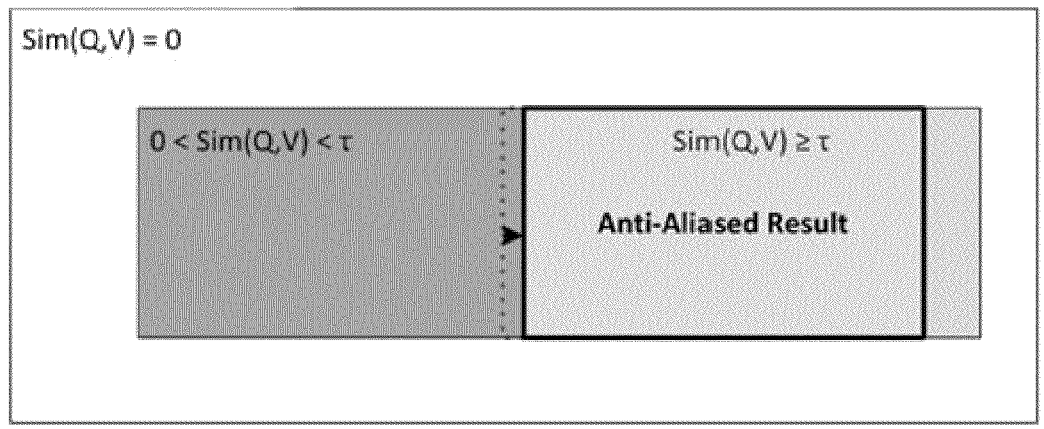
FIG. 27 is a modified Venn diagram illustrating an anti-aliasing process.

Although δ is usually small and often zero for vector comparisons, the query engine may be configured to apply the optional anti-aliasing phase before returning the final query result to an application that requires absolute precision. Anti-aliasing is performed by applying the filter $\text{Sim}(Q_{ext}, V_{ext}) \geq \tau$ to the result produced in the precision phase, as illustrated in FIG. 27. In some embodiments, the query engine requires that $V_{ext}$ be included as object meta-data to enable anti-aliasing.

Formalized Summary of Query Execution

To formally summarize, query execution according to at least one embodiment, let V denote the full set of indexed vectors and let C denote the set of candidates produced in the recall phase using permutation indices and dimension indices. Further, let $S_\tau$ denote the actual set of vectors whose similarity to query $Q_{int}$ is greater than or equal to τ, i.e. the positive class, as described in Equation 15:

$$S_\tau = \{V_{int} \in V | \text{Sim}(Q_{int}, V_{int}) \geq \tau\} \quad (15)$$

For a given permutation index $T = \{T_1, T_2, \ldots, T_N\}$ configured as $(F, f_R)$ there exists a minimal similarity threshold γ such that when applied in the context of query $Q_{int}$ will not result in any false negatives. Differences between any $V_{int}$ and $Q_{int}$ in the positive set $S_\gamma$ are thus small enough to guarantee at least one significant region $R_i$ be left intact between any $V_{fp}$ and $Q_{fp}$.

$$\exists \gamma : C \supseteq S_\gamma \quad (16)$$

There also exists a smaller similarity threshold γ–δ such that when applied in the context of query $Q_{int}$ will always result in false negatives. Differences between some $V_{int}$ and $Q_{int}$ in the expanded positive set $S_{\gamma-\delta}$ are now large enough to cause alterations in all significant regions $R_{i \in (0 \ldots N)}$ between $V_{fp}$ and $Q_{fp}$ thus making $V_{fp}$ irretrievable in any table $T_n$.

$$\exists \delta : S_{\gamma-\delta} \supset S_\gamma \Rightarrow CS_{\gamma-\delta} \quad (17)$$

Figure 28:
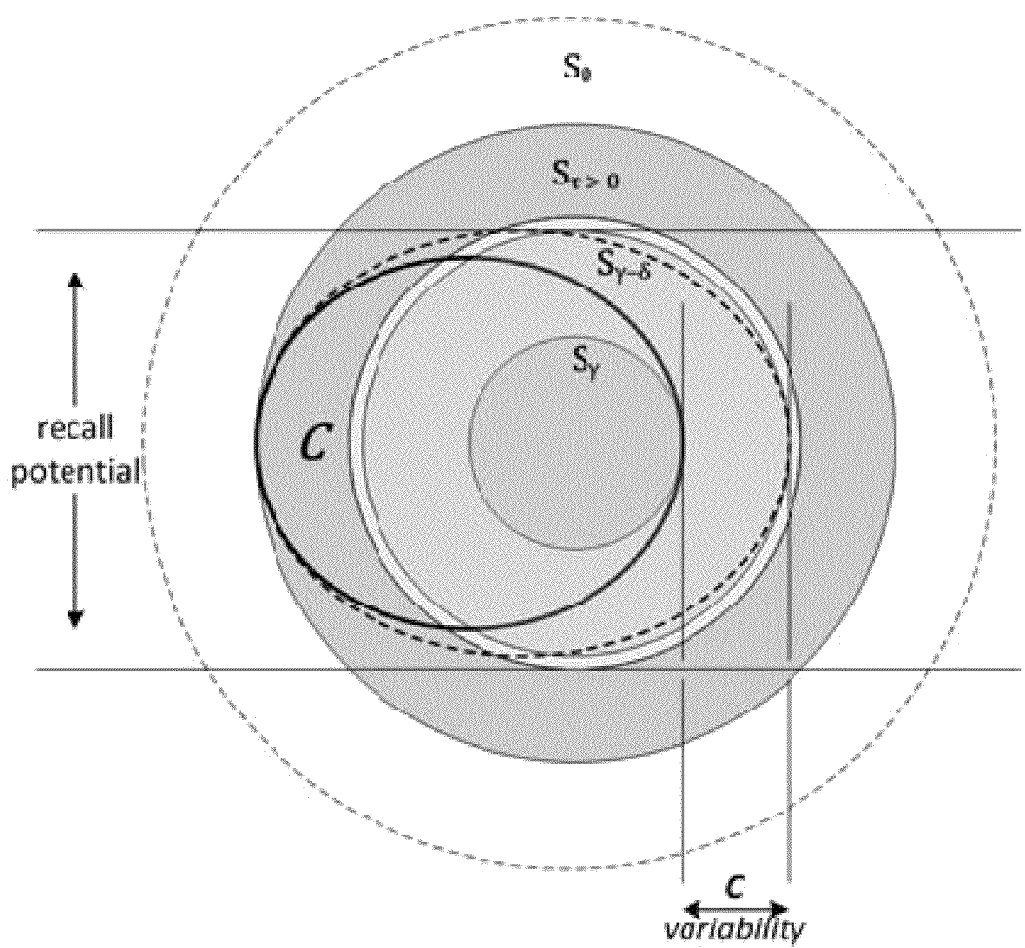
FIG. 28 is Venn diagram of query accuracy in view of varying system configurations.

These concepts are illustrated in FIG. 28. When we set our expectation for query $Q_{int}$ to return vectors with similarity $\tau \geq \gamma$, we are able to capture the entire set $S_\gamma$ within recall candidates C. Different queries have slightly different recall characteristics for the same configuration, indicated by "C variability" between the solid and dotted boundaries for C, which is capable of moving horizontally while staying within a "recall potential."

When we raise our expectations by lowering the similarity threshold to $\tau < \gamma$, we see that parts of the positive class (second solid concentric circle from the center) may fall inside C and other parts of the positive class may fall outside for varying extents of C within the recall potential. False negatives occur from time to time with probability slightly above zero when τ falls just below γ, and probability slightly below one as $\tau \to \gamma - \delta$.

As we further raise our recall expectation by lowering the similarity threshold to $\tau < \gamma - \delta$, we notice that $S_{\gamma-\delta}$ marks the boundary for the positive class at which query results without false negatives are possible. Going beyond $S_{\gamma-\delta}$ as with $\tau < \gamma - \delta$ we realize that all query results will suffer from false negatives.

The value of δ depends on the nature of indexed vectors V and typically varies from query to query. Let $P(fn|Q_{int}, V)$ denote the probability of false negatives given query $Q_{int}$ against a particular set of vectors V. Then $\tau \geq \gamma$ guarantees zero false negatives and $\tau < \gamma - \delta$ guarantees one or more false negatives. In the space between γ and γ–δ it is possible, but not certain, for a query to suffer from false negatives.

$$P(fn | Q_{int}, V) = \begin{cases} 0, & \tau \geq \gamma \\ \lambda(\tau), & \gamma > \tau > \gamma - \delta \\ 1, & \tau < \gamma - \delta \end{cases} \quad (18)$$

The value of function $\lambda(\tau)$ is close to 0 for $\tau \approx \gamma$ and close to 1 for $\tau \approx \gamma - \delta$.

As an example, again referring back to FIG. 28, if γ=0.9 and δ=0.7, then a query $Q_{int}$, against V will never return false negatives as long as we ask for matches with similarity 0.9 or higher, that is $\tau \geq 0.9$. (The innermost circle is always contained with C.) If we broaden our matching criteria and ask for matches with τ=0.0 we may not have 100% recall, i.e. false negatives are possible. An even broader query with τ=0.7 has a higher probability of false negatives, and so on. (We are now in λ(r) territory outside the innermost circle.) Finally, a query with similarity threshold τ=0.9–0.7=0.2 or smaller will always suffer from false negatives.

To meet the primary objective of minimizing false negatives in the recall phase, we must minimize γ, maximize δ, and make λ(τ) maximally convex (tending towards 1 as late as possible.) In practice it may be hard to quantify γ, δ and λ(τ) analytically. Due to their dependence on query $Q_{int}$ and nature of indexed vectors V it does not make sense to define them in terms of absolute values. However, they allow certain qualitative statements to be made regarding the use of permutation indexing and dimension indexing to achieve an overall objective.

We can control γ directly, and δ indirectly through the choice of $(F, f_R)$ for permutation index T. In general, by increasing the number of fragments F in the fingerprint $V_{fp}$, we make each fragment smaller and, therefore, less likely to be affected by F-LSH bit-alteration. At the same time, by increasing the number of fragments $f_R$ per significant region, we ensure $R_i$ contain enough bits for efficient lookup (i.e. the length of the average index slot array requiring linear scan is minimized) As a result of making $V_{fp}$ more robust, we reduce γ, i.e., we can specify a smaller similarity threshold without running a risk of false negatives. However, although δ and λ(r) are improved indirectly, they are not the primary target when expanding the permutation index.

Instead, we can control δ and λ(r) by expanding dimension index $D = \{D_1, D_2, \ldots D_N\}$. In general, by indexing more dimensions of $V_{int}$, we ensure a larger portion of S, becomes findable by query $Q_{int}$, thus increasing δ, i.e. portions of S, that are masked from permutation index T due to bit-alteration in all significant regions now become visible since individual vector dimensions are directly indexed. By ensuring the most highly weighted dimensions are the ones indexed in D (and queried for), we make λ(τ) maximally convex. Clearly, expanding the dimension index also positively affects γ, but usually at a higher cost than using the permutation index. Therefore, the primary purpose of the dimension index is to control δ and λ(τ).

We also note that permutation index T can grow very large due to Comb $(F, f_R)$ requiring more parallel computation and memory resources to achieve lower γ with high query performance. The same recall characteristics may also be achievable though dimension index D alone at a lower resource (hardware) cost, but with inferior query performance. In the extreme, we may deploy dimension index D only, with the number of indexed dimensions M equal to the number of dimensions in $V_{int}$. This configuration obviously has superior recall characteristics ($\gamma \to 0$), but is also extremely inefficient unless the number of configured dimensions for $V_{int}$ is small. (For systems with small $V_{int}$, indexing exclusively via D may indeed be the optimal solution.)

Choosing an appropriate configuration is a matter of balancing the size N of T via (F, $f_R$) with the size of D via M. An informed choice should be made taking into account maximum acceptable query latency and hardware costs, the overall impact of false negatives on the application, the acceptable probability of false negatives and, importantly, the degree of fuzzy matching required. The latter is important because if a fuzzy matching application needs to operate at, for instance, $\tau \geq 0.9$ with guaranteed recall, the cost of achieving $\gamma = 0.9$ is much smaller than that of achieving, say $\gamma = 0.5$. Furthermore, if the application can operate adequately without guaranteed recall the implementation is simpler yet.

Achieving high precision is a matter of applying the appropriate filter function to C. Since we have access to $V_{int}$ as part of the objects returned in C we can apply $Sim(Q_{int}, V_{int})$ directly to C to obtain the high-precision result $R_a$.

$$R_a = \{V_{int} \in C | Sim(Q_{int}, V_{int}) \geq \tau\} \quad (19)$$

In general we expect $R_a$ to contain false positives at a non-zero, but very small probability due to feature aliasing when encoding $V_{int}$ from $V_{ext}$. To obtain the result R without false positives under any circumstance we apply another filter function to $R_a$ $$R = \{V_{ext} \in R_a | Sim(Q_{ext}, V_{ext}) \geq \tau\} \quad (20)$$

Note that extracting $V_{ext}$ from aliased result $R_a$ involves a secondary lookup mechanism using the meta-store. Extracting $V_{ext}$ from $R_a$ is resource intensive because $V_{ext}$ must be retrieved from disk, whereas $V_{int}$ is readily available since V resides in memory. As such, retrieving $V_{ext}$ is likely to be much more expensive than the actual application of filter $Sim(Q_{ext}, V_{ext}) \geq \tau$.

Architecture Overview and Data Structures

The object network modeler described herein makes aggressive use of memory for object association and similarity matching. To achieve high performance, all indexes may exist entirely in memory as hybrid hash/linear lookup tables, with on-demand disk flushing to speed up initialization upon future system startup. All components of the object network modeler are created with the assumption, in one example, of a 64-bit target platform and enterprise-grade server capacities. (The required amount of memory is also quickly becoming available in consumer-grade hardware.).

In some embodiments, the object store 214 stores information descriptive of objects within an object network. Examples of this information include object attributes, vectors, and meta-data. In these embodiments, the object store 214 resides in memory using disk mirroring for durability. In other embodiments, the object store 214 resides in both volatile and non-volatile memory, and thus is not limited to a particular type of memory. For example, the meta-store component may reside on disk only. In some embodiments, the object network modeler 202 is configured to synchronize the in-memory object store 214 and its disk-based shadow copy using data write-through techniques. In these embodiments, the object store 214 is optimized for performance using commit logs and streamed disk caching of operation batches.

According to some embodiments, a minimal deployment of the object network modeler includes the object store 214, the object index and the reverse index. Each of these components is described in detail below.

Figure 29:
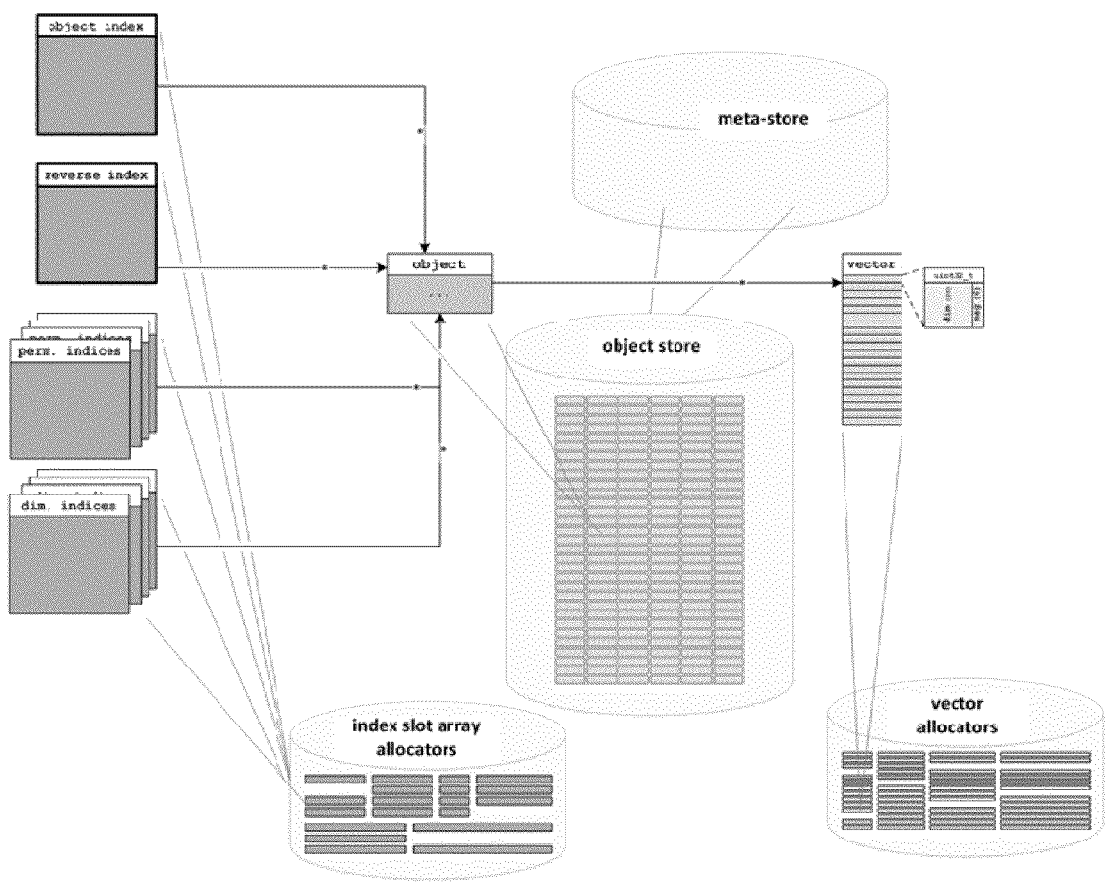
FIG. 29 is a data entity diagram illustrating connections between data components in the system.

FIG. 29 illustrates the data components utilized by an object network modeler, such as the object network modeler 202 described above with reference to FIG. 2, according to some embodiments. As shown, the data components in FIG. 29 include an object index, a reverse index, one or more permutation indices, one or more dimension indices, an object store, a plurality of index slot array allocators, and a plurality of vector allocators. The object store includes one or more objects and a meta-store. The one or more objects each include one or more vectors. Each of the one or more vectors includes one or more features. In some embodiments, the object index, the reverse index, the one or more permutation indices, and the one or more dimension indices correspond to the index store 216 described above with reference to FIG. 2.

Index Store

As noted above, in some embodiments, the object network modeler is configured to make aggressive use of memory for object association and similarity matching. For example, in these embodiments, the object network modeler achieves high performance by allocating all indices in memory as hybrid hash/linear lookup tables, with on-demand disk flushing to speed up initialization upon startup. In some embodiments, all components of object network modeler are configured for a 64-bit target platform and enterprise-grade server capacities, although the embodiments are not limited to a particular target platform or server.

In these embodiments, both the object index 200 and the reverse index 202 are memory-based. A deployment of the object network modeler need not be configured for similarity matching, in which case the implicit object association feature is unavailable. However, most deployment scenarios will include some form of similarity matching using the one or more permutation indices 204 or the one or more direct dimension indices 206.

Figure 30:
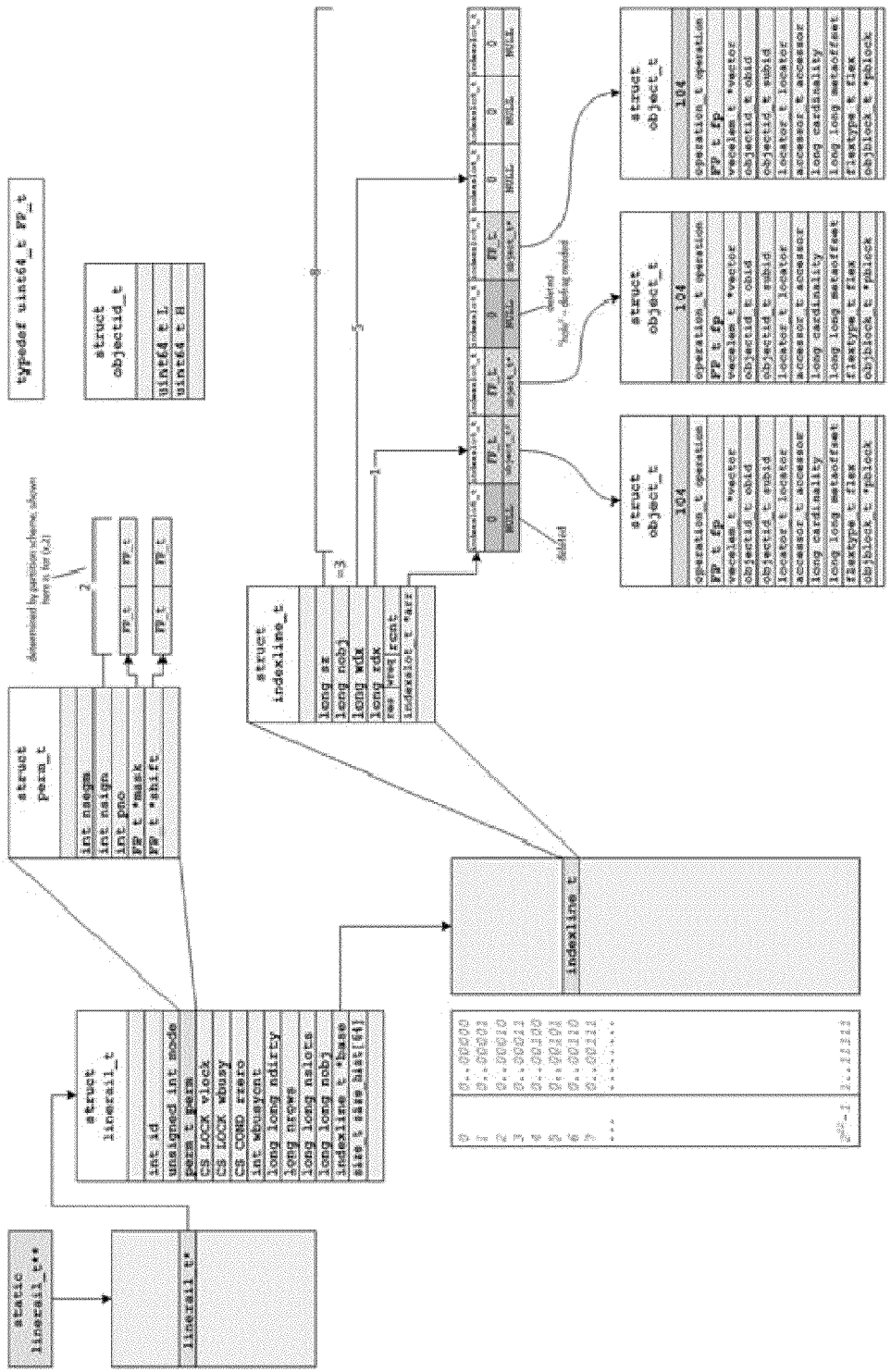
FIG. 30 is a data entity diagram illustrating connections between object store data components in the system.

In some embodiments, the object network modeler, and more particularly an index manager, such as the index manager 212 described above with reference to FIG. 2, is configured to implement an index store, such as the index store 216 described above with reference to FIG. 2, using the data structure shown in FIG. 30. In these embodiments, each index in the index store uses similar indexing and lookup mechanisms. Further, in these embodiments, the linerail structure forms the base each index in the index store. Table 2 list attributes of the linerail structure according to some embodiments:

TABLE 2

| Type | Name | Description |
|---|---|---|
| Int | id | Table identifier 0,1,2, . . . used for sets of tables (perm. and dim.) |
| simindex_mode_t | mode | Mode enumeration: permutation (1), dimension (2), object (4), reverse (8) |
| perm_t | perm | Permutation descriptor. Defines lookup key and table length. |
| CS_LOCK | vlock | State variable mutex. Brief whole-table lock for acquiring indexline lock. |
| CS_LOCK | wbusy | Exclusive write mutex for singleton semaphore per indexline |
| CS_COND | rzero | Broadcast zero indexline readers to allow write-request to proceed |
| Int | wbusycnt | Current number of threads writing or waiting to write indexline (0 or 1) |

TABLE 2-continued

| Type | Name | Description |
|---|---|---|
| long long | ndirty | Number of table operations since last flush to disk |
| Long | nrows | Length of table, depends on perm. |
| long long | nslots | Total number of index slots allocated for this table |
| long long | nobj | Total number of objects indexed in this table |
| indexline_t* | base | The indexline hash (the table) |
| size_t [64] | size_hist | Histogram for slot count in each indexline ($\log_2$ buckets) |

In these embodiments, the linerail structure provides table identification, table mode, bookkeeping, and locking support. In addition, in these embodiments, the perm attribute defines how the object network modeler forms a table lookup key from a lookup handle, which depends on the table mode.

For a permutation index the handle is the fingerprint: handle=$V_{fp}$

For a dimension index D_n the handle is the dimension: handle=$dim_n$ of $V_{int}$ For the object index the handle is the high part of OBID: handle=high64(OBID).

In some embodiments, the permutation descriptor, which is defined in Table 3 below, specifies how object network modeler components that interact with the indices, such as the index manager or the query engine identify bits within a handle and reassemble the bits into an index key mapping to one of the index records. For the permutation indices, the object network modeler components rearrange fragments of $V_{fp}$ into an index key. For other indices, the object network modeler components apply a bit-mask to their un-shuffled handles to restrict the size of the handles to match nrows for the table. For example, a table configured with nrows=$2^{22}$=4194304 will use a bit-mask of 22 LSB=1 to form the index key from the handle.

TABLE 3

| Type | Name | Description |
|---|---|---|
| int | nsegm | Number of segments (or fragments) to split handle into for rearrangement |
| int | nsign | Number of significant regions, i.e. handle fragments to use for the index key |
| int | pno | Permutation partition number 0,1,2, . . . used by permutation function |
| FP_t* | mask | List of bit-masks used by permutation function, size = nsegm |
| FP_t* | shift | List of bit-shifts used by permutation function, size = nsegm |

In some embodiments, the lookup table base, which is defined in Table 4 below, is an array of indexline structures of length nrows. In these embodiments, the object network modeler components select the indexline to operate on that is indicated by the index key. Further, in these embodiments, the index manager maintains book-keeping attributes concerning the entire set of indexlines in the linerail structure and maintains the attributes held in the indexline structure, which govern the usage of an individual indexslot array. So, in these embodiments, the linerail's nobj attribute is thus the sum of the nobj attributes in all indexlines, and the linerail's nslots attribute the sum of the sz attributes in all indexlines.

TABLE 4

| Type | Name | Description |
|---|---|---|
| Long | sz | Length of the indexslot array |
| Long | nobj | Number of active objects in indexslot array |
| Long | wdx | Write index for indexslot array (next object will be written at this position) |
| Long | rdx | Read index for indexslot array (lookup operations start at this position) |
| Struct (uint32_t bit field) | res(8) | * reserved * |
| | wreq(8) | Singleton semaphore (0 or 1), number of threads writing to indexslot array |
| | rcnt(16) | Number of threads currently scanning (reading) the indexslot array |
| indexslot t* | arr | Array of indexslot containing object pointers and object handles |

In some embodiments, the object network modeler components (e.g. threads executing aspects of the object network modeler, such as the index manager or the query engine) are configured to implement table locking to allow maximum parallelism in a multi-core execution environment. Thus, in these embodiments, multiple threads are allowed to access the same linerail simultaneously. To avoid excessive resource usage, in some embodiments, the mutex and condition instances are shared for the entire linerail, while individual indexlines hold information about the particular activity currently in progress for that indexline. According to some embodiments, at any given time, indexlines can either be read from or written to, but not both. Also, in some embodiments, multiple threads can read the same indexline simultaneously, while only a single thread can write to an indexline.

In some embodiments, the object network modeler components are configured to allow read operations on indexslot array arr to proceed as long as no other thread is writing to arr or waiting to write to arr. If necessary, the object network modeler components delay a read operation until a concurrent write operation completes by first performing a fast check of wreq, and if wreq is non-zero, block on the now-locked wbusy lock. Normally wreq is zero and no blocking on wbusy is needed. Atomic access to all state variables, including the secondary wbusy lock, is ensured via vlock. When a read operation is allowed to proceed, the indexline's rent is incremented by one. Multiple readers are allowed, up to a maximum of 65535.

In some embodiments, the object network modeler components are configured to, upon completion of a read operation, decrement the indexline's rent by one. If rent reaches zero the object network modeler component detecting this condition is configured to broadcast the rzero event to other object network modeler components (e.g., another thread waiting to write), thereby notifying the waiting component that it may proceed with its operation. Atomic access to indexline's rent is ensured via linerail's vlock.

In some embodiments, the object network modeler components (such as a thread executing the index manager) are configured to allow write operations on indexslot array arr to proceed as long as no other thread is writing to arr or waiting to write to arr. If necessary, the object network modeler components delay a write operation until another concurrent write operation completes. When an object network modeler component allows a write operation to proceed, the indexline's wreq is incremented by one and the linerail's wbusycnt is also incremented by one. In one embodiment, wreq and wbusycnt are both singleton semaphores, and therefore, there can be only one simultaneous write operation per indexline and per linerail. Next the wbusy lock is acquired and the indexline's rent verified to be zero. Atomic access to all state variables is ensured via linerail's vlock. If at this point rcnt is non-zero, the writing object network modeler component (e.g., thread) is put to sleep until the last of the current readers have completed. No new read operations are allowed to proceed because the writing object network modeler component holds wbusy lock. The last thread to complete its read sets rcnt to zero and the detecting object network modeler component broadcasts the rzero event to the sleeping write object network modeler component, which then wake ups and proceeds with the write operation.

Upon completion of a write operation the writing object network modeler components decrement indexline's wreq and linerail's wbusycnt and release indexline's wbusy lock. Atomic access is ensured with linerail's vlock. At this point, the object network modeler components have released its exclusive access and all other operations in other object network modeler components may proceed.

In some embodiments, once an object network modeler component has acquired the indexline for reading, the arr indexslot array is guaranteed to remain consistent until released by the object network modeler component. In these embodiments, the object network modeler component performs lookup by scanning arr linearly starting at rdx and ending just before wdx. The object network modeler components are configured to execute a read operation as described below, depending on linerail's mode.

If the linerail's mode=PERMUTATION, the object network modeler component interprets the indexslot as a hamslot structure, which is described in Table 5 below. During performance of the read operation, the object network modeler component visits all slots in the hamslot array arr sequentially starting at rdx and ending just before wdx. If the slot's object pointer is NULL, indicating the slot has been deleted, the object network modeler component skips the slot. Otherwise the object network modeler component compares the slot's fingerprint to the probe fingerprint. If the probe fingerprint's hamming distance to the slot's fingerprint is within the configured threshold, object network modeler component appends the slot's object pointer to a result array of recall candidates.

TABLE 5

| Type | Name | Description |
| --- | --- | --- |
| FP_t | fp | 64-bit fingerprint for approximate match (within hamming distance) |
| object_t* | object | Pointer to object in the objectstore |

If the linerail's mode=DIMENSION, the object network modeler component interprets the indexslot as a dimslot structure, which is described in Table 6 below. During performance of the read operation, the object network modeler component visits all slots in the dimslot array arr sequentially starting at rdx and ending just before wdx. If the slot's object pointer is NULL, indicating the slot has been deleted, the object network modeler component skips the slot. Otherwise the object network modeler component compares the slot's dimension handle to the probe dimension handle. If the two conform to a predefined relationship (e.g. they are equal), object network modeler component appends the slot's object pointer to a result array of recall candidates.

TABLE 6

| Type | Name | Description |
| --- | --- | --- |
| uint64_t | key | Vector dimension n for the $n^{th}$ dimension index. (only 26 LSB used.) |
| object_t* | object | Pointer to object in the objectstore |

If the linerail's mode=OBID, the object network modeler component interprets the indexslot as an objslot structure, which is described in Table 7 below. During performance of the read operation, the object network modeler component visits all slots in the objslot array arr sequentially starting at rdx and ending just before wdx. If the slot's object pointer is NULL, indicating the slot has been deleted, the object network modeler component skips the slot. Otherwise, the object network modeler component executes one of the following processes:

1. If SUBID is specified in the probe (thus requesting a single object manifestation), the object network modeler component compares the objslot's object ID handle obid_H to the probe OBID's upper 64 bits. If object network modeler component determines that the two conform to a predetermined relationship (e.g. they are equal), then the objslot's object pointer object is dereferenced to compare the lower 64 bits of the OBID. If object network modeler component determines that these two conform to a predetermined relationship (e.g. they are equal), then the object pointer is dereferenced again to compare the object's SUBID to the probe's SUBID. If object network modeler component determines that these two conform to a predetermined relationship (e.g. they are equal), then a match is declared and the single hit returned in a NULL-sentinel terminated array of matching objects.
2. If SUBID is not specified in the probe, the same process as above is executed by the object network modeler component with the exception of the SUBID match. The result is a NULL-sentinel terminated array of any objects matching the probe's OBID.

TABLE 7

| Type | Name | Description |
| --- | --- | --- |
| uint64_t | obid_H | Upper 64 bits of the OBID |
| object_t* | object | Pointer to object in the objectstore |

If the linerail's mode=SUBID, the object network modeler component interprets the indexslot as an objslot structure, which is described in Table 8 below. During performance of the read operation, the object network modeler component visits all slots in the obj slot array arr sequentially starting at rdx and ending just before wdx. If the slot's object pointer is NULL, indicating the slot has been deleted, the object network modeler component skips the slot. Otherwise, the object network modeler component compares the obj slot's sub-object ID handle obid_H to the probe SUBID's upper 64 bits. If object network modeler component determines that the two conform to a predetermined relationship (e.g. they are equal), then the obj slot's object pointer object is dereferenced to compare the lower 64 bits of the SUBIDs of the object and probe. If object network modeler component determines that these two conform to a predetermined relationship (e.g. they are equal), then a match is declared and the single hit returned in a NULL-sentinel terminated array of objects matching the probe's SUBID.

TABLE 8

| Type | Name | Description |
| --- | --- | --- |
| uint64_t | obid_H | Upper 64 bits of the SUBID |
| object_t* | object | Pointer to object in the objectstore |

In some embodiments, once an object network modeler component (such as a thread executing the index manager) acquires an indexline for writing, the arr indexslot array is guaranteed not to be read by other threads, allowing a write operation to complete without the risk of inconsistent lookups to occur. In these embodiments, the object network modeler component executes a write operation of an object into the index by storing an object pointer and an object ID handle of the object in the indexslot at wdx. The object ID handle depends on the table mode, as described above for indexline lookup operations.

In some embodiments, if wdx references a slot beyond the end of indexslot array, the object network modeler component allocates a larger array using one of the index slot array allocators (see FIG. 29). Next, according to these embodiments, the object network modeler component copies the old array into the new array while also performing defragmentation as necessary. The object network modeler component then de-allocates the old array. In some embodiments, the object network modeler component also maintains and updates book-keeping attributes in the indexline and the linerail as necessary.

In some embodiments, once an object network modeler component (such as a thread executing the index manager) acquires an indexline for writing, the arr indexslot array is guaranteed not to be read by other threads, allowing a delete operation to complete without the risk of inconsistent lookups to occur. In these embodiments, the object network modeler component executes a delete operation of an object from the index by scanning the indexslot array starting at rdx until the object pointer of the object to be deleted matches one in the indexslot array. Further, in these embodiments, if the object to be deleted is found, the object network modeler component sets the indexslot's object ID handle to zero and the object pointer to NULL. This creates a "hole" in the indexslot array which will be ignored by future lookup operations. The delete operation is complete once a matching object has been found and deleted. Sequential scan stops when wdx is reached, meaning the referenced object is not indexed and no action is performed. In some embodiments, the object network modeler component also maintains and updates book-keeping attributes in the indexline and the linerail as necessary.

In some embodiments, if the number of active objects in the indexslot array falls below a threshold, the object network modeler component allocates a smaller array using one of the index slot array allocators. Next, according to these embodiments, the object network modeler component copies the old array into the new array while also performing defragmentation as necessary. The object network modeler component then de-allocates the old array.

Figure 31:
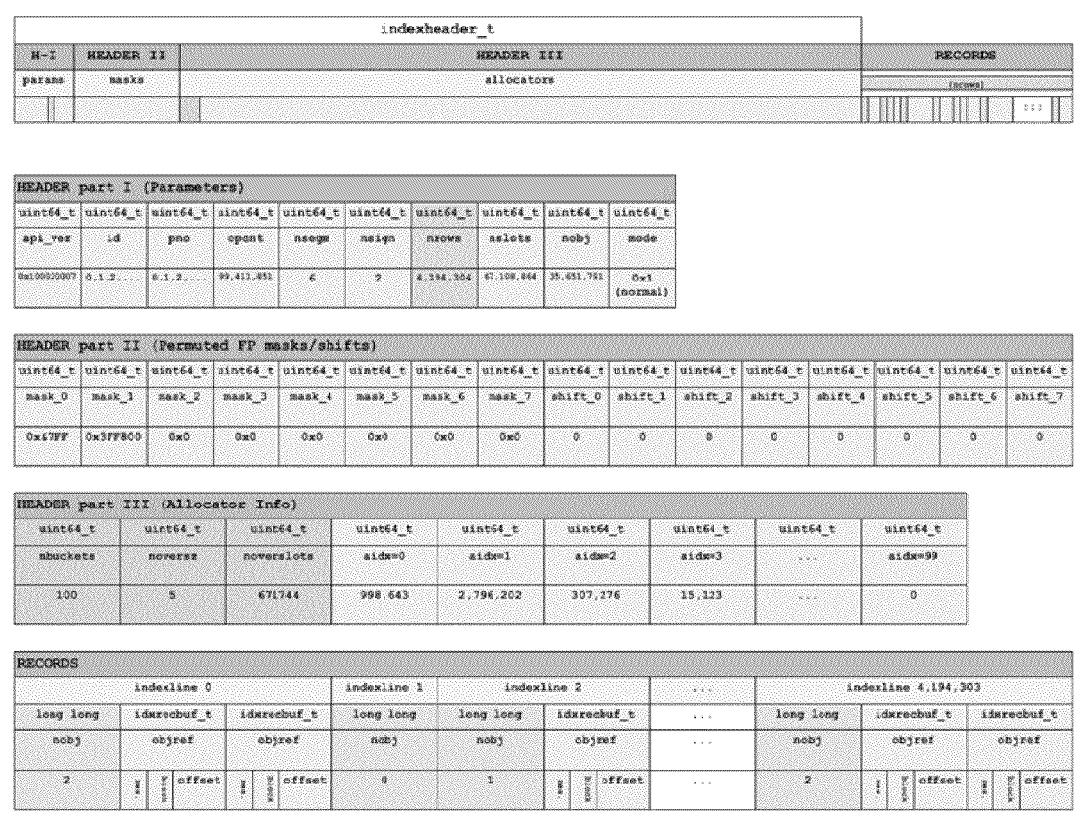

In some embodiments, the object network modeler is configured to operate using various indices entirely in memory. To allow for quick system re-start after a shutdown all indices may be written to files on disk. The file format is shown in FIG. 31. As illustrated, an index file has two main parts: an index header and one or more index records.

In an embodiment illustrated by FIG. 31, the index header is divided into three parts: index parameters, index key permutation masks and shifts, and indexslot array allocator descriptor. The index parameters mirror many of the linerail parameters, omitting run-time only attributes such as locks, semaphores and pointers, and adding consistency markers such as API version (api_ver) and operation counter (opcnt.) The index key permutation masks and shifts 404 mirror those of the linerail's perm attribute. The array allocator descriptor holds information about run-time memory requirements for this linerail. This information enables the object network modeler to pre-allocate the exact amount of memory needed on startup to optimize performance and minimize fragmentation.

In an embodiment illustrated by FIG. 31, the index records are a direct reflection of the indexslot array in each indexline for the linerail. In this embodiment, only active objects are stored, with an object counter for each indicating the number of active objects per indexline. In some embodiments, an object is represented by two numbers in the idxrecbuf structure: object store's block number where the object exists and block offset to the slot in the block containing the object. In these embodiments, the object reference is valid only if the index header's opcnt matches the object store's opcnt. If upon startup these do not match, the object network modeler is rejects the index file and rebuilds the index file from the object store, which results in a slower startup.

Object Store

Figure 32:
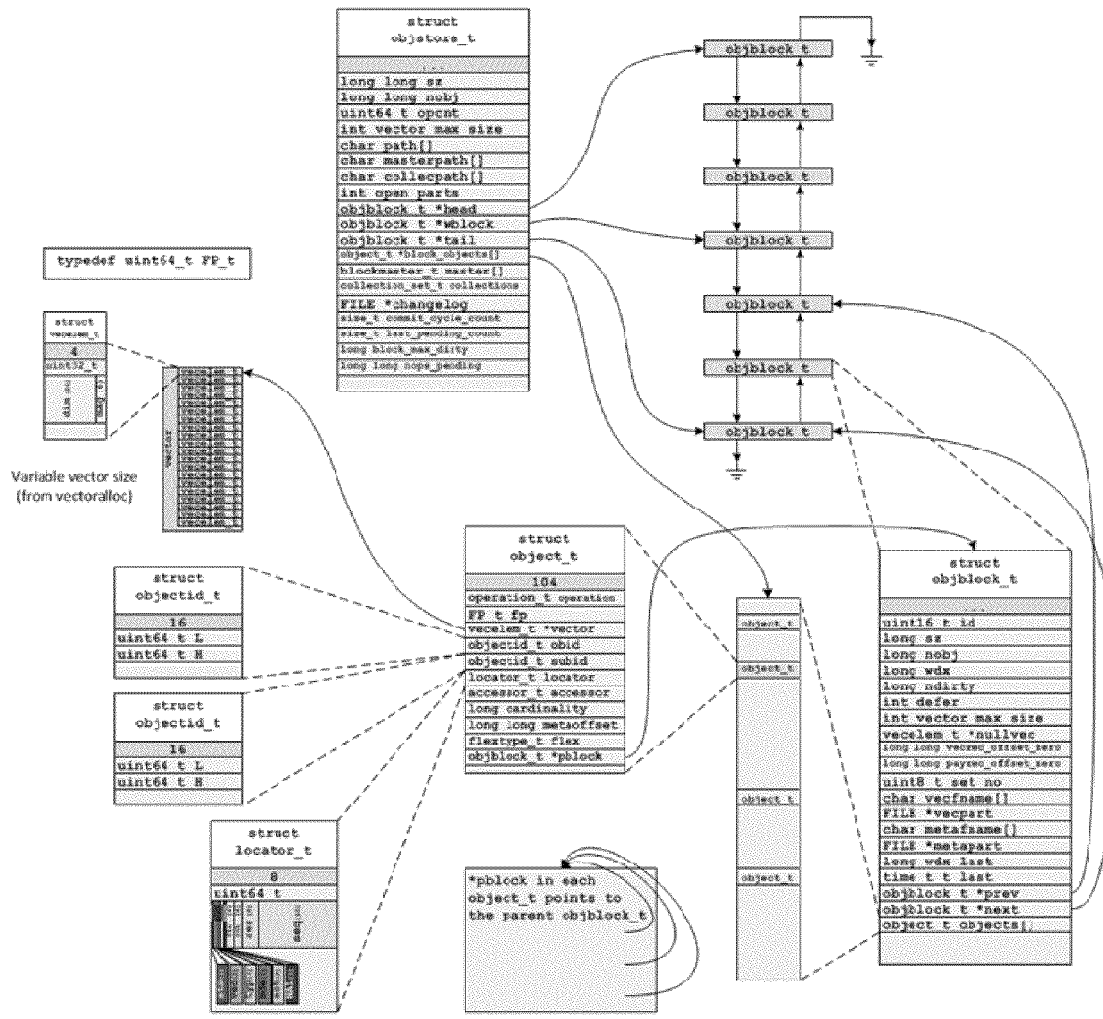
FIG. 32 is a data entity diagram illustrating connections between object store data components in the system.

FIG. 32 illustrates data components included within an object store, such as the object store 214 described above with reference to FIG. 2. In some embodiments, the object store is arranged as a root structure objectstore_t, which is described below in Table 9, that references a set of object blocks objblock_t, which is described below in Table 10. In these embodiments, the object store has a fixed maximum object capacity and one-to-one relationship with a partition file on disk. In addition, in these embodiments, the object store can include to 65,536 object blocks, each with a fixed capacity of 262,144 objects for a total theoretical capacity of about 17 billion objects. However, it is appreciated that other embodiments may have differing capacities and embodiments are not limited to a particular fixed or variable capacity.

TABLE 9

| Type | Name | Description |
| --- | --- | --- |
| long long | sz | Total current object capacity, i.e. number of object slots allocated across all object blocks |
| long long | nobj | Total number of active objects |
| uint64_6 | opcnt | Total number of modifying operations executed |
| Int | vector_max_size | Maximum number of supported vector elements in $V_{int}$ |
| char [ ] | path | Root directory on disk for storing object data |
| char [ ] | masterpath | Filename for the Simarray master record |
| char [ ] | collecpath | Filename for the Simarray collection set record |
| Int | open_part_s | Number of open block partition files |
| objblock_t* | head | Pointer to the first object block |
| objblock_t* | wblock | Pointer to the object block used for writing new objects |
| objblock_t* | tail | Pointer to the last pre-allocated object block |
| object_t** | block_objects | Array of pointers to objects indexed by object offset |
| blockmaster_t [ ] | master | Master record array holding size and write indexes per block |

TABLE 9-continued

| Type | Name | Description |
|---|---|---|
| collection_set_t | collections | Objectstore's collection access filter set |
| FILE* | changelog | Current commit log file in use for writing updates/deletes |
| size_t | commit_cycle_count | Number of operations since last commit |
| size_t | last_pending_count | Number of pending operations remaining after commit |
| Long | block_max_dirty | Max number of modified objects in block before flush |
| long long | nops_pending | Number of currently pending operations in commit log |

In some embodiments, an object manager, such as the object manager 210 described above with reference to FIG. 2, is configured to dynamically grow and shrink the object store in increments of one objblock as appropriate. In these embodiments, an objblock has a fixed, pre-allocated set of object slots that become activated as object data is ingested into the object network modeler 202. When the current block being written to is full, the next block may become the write block and may be created if not already pre-allocated.

In some embodiments, the object manager implements an object permission system to allow an object network modeler, such as the object network modeler 202 described above with reference to FIG. 2, to maintain segmented data sets. The indexing and lookup process described below within the Indices section automatically filters objects by a segment attribute based on the current indexing/lookup collection context.

TABLE 10

| Type | Name | Description |
|---|---|---|
| uint16_t | Id | Block ID 0,1,2, . . . ,65535 |
| long | s z | Block capacity in number of storable objects |
| long | nobj | Number of current active objects in block |
| long | Wdx | Write index, offset into objects for next available slot |
| long | ndirty | Number of modified objects not written to disk |
| int | defer | If set, disk writes are deferred, explicit commit required |
| int | vector_max_size | Maximum elements allowed in $V_{int}$ |
| vecelem_t* | nullvecAn | empty vector, i.e. $\vec{O}$ |
| long long | vecrec_offset_zero | Byte-offset to first vector record in data file on disk |
| long long | metarec_offset_zero | Byte-offset to first meta record in data file on disk |
| uint8_t | set_no | Directory set number for data file on disk |
| char_[ ] | vecfname | Full path to the block data file on disk |
| FILE* | vecpart | Block data file pointer |
| char_[ ] | metaf_name | Full path to the meta data file on disk |
| FILE_* | metapart | Meta data file pointer |
| Long | wdx_last | Last wdx written to |
| time_t | t_last | Timestamp when data file on disk was written to |
| objblock_t* | prev | Pointer to previous block |
| objblock_t* | next | Pointer to next block |
| object_t [ ] | objects | Array of pre-allocated object slots in block |

In some embodiments, the objects array in objblock is a large set of pre-allocated objects of type object_t, which is described below in Table 11. These objects are the Simarray objects discussed throughout the present disclosure.

TABLE 11

| Type | Name | Description |
|---|---|---|
| operation_t | Operation | 64-bit operation ID that last modified this object |
| FP_t | Fp | Fingerprint $V_{fp}$ |
| vecelem_t* | Vector | Internal vector $V_{int}$ |
| objectid_t | Obid | Object ID OBID |
| objectid_t | Subid | Reference ID SUBID |
| locator_t | Locator | Various object meta-data |
| accessor_t | Accessor | Object access permission filter |
| Long | Cardinality | Number of inbound references to this object |
| long long | Metaoffset | Byte offset into data file on disk, holding meta data for object |
| flextype_t | Flex | Flexible, multi-purpose (small) in-object meta-data |
| objblock_t* | Pblock | Pointer back to block owning this object |

Figure 33:
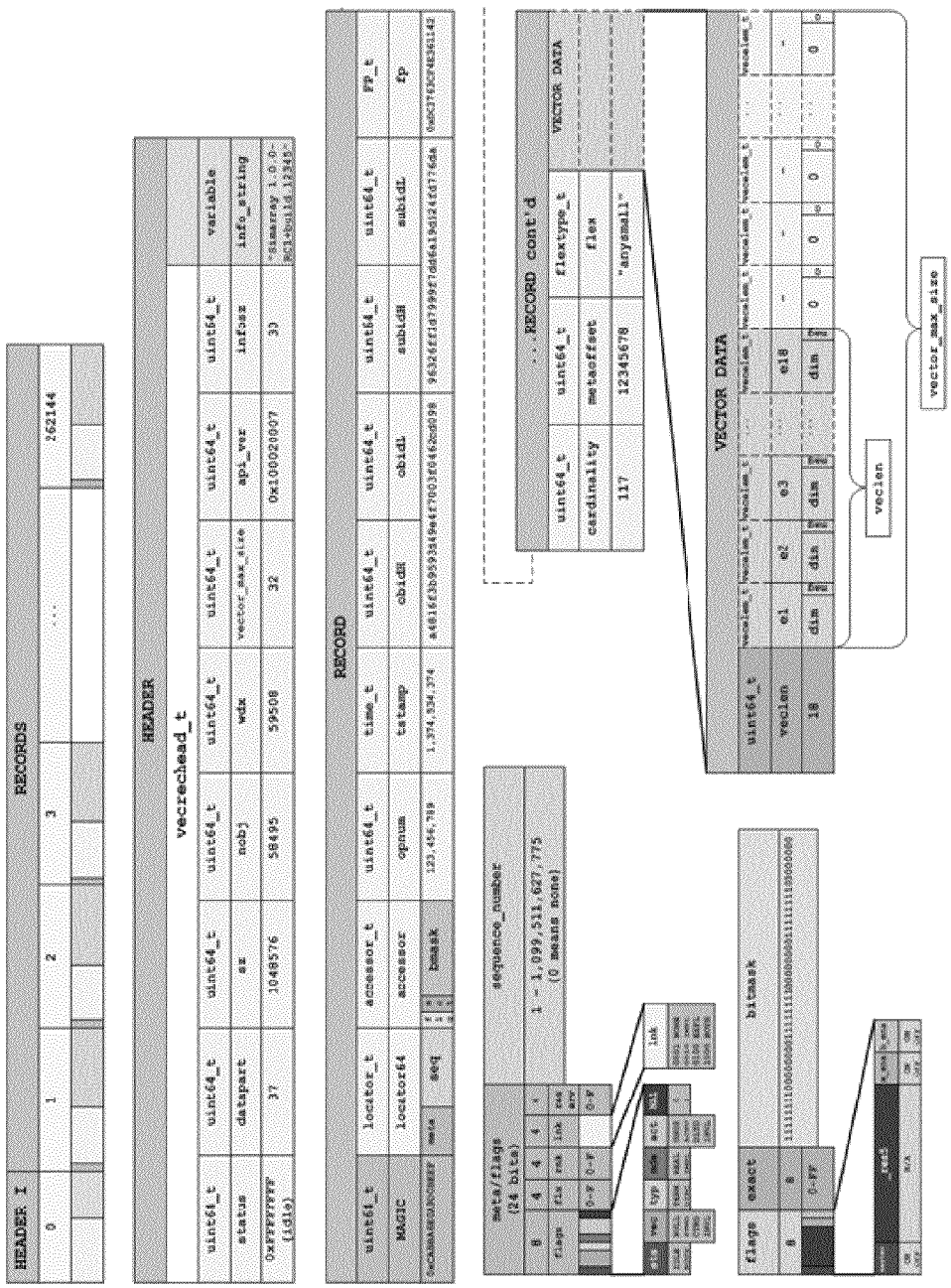
FIG. 33 is a data structure diagram illustrating object store components in the system.

In some embodiments, objects inserted into the object store are written to the memory-based objblock and to a block data file on disk. The block data file format is shown in FIG. 33. As illustrated, the block data file format includes a header followed by one or more records storing object data. In these embodiments, the object manager writes new objects to disk as they are created in memory. Further, in these embodiments, the object manager either secures modified objects to disk immediately (the default), or defers securing for batch-updates to disk in response to receiving an explicit commit command. When securing modified objects to disk, the object manager streams the modified objects into a continuously rotating change log. In this way, the object manager ensures sequential disk writes most of the time (for improved performance) with occasional batch updates of the object block data parts on disk.

In some embodiments, objects can optionally contain arbitrary "BLOB" meta-data, i.e. any binary data up to 2 GB. In these embodiments, meta-data is not stored in memory. Rather, in these embodiments, the meta-data is stored in a meta-data file associated with the object block file. Therefore, in these embodiments, a block data partition therefore has two files: the objblock data file and the meta-data file.

Figure 34:
FIG. 34 is a data structure diagram illustrating object store components in the system.
Figure 34:
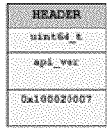
Figure 34:
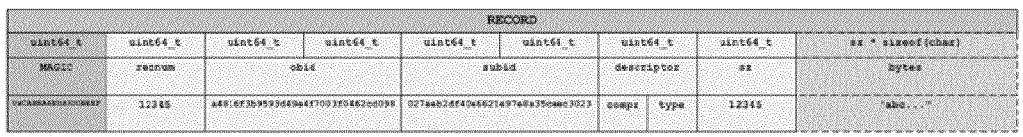

In some embodiments, a component of the object network modeler, such as a query engine (e.g., the query engine 218 described above with reference to FIG. 2) or the object manager, stores and accesses meta-data corresponding to an object using the metaoffset attribute of the object. In these embodiments, when metaoffset is zero, no meta-data exists for the object. Also, in these embodiments, when metadata is non-zero, the metaoffset attribute interpreted by the object network modeler component as an offset into the meta-data file where the meta-data record for the object is located. Further, according to these embodiments, a meta-data record includes a fixed set of standard meta-attributes identifying the object (if needed for recovery), followed by a variable byte array holding the actual meta-data. FIG. 34 illustrates the format of a meta-data file according to one embodiment.

In some embodiments, when meta-data is accessed by a lookup operation, such as by the query engine, the meta-data file will first be opened (if not already open) and the file pointer positioned at metaoffset bytes from the start. Data is then read from file and returned. The performance overhead of using meta-data depends on disk I/O sub-system speed.

Allocators

Figure 35:
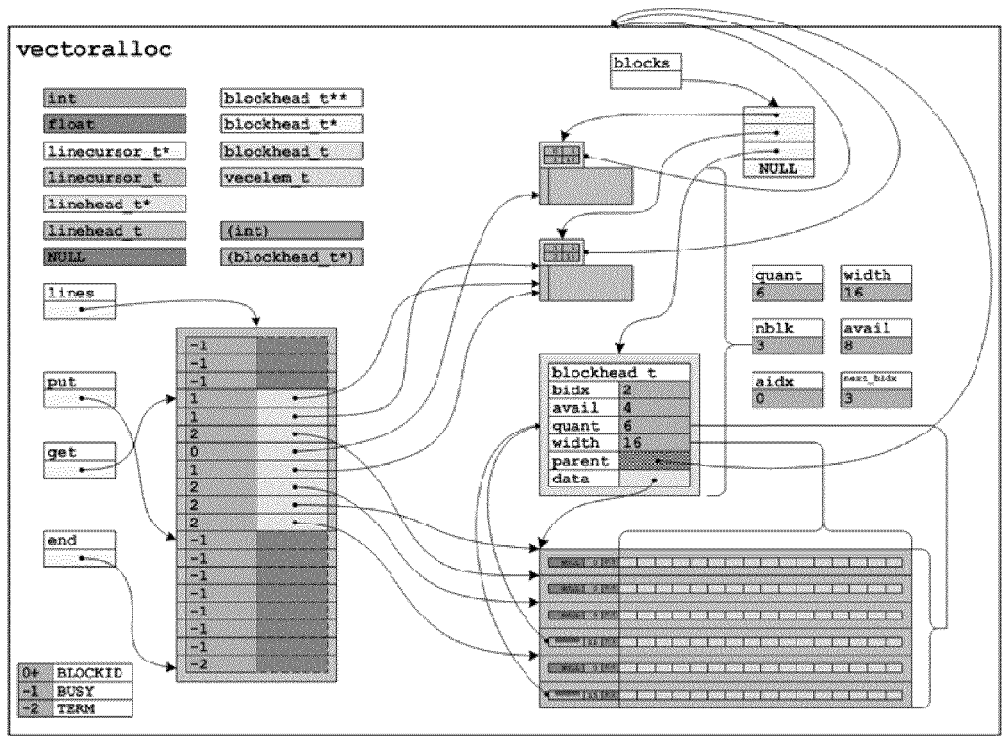
FIG. 35 is a schematic diagram of a vector allocator in the system.
Figure 36:
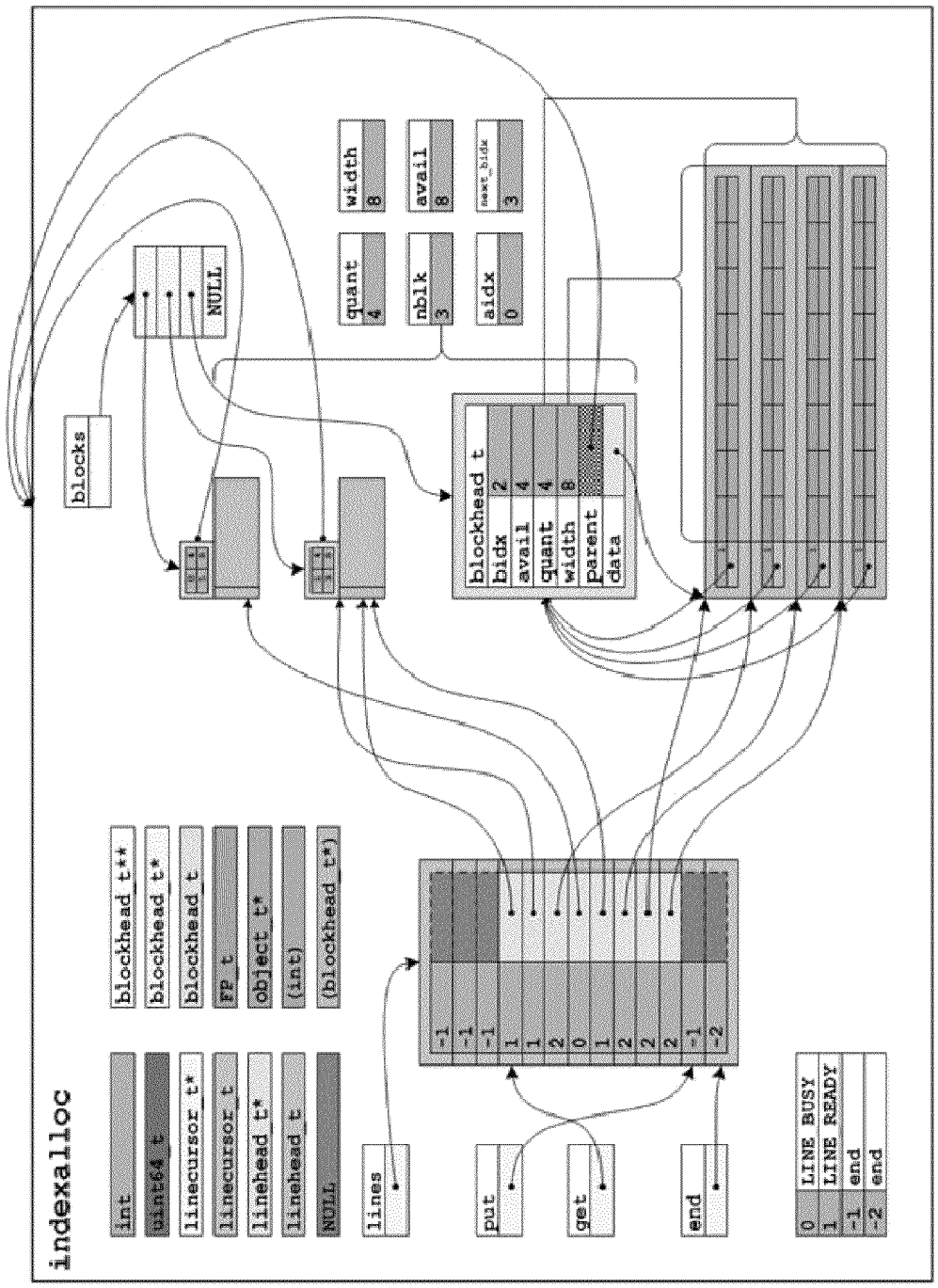
FIG. 36 is a schematic diagram of an index allocator in the system.

Due to the extensive use of memory, some embodiments of the object network modeler implement custom memory allocators for $V_{int}$ vector data used on objects and indexslot arrays used in linerails. High level diagrams for vector allocators (such as the one or more vector allocators described above with reference to FIG. 29) and index allocators (such as the one or more index allocators described above with reference to FIG. 29) are shown in FIGS. 35 and 36, respectively. In some embodiments, the allocators are configured to pre-allocating blocks of memory suitable for vectors and for indexslot arrays. In these embodiments, only a selected set of sizes are supported for each allocator type. However, embodiments are not limited to the particular sizes expressly recited herein.

In some embodiments, when representing internal vectors $V_{int}$ the object manager will quantize the vector size to fit in the smallest possible vector array using the minimal allocator $A_k$ as described in the Vector Encoding section herein. In these embodiments, there are 20 vector allocators supporting vectors of the following sizes: 4, 8, 12, 16, 20, 32, 48, 64, 80, 96, 128, 160, 192, 224, 256, 320, 384, 448, 512, and 520.

For example, to represent a vector with 27 elements, the object manager would use the 6th allocator to allocate $V_{int}$ with capacity 32, leaving 5 unused elements at the end. The amount of average wasted space has been balanced with the benefits of having a small set of fixed sized allocators to optimize performance and minimize fragmentation with the associated memory management overhead.

In some embodiments, the index manager is configured to allocate indexslot arrays used for indexing objects as part of the linerail structures from a set of indexslot allocators. Indexslot arrays grow and shrink dynamically with normal operation of the object network modeler. If a generic allocator (e.g. malloc/free) were used by the index manager, the effects of memory fragmentation would be detrimental to efficient operation. Instead, the index manager uses custom application-specific allocators. In this way, the index manager creates and maintains large memory blocks that are fine tuned for a specific purpose.

In these embodiments, there are 48 distinct indexslot allocators supporting indexslot arrays of the following sizes: 2, 12, 48, 104, 171, 245, 324, 408, 494, 584, 676, 770, 865, 963, 1062, 1163, 1265, 1368, 1472, 1577, 1683, 1790, 1898, 2007, 2117, 2228, 2339, 2451, 2563, 2676, 2790, 2905, 3020, 3135, 3252, 3368, 3485, 3603, 3721, 3840, 3959, 4078, 4198, 4319, 4440, 4561, 4682, 4804. When an indexslot array is out of space, the index manager uses the next-higher allocator to replace the old array with a new array. For example, if the current array was allocated using the "12" allocator and the $13^{th}$ element must be written, then the index manager will utilize the "48" allocator to provide a new indexslot array to replace to old one referenced from the indexline structure. The index manager copies the old array's data into the new array, and defragments the data if necessary. The index manager then de-allocates the old array by making it available to the "12" allocator for future use. Note that no malloc or free is used in this process. Likewise, if the index manager removes objects from an index the old array will be replaced with a smaller one whenever possible. In some embodiments, the allocators themselves will expand and shrink as necessary in large block at rare intervals. This may require infrequent calls to malloc and free, but in very large chunks. Memory fragmentation is thus minimized.

Allocators that have not yet been utilized by to provide an indexslot array or vector take up no space, aside from a very small number of meta-attributes used for book-keeping. For example, if no indexslot arrays in any linerails are larger than 48 slots, all the allocators above 48 will be empty and not take up any pre-allocated space.

It is appreciated that the indexslot array may grow larger than the largest allocator ("4804). This can happen in situations where the hash values of input data are not evenly distributed. Dimension indexing is prone to this behavior if some vector dimensions occur at a disproportional frequency compared with others. A vectorizer, such as the vectorizer 204 described above with reference to FIG. 2, with aggressive IDF normalization may be desirable in such cases. However, some embodiments of the object network modeler allow indexslot arrays of any size. In these embodiments, the index manager uses malloc and free to allocate memory for indexslot arrays that are too large for a standard index allocator. However, it is also appreciated that lookup performance may be impacted when oversized arrays are used. Thus, in some embodiments, the index manager record and provide indexslot allocator profile statistics to guide optimization in these situations.

Multi-Vector Representations

In some embodiments, the object network modeler is configured to represent large external objects (e.g. documents) as a set of features is an efficient way to normalize information through dimensionality reduction. However, in these embodiments, it may not possible to create a single set of features to describe the original object properly.

For instance, in one example, the object network modeler may be used to model text documents as objects. In this example, representing a complete book as a feature vector may be difficult for the vectorizer. To address the problem, the object network modeler may represent objects from various "points of view" using multiple vectors. In this way, object network modeler is able to associate objects based on partial matching between selected aspects of objects.

Figure 37:
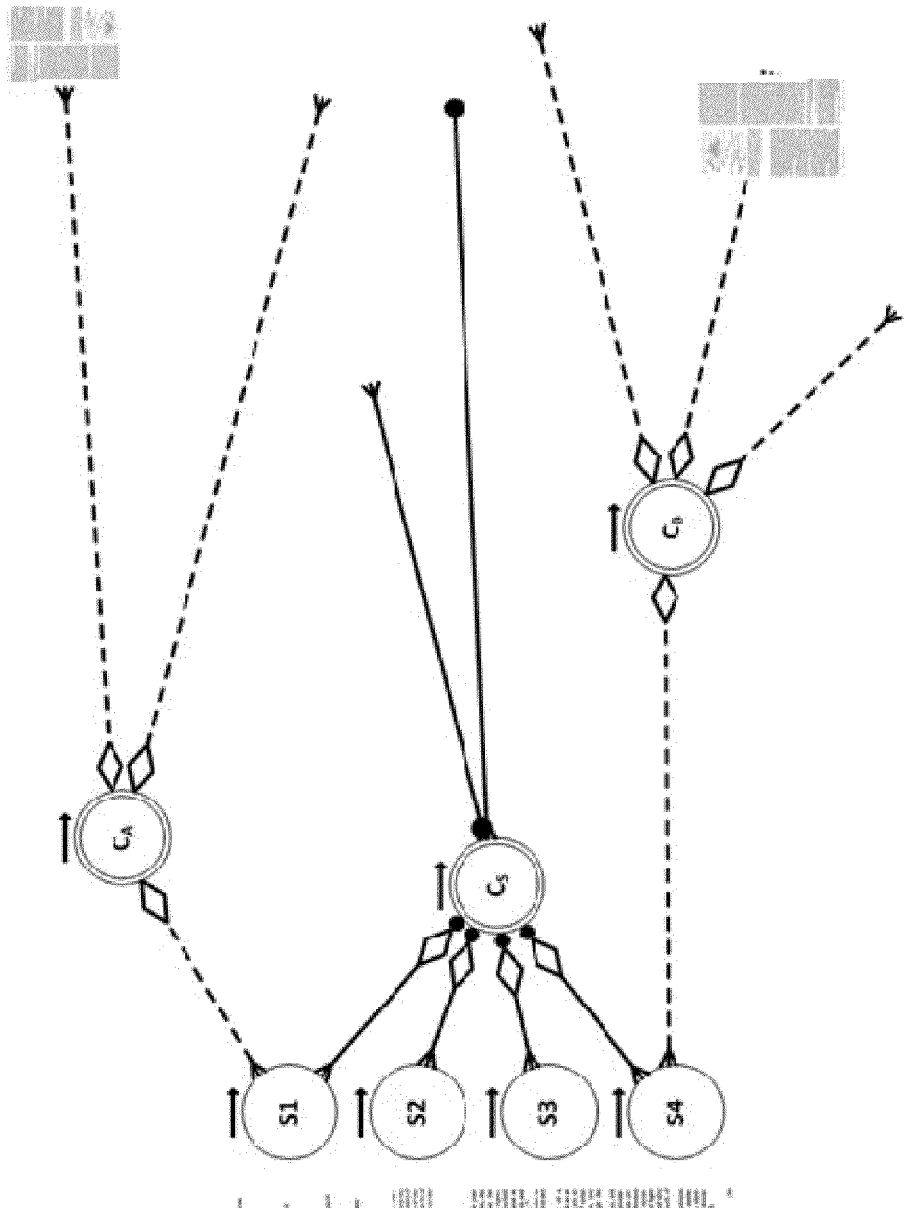
FIG. 37 is an entity relationship diagram of an example object network.

FIG. 37 shows four vectors representing a document. The vectors can be combined into a centroid for matching other objects, or used individually. The object network modeler allows the application to use any combination of vector matching criteria to form networks. Objects may be represented as multiple vectors where each vector is based on different types of information. Some other examples include:

1) Linear segmentation. Separate vectors may be created on different parts of the input data. The level of granularity is arbitrary. It could be one vector per chapter in a book, one vector per paragraph, or something else. It could also be segments of sound, speech or video appropriately represented by a suitable media-vectorizer. A window function may be applied to the input allowing overlapping regions of information per vector.
2) Entity type. Separate vectors can be created for different categories of information. For example, separate vectors could be used to represent people, places, products, companies, drugs, food, etc. Specialized vectorizers that recognize entities of specific types may be useful in this scenario.
3) Word class. Separate vectors can be used to represent nouns, verbs and adjectives in the input document. Furthermore, vectors can be created around text segments based on verb tense (past, present, future), or around adjectives for sentiment-based vectors.
4) Word bucket. To improve robustness against false negatives, multiple vectors can be used where each vector only considers a subset of words, e.g. based on first letter buckets like A-F, G-L, M-R, S-Z. This is useful for high-recall duplicate detection applications based on permutation index only (for performance) where fingerprint brittleness may be an issue.

Graphics Processing Unit (GPU) Implementation

GPUs are well suited for performing an operation on many pieces of data simultaneously. This is accomplished by packing many "slimmed down" cores into the GPU, each of which can perform independent operations simultaneously. Furthermore, each of these cores contains multiple ALUs (arithmetic logic units), allowing a core to apply an operation to multiple pieces of data in a single clock cycle. This functionality is called SIMD (single instruction multiple data) processing.

Figure 38:
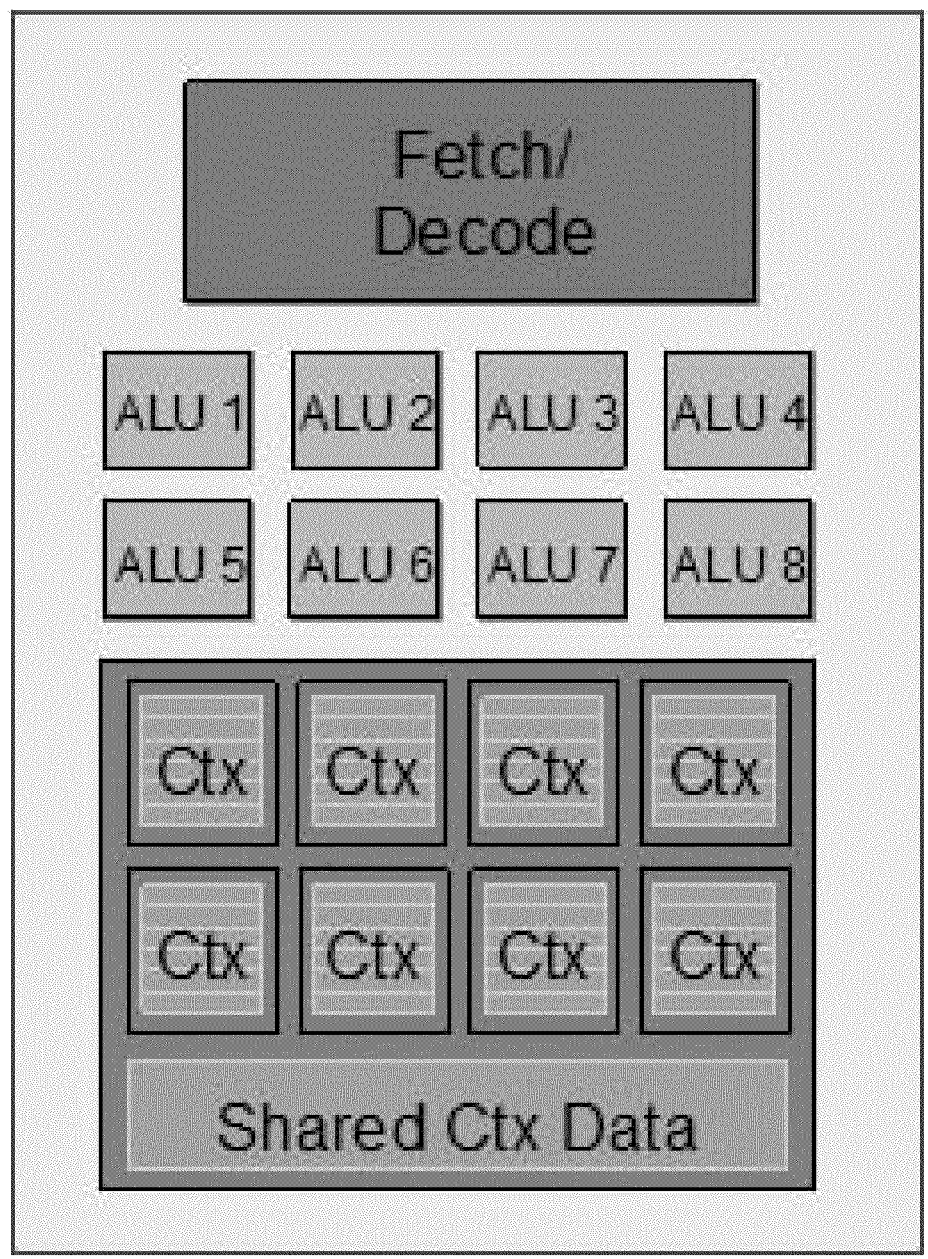
FIG. 38 is a block diagram of a physical architecture of a graphics processing unit (GPU)

Referring to the sample architecture illustrated in FIG. 38, the fetch/decode block handles dispersing an identical operation to all ALUs. Each ALU refers to its local context block to get the data that the operation should be performed on. The results are then written to an output buffer, which may not necessarily be located in the local context block (it could be located in the shared context data block).

A GPU contains multiple cores and the process described above may be performed on each of them. Thus, the number of concurrent operations that a GPU can perform is generally defined by multiplying core count and ALU per core count.

In some embodiments, the object network modeler may be implemented using one or more general purpose GPUs. In particular, the following operations may be enhanced vector encoding, fingerprint generation, fingerprint comparison, and Cosine similarity computation. Additionally, embodiments executing on a GPU may implement a wider fingerprint, allowing for more resolution per dimension.

With regard to vector encoding, feature hashing and weight normalization operations can be offloaded to the GPU in batches, taking advantage of the fact that each hash is an independent operation. Thus, thousands of hashes can be computed simultaneously using the GPU, which should result in a considerable speed improvement when indexing large data sets. With regard to fingerprint generation, thousands of fingerprint fragment generation operations can be performed simultaneously using a GPU. Combined with GPU-based vector encoding, data indexing throughput should improve considerably. With regard to fingerprint comparison, instead of performing linear table scans, hamming distance computations can be performed in batches on a GPU. With regard to Cosine similarity computation, dot products can be computed in batches on a GPU.

Regarding wide fingerprints, in some embodiments fingerprints are 64 bits wide so they can be processed efficiently by x86-64 CPUs. By offloading fingerprint generation and comparison to a GPU, the system may be able to process wider fingerprints. Since GPUs are very good at processing data in parallel, a wider fingerprint (say 128 bits) can be broken up into smaller pieces (32/64 bits, depending on the GPU architecture) that can be processed as part of a batch job. In this way, a wider fingerprint can be processed in the same time it would take to process a 64-bit fingerprint. A wider fingerprint allows for more fragments, which in turn translates to increased robustness towards changes in input vector $V_{int}$.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computing system for identifying objects within an object network that are sufficiently similar to a query, the computing system comprising:

memory comprising executable instructions; and
a processor operatively connected to the memory, the processor configured to execute the executable instructions in order to effectuate a method comprising:
   obtaining a probe object representative of the query;
   generating one or more external vectors representative of the probe object;
   generating one or more internal vectors representative of the probe object based on the one or more external vectors representative of the probe object;
   generating a fingerprint representative of the probe object based on the one or more internal vectors representative of the probe object;
   performing at least one of the following comparisons to identify a first set of candidate objects:
      comparing the fingerprint representative of the probe object with a plurality of fingerprints representative of a plurality of objects within the object network; and
      comparing the one or more internal vectors representative of the probe object with a plurality of internal vectors representative of the plurality of objects within the object network;
   calculating first respective similarity metrics between the probe object and each of the objects in the first set of candidate objects by comparing the one or more internal vectors representative of the probe object with corresponding internal vectors representative of each object in the first set of candidate objects; and
   generating a second set of candidate objects based on the first set of candidate objects, wherein the second set of candidate objects comprises those objects whose first similarity metrics exceed a first predefined threshold.

2. The computing system of claim 1, wherein the processor is configured to execute the executable instructions in order to effectuate the method further comprising:
   calculating respective second similarity metrics between the probe object and each of the objects in the second set of candidate objects by comparing the one or more external vectors representative of the probe object with corresponding external vectors representative of each object in the second set of candidate objects; and
   generating a third set of candidate objects based on the second set of candidate objects, wherein the third set of candidate objects comprises those objects whose second similarity metrics exceed a second predefined threshold.

3. The computing system of claim 2, wherein the first predefined threshold and the second predefined threshold are the same.

4. The computing system of claim 1, wherein comparing the fingerprint representative of the probe object with the plurality of fingerprints representative of the plurality of objects within the object network comprises:
   calculating respective hamming distances between the fingerprint representative of the probe object and each of the fingerprints representative of the plurality of objects within the object network; and
   identifying, as part of the first set of candidate objects, those objects of the plurality of objects whose fingerprints are within a predefined hamming distance from the fingerprint representative of the probe object.

5. The computing system of claim 1, wherein each internal vector comprises a plurality of dimensions, and wherein comparing the one or more internal vectors representative of the probe object with the plurality of internal vectors representative of the plurality of objects within the object network comprises:

for each of the one or more internal vectors representative of the probe object, comparing a predefined number of dimensions of each internal vector representative of the probe object with corresponding dimensions of the plurality of internal vectors representative of the plurality of objects within the object network.

6. The computing system of claim 1, wherein the processor is configured to execute the executable instructions in order to effectuate the method further comprising:
eliminating, from the first set of candidate objects, any duplicative instances of objects within the first set of candidate objects such that there is only a single instance of each object within the first set of candidate objects.

7. The computing system of claim 1, wherein calculating the first respective similarity metrics between the probe object and each of the objects in the first set of candidate objects comprises at least one of the following:
calculating respective Cosine similarity metrics between the one or more internal vectors representative of the probe object and each of the internal vectors representative of the plurality of objects within the object network; and
calculating respective Jaccard Index similarity metrics between the one or more internal vectors representative of the probe object and each of the internal vectors representative of the plurality of objects within the object network.

8. The computing system of claim 2, wherein calculating the respective second similarity metrics between the probe object and each of the objects in the second set of candidate objects comprises at least one of the following:
calculating respective Cosine similarity metrics between the one or more external vectors representative of the probe object and each of the external vectors representative of the plurality of objects within the object network; and
calculating respective Jaccard Index similarity metrics between the one or more external vectors representative of the probe object and each of the external vectors representative of the plurality of objects within the object network.

9. The computing system of claim 1, wherein each external vector of the one or more external vectors representative of the probe object comprises a plurality of features describing the probe object, and wherein each feature of the plurality of features is associated with a respective weight.

10. The computing system of claim 9, wherein generating the one or more internal vectors representative of the probe object based on the one or more external vectors representative of the probe object comprises:
applying a hashing function to each feature of the plurality of features of at least one external vector representative of the probe object;
applying at least one of a scaling function and a normalization function to each weight associated with each feature of the plurality of features of the at least one external vector representative of the probe object; and
wherein the one or more internal vectors representative of the probe object are represented in a fixed number of bits, and wherein the corresponding one or more external vectors representative of the probe object are represented in a variable number of bits.

11. The computing system of claim 1, wherein each internal vector of the one or more internal vectors representative of the probe object comprises a plurality of dimensions, and wherein each dimension of the plurality of dimensions is associated with a respective magnitude, and wherein generating the fingerprint representative of the probe object based on the one or more internal vectors representative of the probe object comprises:

for at least one internal vector of the one or more internal vectors representative of the probe object, generating a plurality of fingerprint fragments representative of the at least one internal vector, wherein each fingerprint fragment of the plurality of fingerprint fragments is generated based on the plurality of dimensions of the at least one internal vector and the respective magnitudes associated with each of the plurality of dimensions of the at least one internal vector; and
aggregating the plurality of generated fingerprint fragments to generate the fingerprint representative of the probe object.

12. A computer-implemented method comprising:
obtaining, by a processor, a first external object;
generating, by the processor, one or more external vectors representative of the first external object;
generating, by the processor, one or more internal vectors representative of the first external object based on the one or more external vectors representative of the first external object;
obtaining, by the processor, a second external object;
generating, by the processor, one or more external vectors representative of the second external object;
generating, by the processor, one or more internal vectors representative of the second external object based on the one or more external vectors representative of the second external object;
determining, by the processor, whether the first external object is explicitly associated with the second external object;
in response to determining that the first external object is explicitly associated with the second external object, generating, by the processor, an explicit association between the first external object and the second external object;
determining, by the processor, whether the first external object is implicitly associated with the second external object by comparing, by the processor, the one or more internal vectors representative of the first external object with the one or more internal vectors representative of second external object; and
in response to determining that the first external object is implicitly associated with the second external object, generating, by the processor, an implicit association between the first external object and the second external object.

13. The computer-implemented method of claim 12, wherein each external vector comprises a plurality of features describing the external object, and wherein each feature of the plurality of features is associated with a respective weight.

14. The computer-implemented method of claim 13, wherein generating the one or more internal vectors based on the one or more external vectors comprises:
applying a hashing function to each feature of the plurality of features of at least one external vector; and
applying a normalization function to each weight associated with each feature of the plurality of features of the at least one external vector;
wherein the one or more internal vectors are represented in a fixed number of bits, and wherein the corresponding one or more external vectors are represented in a variable number of bits.

15. The computer-implemented method of claim 12, wherein determining whether the first external object is explicitly associated with the second external object comprises at least one of:
determining whether the first external object directly references the second external object; and
determining whether the second external object directly references the first external object.

16. The computer-implemented method of claim 12, wherein comparing the one or more internal vectors representative of the first external object with the one or more internal vectors representative of the second external object comprises at least one of the following:
- calculating a Cosine similarity metric between the one or more internal vectors representative of the first external object and the one or more internal vectors representative of the second external object; and
- calculating a Jaccard Index similarity metric between the one or more internal vectors representative of the first external object and the one or more internal vectors representative of the second external object.

17. The computer-implemented method of claim 12, wherein comparing the one or more internal vectors representative of the first external object with the one or more internal vectors representative of the second external object comprises:
- calculating a degree of similarity between the first external object and the second external object based on the one or more internal vectors representative of the first external object and the one or more internal vectors representative of the second external object;
- determining whether the calculated degree of similarity exceeds a predetermined threshold; and
- in response to determining that the calculated degree of similarity exceeds the predetermined threshold, generating the implicit association between the first external object and the second external object.

18. The computer-implemented method of claim 12 further comprising:
- generating, by the processor, a first centroid object representing both the first external object and the second external object, wherein the first centroid object comprises a weighted average of the one or more internal vectors representative of the first external object and the one or more internal vectors representative of the second external object.

19. The computer-implemented method of claim 18 further comprising:
- obtaining, by the processor, a third external object;
- generating, by the processor, one or more external vectors representative of the third external object;
- generating, by the processor, one or more internal vectors representative of the third external object based on the one or more external vectors representative of the third external object; and
- adjusting, by the processor, the first centroid object such that the first centroid object represents the first external object, the second external object, and the third external object, wherein the adjusted first centroid object comprises a weighted average of the one or more internal vectors representative of the first external object, the one or more internal vectors representative of the second external object, and the one or more internal vectors representative of the third external object.

20. The computer-implemented method of claim 18 further comprising:
- determining, by the processor, whether the first centroid object is implicitly associated with a second centroid object, wherein the second centroid object comprises a weighted average of one or more internal vectors representative of a third external object and one or more internal vectors representative of a fourth external object, by comparing, by the processor, the first centroid object with the second centroid object; and
- in response to determining that the first centroid object is implicitly associated with the second centroid object, generating, by the processor, an implicit association between the first centroid object and the second centroid object.

21. The computer-implemented method of claim 20, wherein comparing the first centroid object with the second centroid object comprises:
- calculating a degree of similarity between the first centroid object and the second centroid object based on the one or more internal vectors representative of the first external object, the one or more internal vectors representative of the second external object, the one or more internal vectors representative of the third external object, and the one or more internal vectors representative of the fourth external object;
- determining whether the calculated degree of similarity exceeds a predetermined threshold; and
- in response to determining that the calculated degree of similarity exceeds the predetermined threshold, generating the implicit association between the first centroid object and the second centroid object.

* * * * *